United States Patent [19]

Chung

[11] 4,086,626

[45] * Apr. 25, 1978

[54] MICROPROCESSOR SYSTEM

[75] Inventor: David H. Chung, Palo Alto, Calif.

[73] Assignee: Fairchild Camera and Instrument Corporation, Mountain View, Calif.

[*] Notice: The portion of the term of this patent subsequent to Oct. 5, 1993, has been disclaimed.

[21] Appl. No.: 693,811

[22] Filed: Jun. 7, 1976

Related U.S. Application Data

[62] Division of Ser. No. 512,753, Oct. 7, 1974, Pat. No. 3,984,813.

[51] Int. Cl.² .............................................. G06F 13/00
[52] U.S. Cl. .................................................... 364/200
[58] Field of Search ......................................... 364/200

[56] References Cited

U.S. PATENT DOCUMENTS

| 3,972,028 | 7/1976 | Weber et al. | 340/172.5 |
|---|---|---|---|
| 3,975,714 | 8/1976 | Weber et al. | 340/172.5 |
| 3,984,813 | 10/1976 | Chung | 340/172.5 |

Primary Examiner—Gareth D. Shaw
Assistant Examiner—C. T. Bartz
Attorney, Agent, or Firm—Alan H. MacPherson; Henry K. Woodward; Robert C. Colwell

[57] ABSTRACT

A microprocessor system having at least two separate scale integration devices. A first of the two large scale integration devices is a central processing unit formed on a single semiconductor die, and the second large scale integration device is a memory circuit formed on a separate single semiconductor die. The term "die" as used herein is conventional and refers to a unitary semiconductor body or chip. The central processing unit requires an external program counter which contains memory addresses of instruction codes to be used by the central processing unit. The memory device is electrically coupled to the central processing unit and includes a memory for storing the instruction codes, and a program counter for addressing the memory. Provision is made to incorporate additional memory circuits to expand the size and capability of the microprocessor system. System interrupt circuitry is also provided for interrupting system operation to change to a new sequence of instruction codes.

12 Claims, 27 Drawing Figures

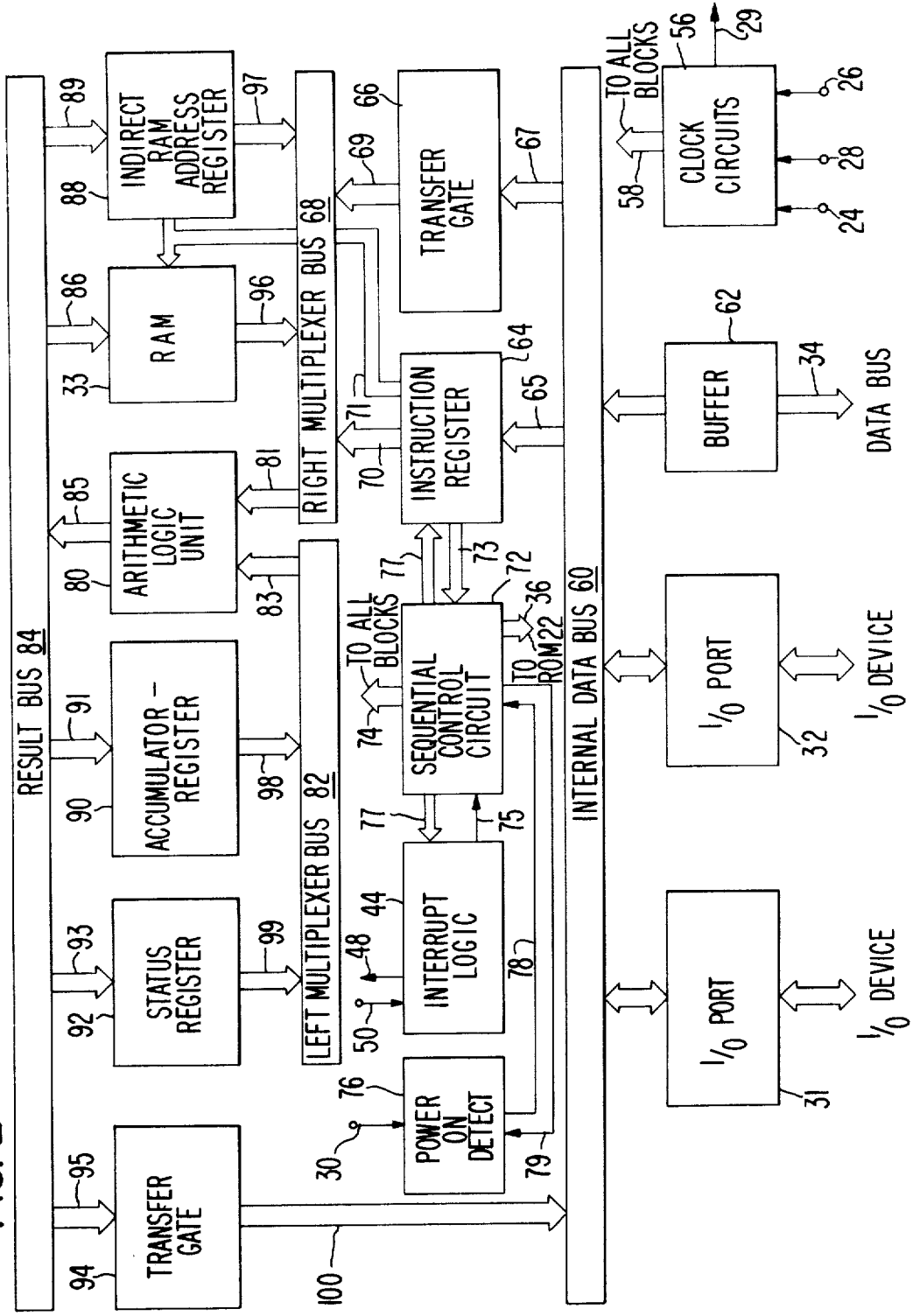

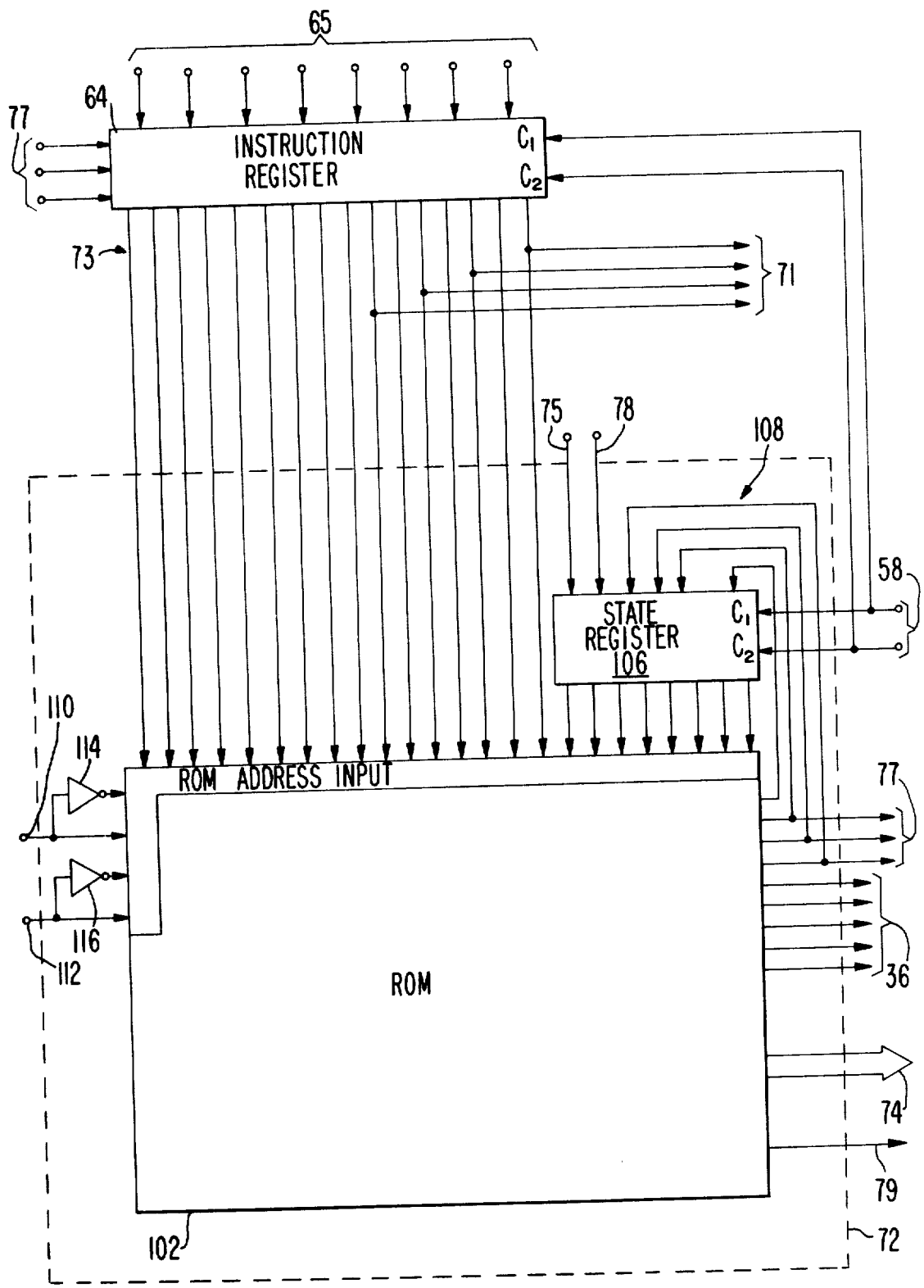

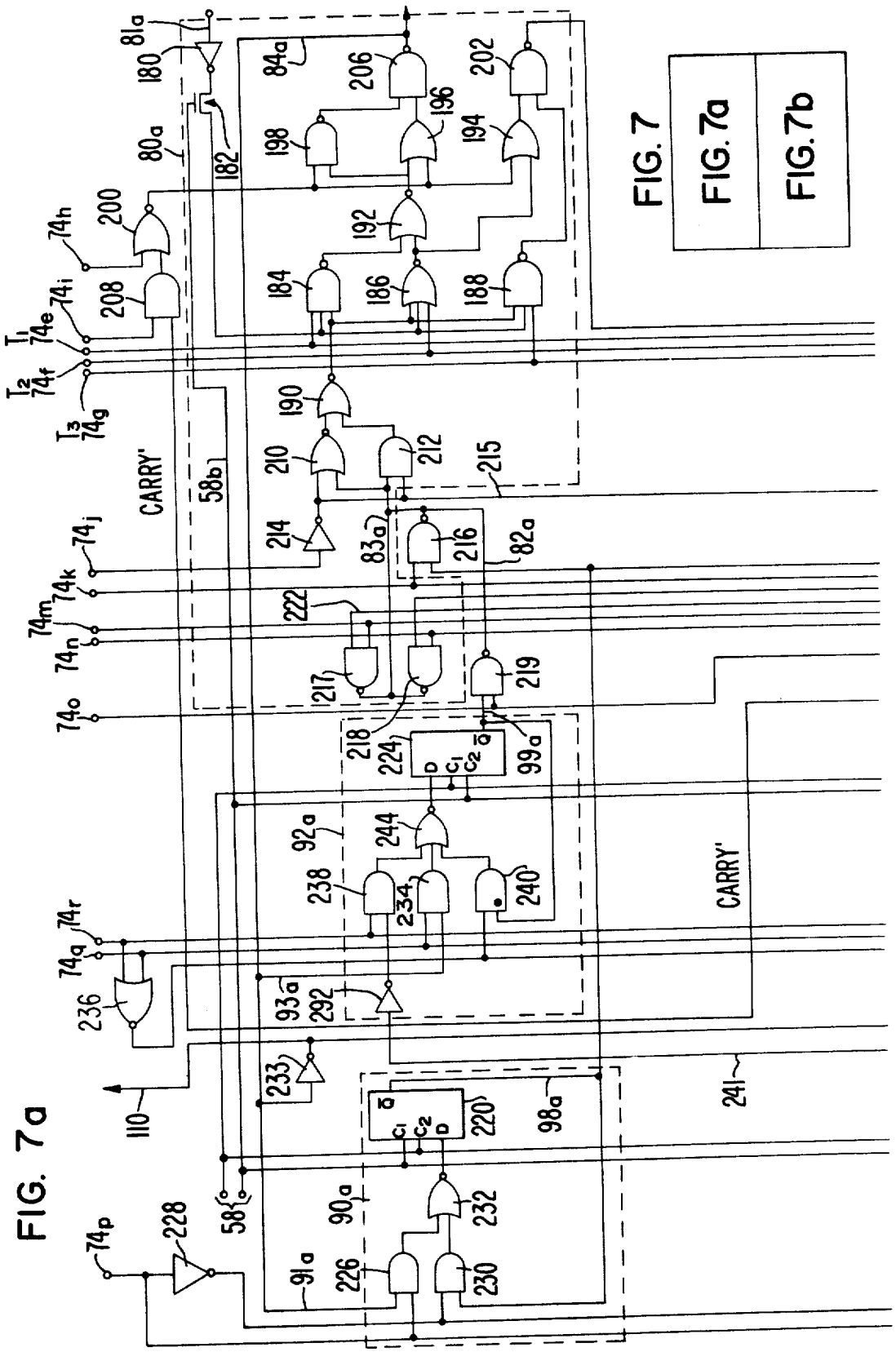

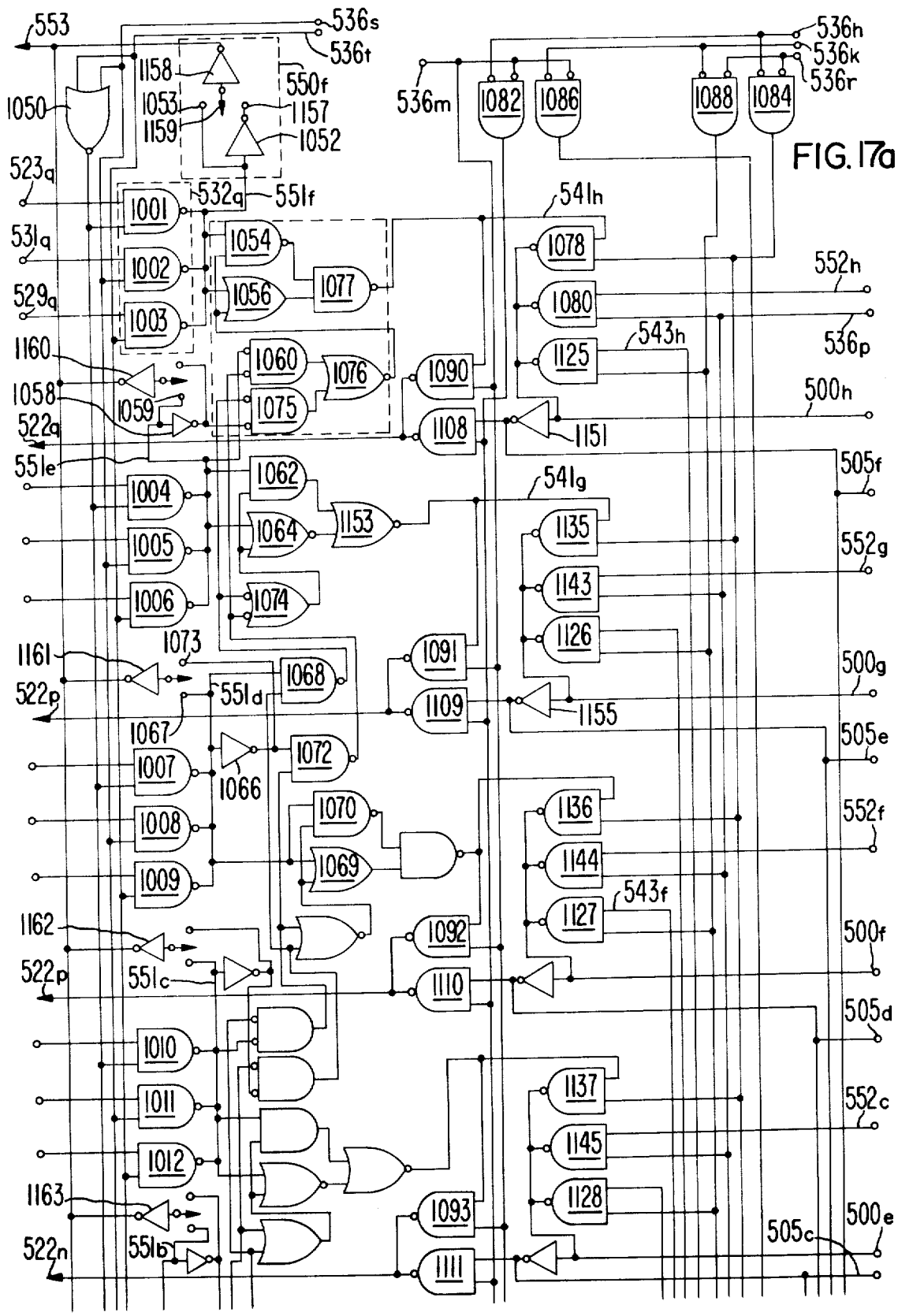

MICROPROCESSOR SYSTEM

This is a division of application Ser. No. 512,753 filed Oct. 7, 1974 now U.S. Pat. No. 3,984,813.

BACKGROUND OF THE INVENTION

1. Field of the Invention

This invention relates to a microprocessor system and, more particularly, to a microprocessor system having a central processing unit that employs an external memory containing a program counter.

2. Prior Art

The development of large-scale integrated circuits (LSI) has made possible the design of microprocessor systems which are capable of performing specialized computer functions. A microprocessor may comprise the control and processing portion of a small computer. Microprocessors, like all computer processors, can perform both arithmetic and logic functions in a bit-parallel manner under the direction of a stored program. Microprocessors, then, are inherently programmable. When placed in a system with peripheral memory circuits to provide the control program, and with input-and-output circuits, a microprocessor system is obtained which has a power of computation less than that of a minicomputer. As large scale integration technology advances, however, the power of computation of microprocessor systems approaches that of minicomputers.

Microprocessor systems generally derive their organization from the organizational and architectural concepts established from computers and minicomputers. The placement of a central processing unit, memory circuits, input-and-output circuits and miscellaneous support circuitry on a minimum number of integrated circuit chips inherently entails the employment of a small number of packages, which have a large number of external connectors or pins.

The typical prior art microprocessor architecture requires that a program counter be included in the central processing unit, and that this counter select the particular external memory to be addressed for retrieving program instruction codes. The use of a program counter in the CPU requires the use of a multiple-bus structure between the CPU and the memory. That is, at least one separate dedicated bus is employed for transferring data, and another dedicated bus for transferring addresses to the memory. The net result is that a larger number of pins are required on the CPU chip. Another approach in the prior art has been to employ a single bus between the CPU and an external memory, wherein data and addresses are time-multiplexed along the bus. This technique has a distinct disadvantage of requiring more complex circuitry, and a loss of process time for the multiplexing operation.

SUMMARY OF THE INVENTION

In accordance with the present invention, a microprocessor system is provided which has at least two separate large scale integration devices comprising a central processing unit large scale integration device including an arithmetic logic unit and at least one input/output port. The central processing unit requires an external program counter containing memory addresses of instruction codes to be used by the central processing unit. A first memory large scale integration device is provided which is electrically coupled to said central processing unit and includes a memory and the program counter. The program counter cooperates with the first central processing unit large scale integration device to select the instruction codes for operating the microprocessor in a manner determined by the instruction codes.

The microprocessor system of the present invention incorporates a single-chip central processing unit of large scale integration which contains the standard elements of a central processing unit including input-and-output ports, a program logic array, an arithmetic logic unit, and a scratch pad memory; but which does not contain a program counter. At least one separate memory large scale integration device on a single chip is also provided which contains its own dedicated program counter. The dedicated program counter is driven in synchronism with the operation of the central processing unit so that appropriate control signals are transmitted from the central processing unit to control the program counter. If more than one separate memory large scale integration device is incorporated in the microprocessor system, each additional memory device includes its own dedicated program counter which operates in synchronism with the central processing unit. In these multiple-memory systems, the dedicated program counters operate in response to control signals from the central processing unit so that each memory will provide instruction codes at the appropriate time to the central processing unit.

An advantage of the system of the present invention is that a minimum number of separate components are required to construct a microprocessor system. That is, a basic microprocessor system is implemented with only two semiconductor chips.

Another advantage of the present invention is that the circuitry required for input-and-output device coupling is minimized. That is, separate clocking circuits for input-and-output devices has been eliminated.

Still another advantage of the present invention is that the system architecture takes advantage of restrictions imposed on large scale integration of semiconductor devices.

BRIEF DESCRIPTION OF THE DRAWINGS

FIG. 2 is a block diagram of the single-chip large scale integration central processing unit (CPU) of the microprocessor system of the present invention;

FIG. 3 is a block diagram of the sequential control circuit for the CPU;

FIG. 7 is a unitary diagram showing the relationship between FIGS. 7a and 7b;

FIGS. 7a and 7b are a combination logic and block diagram of the accumulator register, the status register and the arithmetic logic unit of the CPU;

FIG. 17 is a unitary diagram showing the realtionship between FIGS. 17a, 17b and 17c;

FIGS. 17a, 17b and 17c are a logic diagram illustrating the incrementer adder, address gating circuit, ROM select circuit, upper and lower bute transfer gates and the address multiplexer circuit for the ROM circuit;

DETAILED DESCRIPTION

Figure 1:
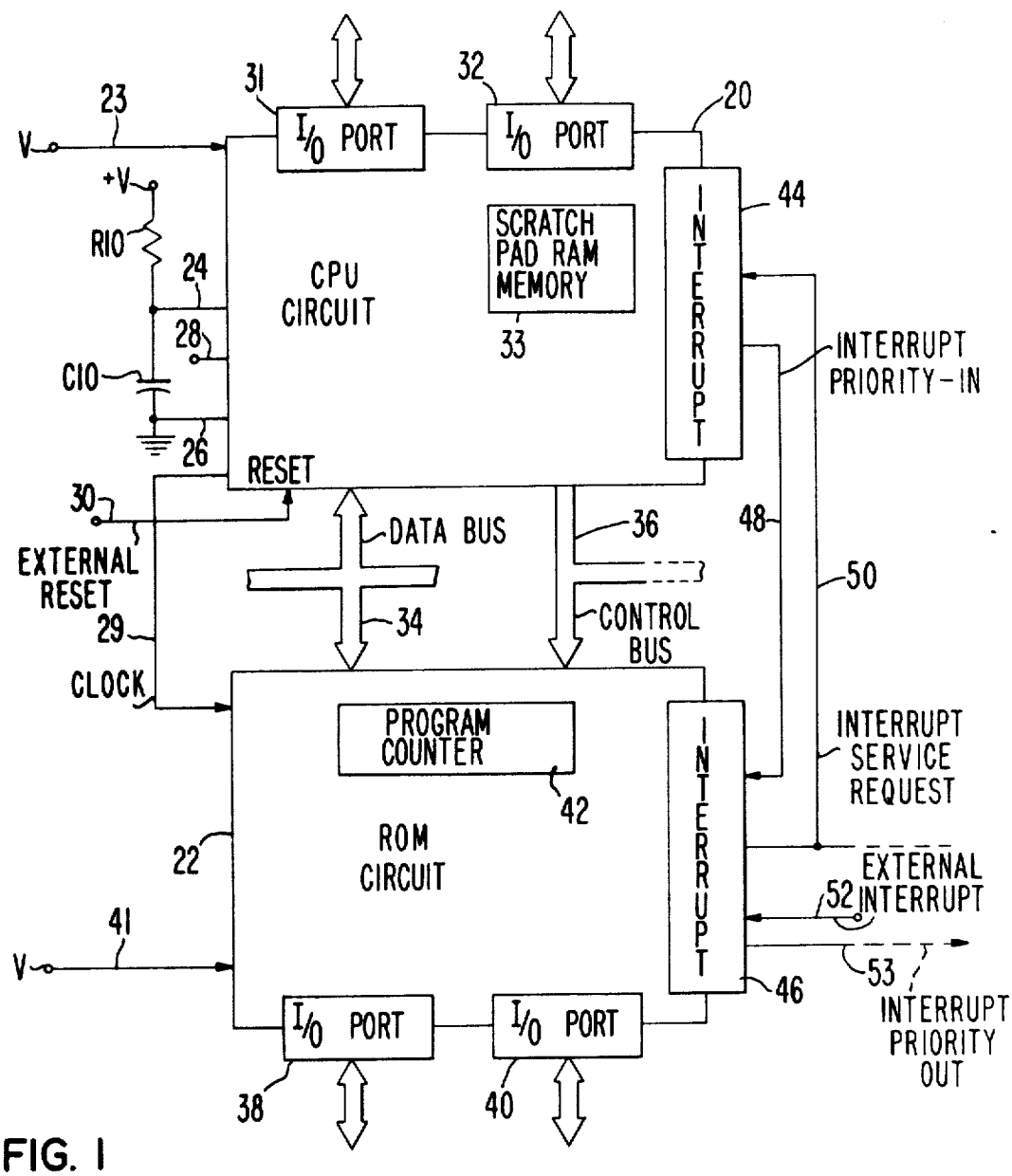
FIG. 1 is a block diagram of the microprocessor system of the present invention.

Referring now to the drawings and in particular to FIG. 1, a block diagram of one embodiment of the microprocessor system of the present invention is shown. The illustrated embodiment comprises two large scale integrated circuit chips; the first of which is a Central Processing Unit (CPU) 20, and the second is a Read Only Memory (ROM) circuit 22.

Voltage is supplied to the CPU 20 from one or more power supplies by means of input lines 23. The CPU circuit 20 operates in response to an internal oscillator having a frequency of operation determined by an RC circuit comprising a resistor R10 and a Capacitor C10. Resistor R10 is coupled between a source of positive voltage and a first input line 24 of the CPU circuit 20. Capacitor C10 is coupled between the input line 24 and an input line 26 of the CPU circuit 20. Line 26, for this particular circuit configuration, is also coupled to ground potential. A third input line 28 is provided for use with a different type of external circuit for oscillator reference that will be explained in greater detail hereinbelow.

Clock signals, which are generated within the CPU 20, are supplied to additional circuits of the system (e.g., the ROM circuit 22) by means of lines 29. These clock signals are employed for synchronizing the operation of the complementary circuits (e.g., the ROM circuit 22) of the system with the CPU 20 operation. An external reset signal is supplied to the CPU 20 by means of a line 30. The external reset signal, when supplied to the CPU, initiates operation at zero or the beginning address. A single external reset signal supplied on line 30 resets the complementary circuits as well as the CPU circuit. Normally, an external reset signal is not required.

The CPU circuit has two input-and-output ports (hereafter called I/O ports) 31 and 32, which I/O ports are employed for receiving data from or transmitting data to input-and-output devices (not shown). Each I/O port in this embodiment is capable of receiving or transmitting 8-bits of data, or an 8-bit byte. The CPU 20 also contains a random access memory (RAM) 33, which memory is employed by the CPU as a "scratch pad" memory while performing computations and operations.

The CPU circuit 20 is coupled to the ROM circuit 22 by means of a data bus 34. The data bus 34 is also employed for transmitting data to and receiving data from additional circuits (e.g., additional ROM circuits not shown) that may be employed with the microprocessor system of the present invention. In addition, a control bus 36 is coupled between the CPU circuit 20 and the ROM circuit 22, which transmits control signals generated within the CPU 20. The control bus 36 is also employed for transmitting control signals to additional circuits (not shown) that may be employed with the microprocessor system of the present invention. In addition, two I/O ports 31 and 32, are provided in the ROM circuit 22. Voltage is supplied to the ROM circuit 22 from one or more power supplies by means of input lines 41.

The ROM circuit 22 contains a program counter 42 for sequentially addressing a memory contained within the ROM circuit to effect retrieval of program instruction codes stored in the memory. The program instruction codes are used for directing operations of the microprocessor system.

Both the CPU 20 and the ROM circuit 22 have circuit provisions for interrupting normal program operations when data is to be accepted from or supplied to the input-and-output devices. In particular, the CPU 20 contains an interrupt circuit 44 and the ROM 22 circuit contain an interrupt circuit 46. An interrupt priority-in signal is supplied from the interrupt circuit 44 to the interrupt circuit 46 by means of a line 48. The interrupt priority-in signal is generated within the CPU 20 and operates to interrogate any interrupt requests which may exist within the system. When an input/output device requests service for an input or output operation, an interrupt service request signal is supplied from the interrupt circuit 46 to the interrupt circuit 44 by means of a line 50. The line 50 may also be connected to the interrupt circuits of additional ROM circuits (not shown), which may be employed with the system of the present invention.

An external interrupt signal may be supplied to the interrupt circuit 46 by means of an input line 52. An interrupt priority-out signal is supplied on a line 53 to other ROM circuits coupled to the system. An interrupt of the system operation occurs under one of two conditions. First, an external interrupt signal supplied on the line 52 in combination with an interrupt interrogate signal supplied on line 48 generates an interrupt service request signal on the line 50. Secondly, an interrupt priority-in signal in combination with an output signal from an internal timer (not shown in FIG. 1) will likewise generate an interrupt service request signal on the line 50. This will be further explained hereinbelow. The interrupt service request signal causes the CPU 20 to suspend normal operation and respond to or service the request for an input or output operation.

In operation, the CPU 20 generates all the necessary control and timing signals to operate the microprocessor system, and the CPU executes the operations specified in the program instruction codes which are stored in the ROM circuit 22. At least one memory circuit, such as the ROM circuit 22, is coupled to the CPU 20. The sequence of operations begins when the CPU 20 transmits control signals on the control bus 36 to the ROM circuit 22. The control signals effect the retrieval of instruction codes from the memory in the ROM circuit 22. The instruction codes thus retrieved are transmitted by means of the data bus 34 to the CPU circuit 20 for decoding and execution. The type of instruction code received by the CPU circuit 20 will determine the sequence of subsequent control signals transmitted on the control bus 36 to other circuits for carrying out the specified operations. Additional data may be retrieved from a memory, such as that within the ROM circuit 22, or data may be received from an I/O port (such as I/O ports 31, 32, 38 or 40) or output data may be supplied to one of the I/O ports.

Figure 1A:
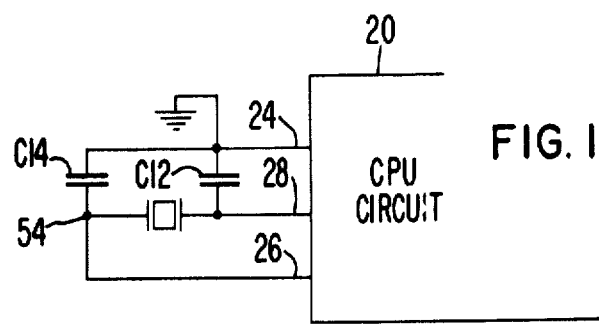
FIG. 1a is a schematic diagram of an alternate type of external circuit for controlling the frequency of the CPU internal oscillator.

Referring now to FIG. 1a, an alternate type of external reference circuit for the CPU oscillator is illustrated. In particular, input terminals 24, 26 and 28 of the CPU 20 may be coupled to a crystal oscillator circuit for applications requiring a precise frequency of operation. A capacitor C12 is coupled between input lines 24 and 28, and input line 24 is coupled to ground potential. A capacitor C14 is coupled between the input line 24 and a circuit point 54. A crystal is coupled between circuit point 54 and input line 28. Input line 26 is coupled directly to the circuit point 54.

Referring now to FIG. 2, a block diagram of the organization of the CPU circuit 20 is shown. The input lines 24, 26 and 28, which are coupled to an external reference circuit (FIGS. 1 and 1a), are connected to clock circuits 56. The clock circuits generate two clock signals for all circuits in the microprocessor system at a frequency determined by the external reference circuit. In particular, the two clock signals are supplied to all the CPU circuits by means of lines 58. For simplification of the drawings, the lines 58 are not shown connected to the individual circuits within the CPU 20. In addition, external clock signals are supplied on the lines 29 from the clock circuits 56 for synchronizing complementary circuits of the microprocessor system.

The data bus 34, which is coupled between the CPU 20 and the ROM circuit 22, is connected to an internal data bus 60 by means of a buffer circuit 62. The I/O ports 31 and 32 are coupled between I/O devices (not shown) and the internal data bus 60. The internal data bus 60 is coupled in parallel to an instruction register 64 by means of lines 65 and to a transfer gate 66 by means of lines 67, respectively. The output of the transfer gate 66 is coupled to a right multiplexer bus 68 by means of lines 69. The instruction register 64 is coupled to the right multiplexer bus 68 by means of lines 70, to the address input of the random access memory 33 by means of lines 71, and to a sequential control circuit 72 by means of lines 73.

In accordance with a preferred embodiment, data bus 34, internal data bus 60, and lines 65 and 67 each comprise 8 lines. The right multiplexer bus 68, and lines 69 and 70 each comprise 8 lines. The lines 71 coupling the instruction register to the register 88 comprise 4 lines, whereas the lines coupling the register 88 to the RAM 33 comprises 6 lines. The lines 73 coupling the instruction register 64 to the control circuit 72 comprise 16 lines.

The sequential control circuit 72, which essentially comprises a programable logic array in this embodiment, decodes the program instruction codes stored in the instruction register, and paces all the system timing and data transfers for program execution. In particular, the control circuit 72 comprises a state register and a control ROM. A typical program logic array, which may be employed for the sequential control circuit 72, is illustrated in greater detail in FIG. 3, and will be described further hereinbelow. The contents of the instruction register 64 are supplied to the control circuit 72 by means of lines 73, and the CPU 20 timing and data transfer operations are paced by means of signals supplied on lines 74 to all circuits within the CPU. The timing and data transfer operations for the ROM circuit 22 and other complementary circuits of the system are controlled by means of signals supplied from the control circuit 72 on the line 36.

The interrupt logic 44 operates in response to the interrupt service request signal supplied on the line 50. The output of the interrupt logic 44 is coupled to the control circuit 72 by means of a line 75. In addition, the interrupt interrogate signal is supplied to the ROM 22 (and other complementary circuits not shown) by means of the line 48. Signals indicative of the state of the control circuit 72 are supplied to the interrupt logic 44 by means of lines 77.

The external reset signal, which is supplied on the line 30, is applied to the input of a power-on-detect circuit 76. The power-on-detect circuit operates to initiate operation of the microprocessor system at zero or the beginning address. In particular, a detection of "power up" causes the CPU 20 to disable the interrupt system and load the program counter 42 in the ROM 22 with all zeros before execution of operation begins. An output signal from the power-on-detect circuit 76, which indicates "power up", is supplied to the control circuit 72 by means of a line 78. In addition, a signal supplied from the control circuit 72, which indicates a power-on clear, is supplied to the power-on-detect circuit 76 by means of a line 79.

Figure 7B:
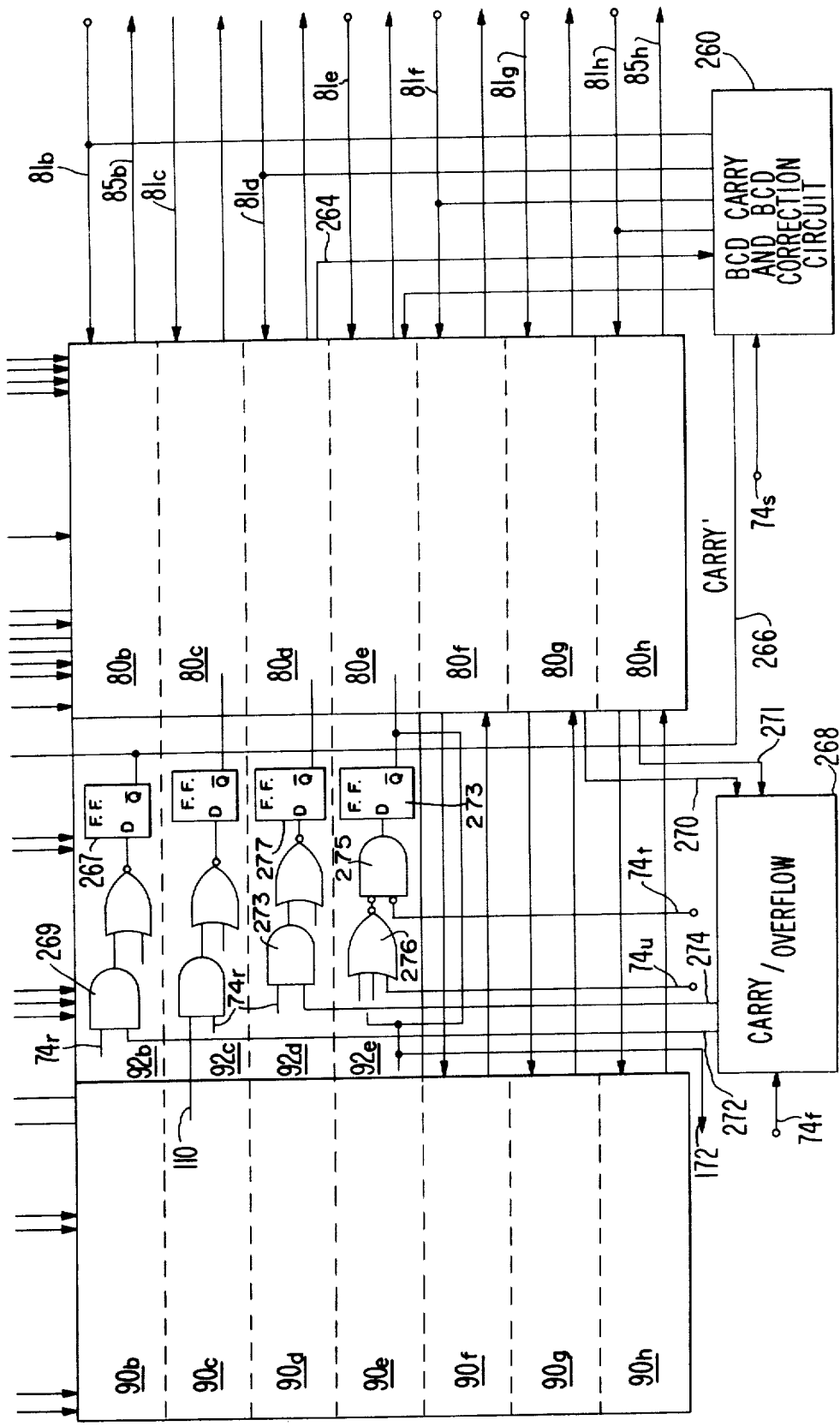

Arithmetic operations are performed in the CPU 20 by means of an arithmetic logic unit 80 (ALU). Arithmetic logic units are well known in the art, however the ALU used in this embodiment is illustrated in FIGS. 7a and 7b, and will be explained further hereinbelow. The ALU employed in this embodiment of the microprocessor system is a typical 8-bit parallel logic network which has the capability of performing logical functions, and operates in response to two operands. The first operand is supplied to ALU 80 from the right multiplexer bus 68 by means of lines 81. The second operand is supplied to ALU 80 from a left multiplexer bus 82 by means of lines 83. The output of the ALU 80 is supplied to a result bus 84 by means of lines 85.

In this embodiment, the result bus 84 comprises 8 lines and transmits data in the form of 8-bit bytes to the RAM 33 by means of lines 86; to an indirect RAM address register 88 by means of lines 89; to an accumulator register 90 by means of lines 91; to a status register 92 by means of lines 93; and, to a transfer gate 94 by means of lines 95. The outputs of the RAM 33 and the indirect RAM address register 88 are coupled to the right multiplexer bus 68 by means of lines 96 and 97, respectively. The outputs of the registers 90 and 92 are coupled to the left multiplexer bus 82 by means of lines 98 and 99, respectively. The output of the transfer gate 94 is coupled to the internal data bus 60 by means of lines 100.

In operation, the sequence begins when the sequential control circuit 72 transmits the necessary control signals by means of the control bus 36 to the ROM circuit 22 for retrieving an instruction code from the memory. The instruction code is transmitted by means of the data bus 34 to the buffer cirucit 62, where the instruction code is gated onto the internal data bus 60. The instruction code is then loaded into the instruction register 64 by means of the lines 65. The status of the outputs of the instruction register 64 are transmitted to the sequential control circuit 72 by means of lines 73 for decoding. The resultant decoding establishes the control sequence in executing the particular instruction code stored in the instruction register. The sequential control circuit 72 transmits a multiplicity of signals in a series of timing intervals to the complementary circuits of the CPU 20 and the ROM circuit 22 by means of the lines 36, 74 and 77. These control signals enable each of the individual complementary circuits to function in a manner which completes the particular instruction code specified by the binary contents stored in the instruction register 74.

Typically, most instruction codes specify that two 8-bit bytes, also called operands, are combined arithmetically in the ALU 80. A first of these two operands is normally supplied from the accumulator register 90, and transmitted to the ALU 80 by means of lines 98, left multiplexer bus 82 and lines 83. The second operand is usually supplied from one of several sources as determined by the instruction code stored in the instruction register 64. For example, the second operand may be supplied from the RAM 33, the indirect RAM address register 88, or external data supplied by means of the internal data bus 60 and the transfer gate 66. The ALU 80 combines the two operands supplied from the left multiplexer bus 82 and the right multiplexer bus 68 by means of lines 83 and 81, respectively, and derives a result which is transmitted to the result bus 84 by means of the lines 85. The result derived in the ALU 80 may be stored in the RAM 33, the indirect RAM address register 88, the accumulator register 90, the status register 92, or it may be supplied to external circuits by means of the transfer gate 94, and I/O port or the buffer 62.

If the second operand is to be supplied by the RAM 33, an address code is supplied to the RAM 33 from either the indirect RAM address register 88 or the four least significant bits of the instruction register 64 by means of the lines 71. The instruction code stored in the instruction register 64, which is decoded by the sequential control circuit 72, determines which of the two sources of the RAM 33 address is to be used.

In some of the instruction codes to be executed by the CPU 20, the ALU 80 generates status information concerning the nature of the results supplied at the output of the ALU 80 on the lines 85. This status information is transmitted to the status register 92 by means of lines (not shown), which will be described further hereinbelow, and is stored in the status register for future use in response to subsequent instruction codes.

Output instruction codes, which are frequently employed, direct the transfer of the contents of the accumulator register 90 to a particular I/O port, or to the data bus 34 by means of the buffer 62. The output instruction code contains an address that designates which of the I/O ports or the buffer 62 is to receive the contents of the register 90. In particular, the sequential control circuit 72 initially generates the required control signals and supplies these signals on the lines 36 to the ROM circuit 22. The control signals direct the retrieval of the next instruction code (hereof, output instruction) from the memory within the ROM circuit 22. The instruction code thus retrieved is transmitted by means of the data bus 34, through the buffer 62 to the internal data bus 60 for storage in the instruction register 64. The output instruction code is supplied to the sequential control circuit 72 by means of the lines 73 for decoding. The sequential control circuit 72 decodes the output instruction code, and in response thereto transmits the required control signals on the lines 74 to effect the connection of internal data paths between the accumulator register 90 and the address I/O port or buffer 62. The internal data path is from the output of the accumulator register 90 to the left multiplexer bus 82 by means of the lines 98, through the ALU 80 to the result bus 84 without modification, through the transfer gate 94 to the internal data bus 60, and then to the addressed I/O port or buffer 62. The I/O ports employed in the present invention are adapted for storing an 8-bit byte of data by means of latches which will be explained in greater detail hereinbelow.

Input instruction codes, which are also frequently employed, direct the transfer of an 8-bit byte of data from an I/O port to the accumulator register 90. The input instruction code is retrieved from the memory in the ROM circuit 22 in the same manner as described above for retrieval of the output instruction code. The sequential control circuit 72 transmits control signals on the lines 74, which subsequently address an I/O port to accept data from the external I/O device. Data received by an I/O port (e.g., I/O port 31 or 32) is transmitted along the internal data bus 60, through the transfer gate 66, along the right multiplexer bus 68, through the ALU 80 without modification, along the result bus 84, and finally to the accumulator register 90 for storage.

In summary, each of the instruction codes for the microprocessor of the present invention effect unique system functions in a manner similar to that described above. The sequence of operation always begins with the retrieval of the next instruction code to be executed from the ROM circuit 22, and the storing of this instruction code in the instruction register for decoding and execution thereof. The instruction code is always decoded by the sequential circuit 72, whereupon the system control signals are derived and transmitted to the complementary circuits of both the CPU 20 and the ROM 22 circuits by means of the lines 36, 74, and 77. The control signals activate the complementary circuits in such a way as to complete the operation called for by the instruction code. At the completion of each instruction code, the sequential control circuit 72 transmits control signals on the lines 36 to direct the retrieval of the next instruction code to be decoded and executed. Thus, a specific microprocessor system operation can be implemented by storing in advance a sequence of instruction codes in the ROM circuit 22, wherein the order of the instruciton codes determines the system function to be performed.

Figure 11:
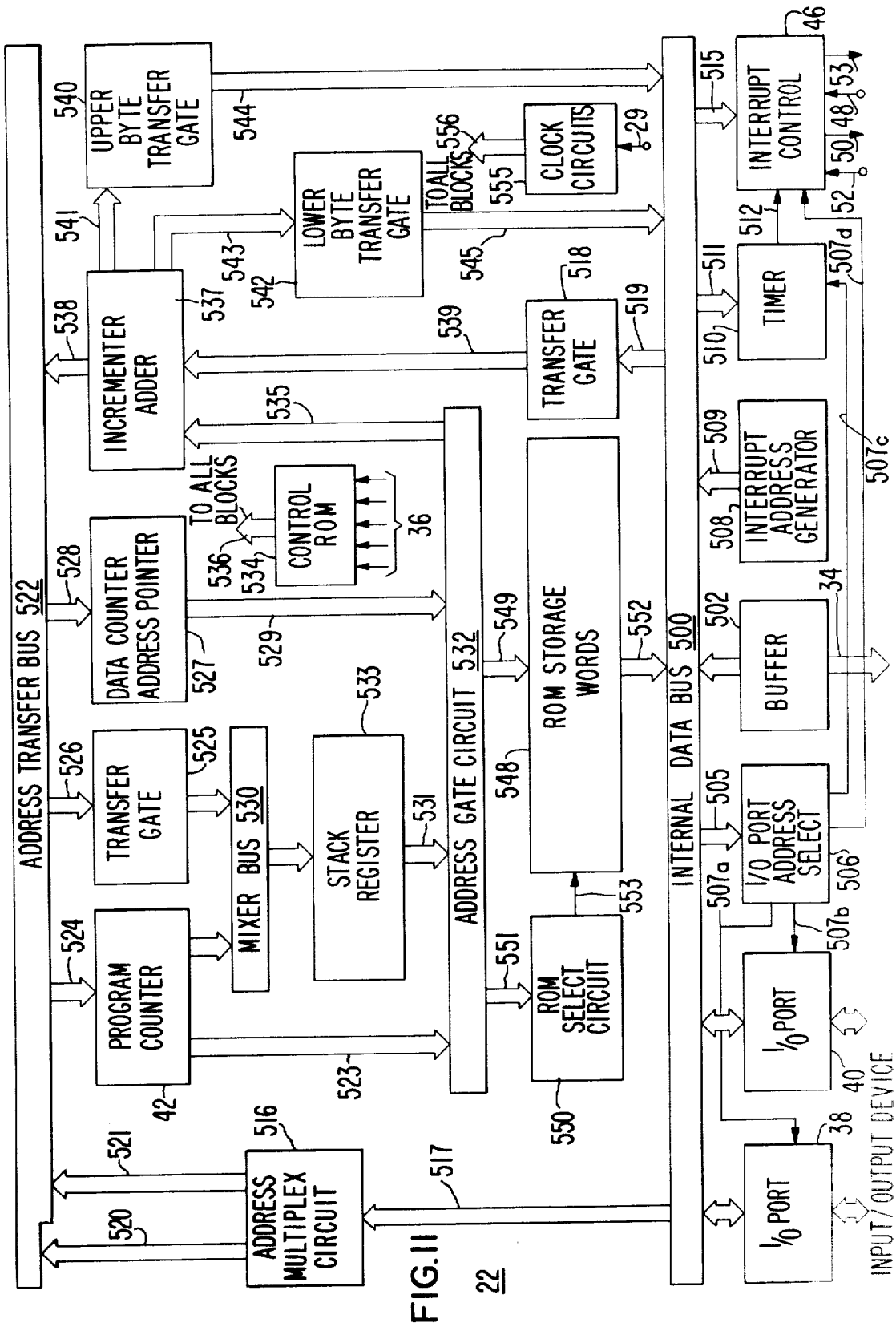
FIG. 11 is a block diagram of the single-chip large scale integration ROM circuit of the present invention.

In the detailed description that follows, the individual circuits of the CPU 20, as delineated by the blocks in FIG. 2, are described in greater detail. In addition, a block diagram showing the organization of the ROM circuit 22 is illustrated in FIG. 11 and described hereinbelow, which is followed by a detailed illustration and description of the individual circuits of the ROM circuit.

Figure 2A:
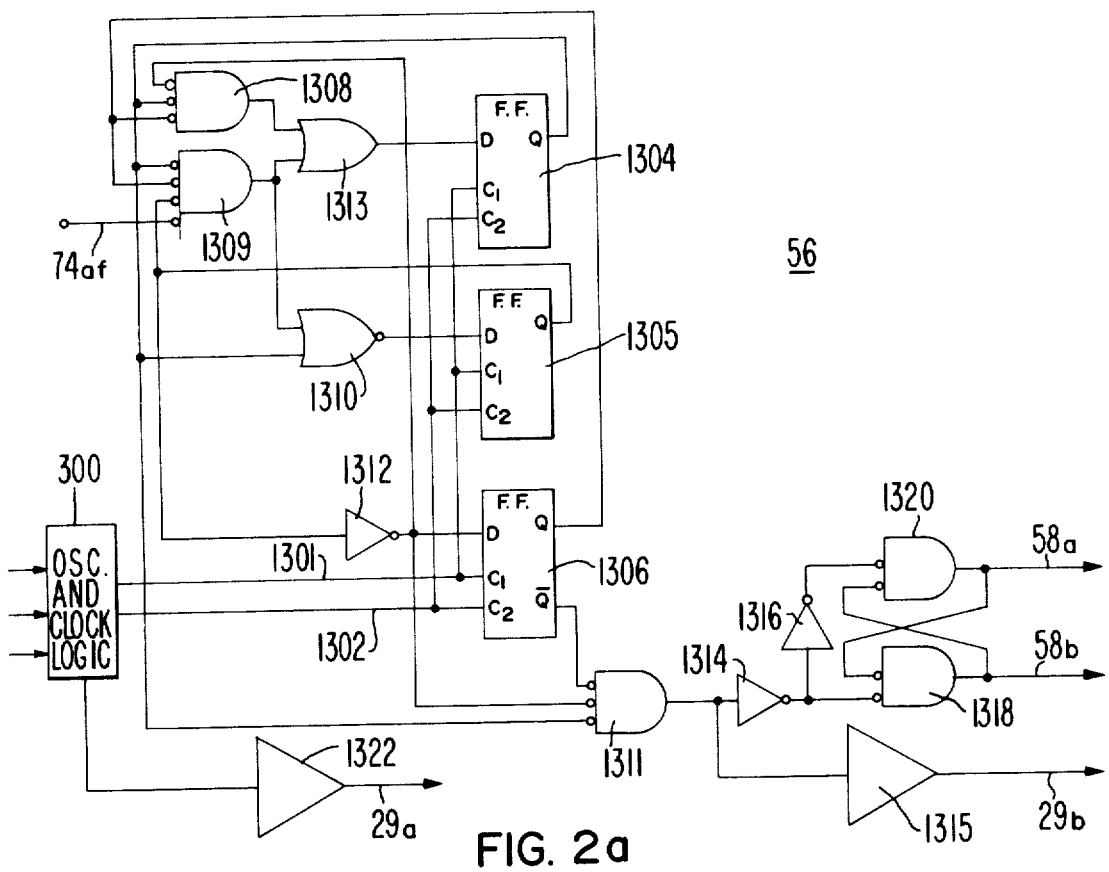
FIG. 2a is a logic diagram of the clocking circuits 56.

Referring now to FIG. 2a, a combined logic-block diagram of the clock circuits 56 is illustrated. Input terminals 24, 26 and 28 are coupled to an oscillator and clock logic 1300. The oscillator 1300 has a preferred operating range from 500 kilohertz to 2 megahertz.

Two clock signals are supplied from the oscillator 1300 on lines 1301 and 1302, respectively. The lines 1301 and 1302 are coupled to the $C_1$ and $C_2$ inputs of flip-flops 1304, 1305 and 1306. The true (Q) output of the flip-flop 1304 is coupled to the first of three inverted inputs of an AND gate 1308, to the first of four inverted inputs of an AND gate 1309, to the first of two inputs of a NOR gate 1310, and to the first of three inverted inputs of an AND gate 1311. The true (Q) output of the flip-flop 1305 is coupled to a second inverted input of the AND gate 1309, and to the input of an inverter 1312. The output of the inverter 1312 is coupled to the "D" input of the flip-flop 1306, to a second inverted input of the AND gate 1311, and to a second inverted input of the AND gate 1308. The true (Q) output of the flip-flop 1306 is coupled to the third inverted inputs of the AND gates 1308 and 1309. The not true ($\bar{Q}$) of the flip-flop 1306 is coupled to the third inverted input of the AND gate 1311.

The fourth inverted input of the AND gate 1309 is coupled to a line 74af from the control circuit 72. The signal supplied on the line 74af operates to cause the clock circuits to count six clock signals per machine cycle in lieu of the four clock signals per machine cycle normally employed. The output of the AND gate 1308 is coupled to the first of two inputs of an OR gate 1313. The output of the AND gate 1309 is coupled to the second input of the OR gate 1313 and to the second input of the NOR gate 1310.

The output of the AND gate 1311 is coupled to the input of an inverter 1314, and to the input of an amplifier-driver 1315. The output of the amplifier-driver 1315 is coupled to the line 29b, which transmits a first synchronization signal to complementary circuits (e.g., ROM circuit 22) of the system. The output of the inverter 1314 is coupled to the input of an inverter 1316, and to the first of two inverted inputs of an AND gate 1318. The output of the inverter 1316 is coupled to the first of two inverted inputs of an AND gate 1320. The output of the AND gate 1320 is coupled to a line 58a of the lines 58 (FIG. 2), and to the second inverted input of the AND gate 1318. The output of the AND gate 1318 is coupled to a line 58b, and to the second inverted input of the AND gate 1320.

A single clock signal is generated by the oscillator (not shown) within the oscillator and clock logic 1300 which is employed for generating the two complementary clock signals supplied on the lines 1301 and 1302. The single clock signal from the oscillator is supplied to the input of an amplifier-driver 1322. The output of the amplifier-driver 1322 is coupled to the line 29a, which transmits a second synchronization signal to the complementary circuits of the system.

Figure 2B:
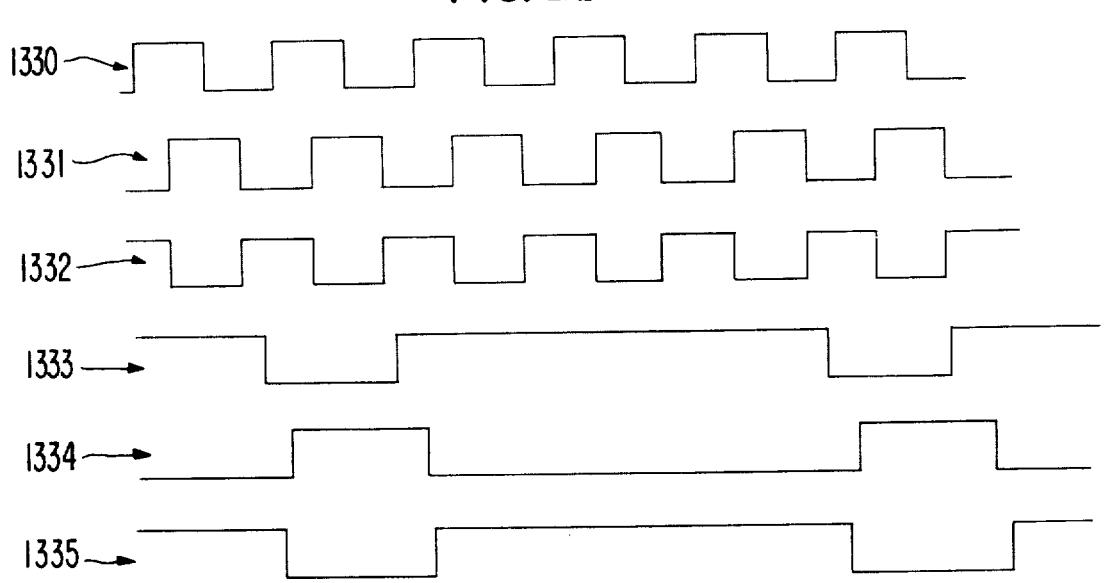
FIG. 2b is a timing diagram illustrating the timing relationship of the clock signals generated in the clock circuits 56.

Referring now to FIG. 2b, a timing diagram of the circuit illustrated in FIG. 2a is illustrated. Waveform 1330 represents the single clock signal generated by the oscillator (not shown) in the oscillator and clock logic 1300. Waveform 1330 also represents the second synchronization signal supplied on the line 29a through the amplifier-driver 1322 (FIG. 2a). Waveforms 1331 and 1332 represent the clock signals supplied on the lines 1301 and 1302, respectively. Waveform 1333 represents the signal appearing at the output of the AND gate 1311, and the first synchronization signal supplied on the line 29b. Waveforms 1334 and 1335 represent the clock signals supplied on the lines 58a and 58b, respectively.

The frequency of the clock signals supplied on the lines 58a and 58b can be changed as a result of a signal supplied on the line 74af. When a low level signal is supplied on the line 74af six cycles of the clock signals as represented by the waveforms 1331 and 1332 are required to generate a single cycle of the clock signals to be supplied on the lines 58a and 58b (i.e., waveforms 1334 and 1335) in lieu of the four cycles normally required as illustrated.

Referring now to FIG. 3, the organization of the sequential control circuit 72, and connections to the instruction register 64 are illustrated in greater detail. In one embodiment, instruction register 64 comprises 8 flip-flops where each of the lines 65 are connected to corresponding data ("D") inputs of each of the 8 flip-flops, respectively. The lines 73 which are connected between the instruction register 64 and the sequential control circuit 72 are connected to a portion of the address input of the Read Only Memory (ROM) 102. Both the true and not true outputs of each flip-flop within the register 64 are connected to the address input of ROM 102. The true output of the low-order four flip-flops of register 64 comprise the lines 71. Two clock signals are supplied to the clock inputs of the register 64 by means of the lines 58 (FIG. 2).

The clock signals supplied on the lines 58 are also connected to the clock inputs of a state register 106. State register 106 comprises four flip-flops having both the true and not true output terminals coupled to a portion of the address input of the ROM 102. Four output terminals of the ROM 102 are coupled to the input terminals of the four flip-flops within the register 106 by means of lines 108. The lines 108 comprise the state lines for the sequential control circuit 72, and indicate the last state of the circuit 72 (or a portion of the last output code of the ROM 102). The three low-order positions of the lines 108 comprise the lines 77, which are coupled to the input of the interrupt logic 44 and to the instruction register 64 (FIG. 2). The line 75 from the interrupt logic 44 is coupled to the high-order position of the state register 106 to preclude setting the high-order flip-flop under certain interrupt conditions to be explained in greater detail hereinbelow.

Four additional address input signals are supplied to the ROM 102 by means of lines 110 and 112 in combination with inverters 114 and 116. Line 110 is coupled, by means of logic circuits, across the result bus 84, and the inverter 114 inverts the signal supplied from the result bus 84, thereby simultaneously providing both the true and the complement of this signal to the ROM 102 input address. The signal supplied on the line 112 is provided by the indirect RAM address register 88. In a similar manner, inverter 116 inverts the signal supplied on the line 112, thereby providing simultaneously both the true and the complement of this signal to the ROM 102 address input. The five lines 36, which transmit the control signals to the complementary circuitry of the system, are coupled to output terminals of the ROM 102. The lines 74, which transmit control signals to the complementary circuitry within the CPU, are coupled to the remaining output terminals of the ROM 102.

The ROM 102 is a typical read-only memory well known in the prior art. The ROM 102 comprises a multiplicity of cells arranged in groups, which cells store binary digits (zero or one). Each group of cells stores a unique binary number. When an address for a specific group of cells is provided at the address input of the ROM 102, the binary number stored in that group of cells is supplied at the output thereof (lines 36, 74 and 108). With reference to the system of the present invention, each binary number stored within each group of cells constitutes specific circuit control signals which are retrieved from the ROM 102 in response to an instruction code (i.e., the address) applied at the address input of the ROM 102. The state register 106 stores a portion of the ROM address from a portion of the binary number previously retrieved at the output of the ROM 102, which portion is referred to herein as the "next" state.

Each unique combination of binary numbers supplied to the ROM address input in combination with the output of the state register 106 and the lines 110 and 112 will effect a retrieval from the ROM 102 of a unique sequence of output signals which are supplied on the lines 36, 74 and 108. The output signals supplied on the lines 108 modify the state register 106 to reflect the next state of the sequential control circuit 72. Thus, for a given input signal condition on the lines 73 from the instruction register 64 the output signals on the lines 36 and 74 will change depending upon the next state indicated by the state register 106. Accordingly, the sequential control circuit 72 responds to input stimuli supplied on the lines 73 in a manner which is determined by the previous state of the responses from the sequential control circuit 72 as determined by the current state in the state register 106. The design of sequential control circuits is well documented in technical publications available to those skilled in the art. One such text is "Logic Design of Ditigal Computers" by Montegomery Thister, and published by John Wiley, 1958.

Figure 4:
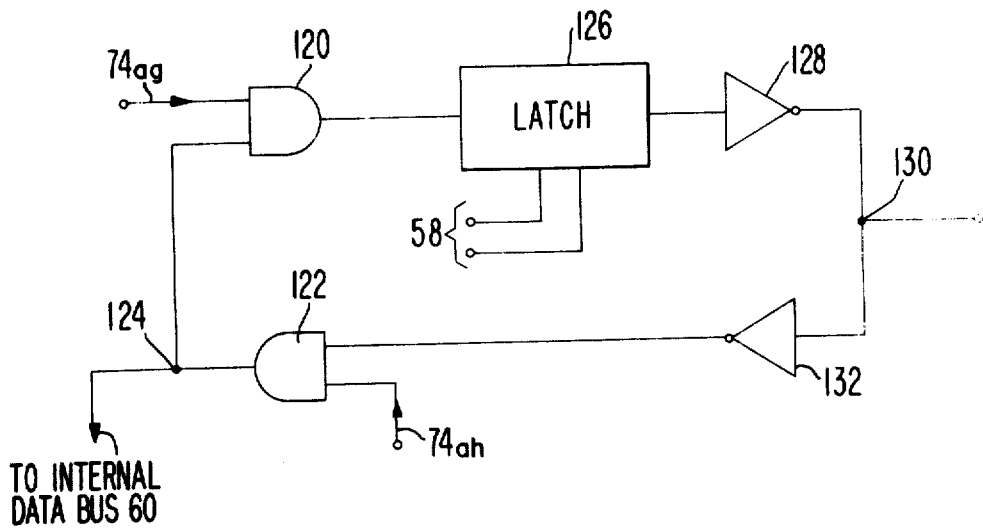
FIG. 4 is a logic diagram of the one bit position of a typical input-and-output port.

Referring now to FIG. 4, a single typical stage of an I/O port 31, 32, 38 or 40 as employed in the present invention is illustrated. The first of two inputs of an AND gate 120 is connected to a line 74ag from the control circuit 72 which transmits a signal decoded from an output instruction code. The second input of the AND gate 120 is coupled to the output of an AND gate 122 at a circuit point 124, which is coupled to one of the lines within the internal data bus 60. The output of the AND gate 120 is coupled to the input of a latch circuit 126.

The latch circuit 126 is operated in response to the clock signals supplied on lines 58. The output of the latch 126 is coupled to the input of an inverter 128, and the output of the inverter 128 is coupled to a circuit point 130. The circuit point 130 is coupled to the input-and-output device (not shown). Circuit point 130 is also coupled to the input of an inverter circuit 132, and the output of the inverter 132 is coupled to one of two inputs of the AND gate 122. The second input to the AND gate 122 is coupled to the circuit 72 by means of a line 74ah.

In operation, data is supplied to the I/O port from an input-and-output device at the circuit point 130. The logic level of the data is inverted by inverter 132 and subsequentially applied to the first input of the AND gate 122. When a control signal is applied to the second input of the AND gate 122 on the line 74ah the data is provided at the output of the AND gate 122 and is supplied to the internal data bus 60.

When data is to be supplied to the external input-and-output device (not shown), the data is supplied from the internal data bus 60 to the input of the AND gate 120. When a control signal is supplied to the second input of the AND gate 120 on the line 74ag the data is applied at the input of the latch 126. The subsequent two clock signals on the lines 58 will cause the latch 126 to set, and the data (logic level 0 or 1) will appear at the circuit point 130 at an inverted logic level as a function of the inverter 128. Accordingly, it may be seen that data is supplied to the internal data bus 60 through the I/O port in response to a first control signal on the line 74ah from the circuit 72, and data is also supplied from the data bus 60 to the input-and-output device in response to a second control signal on the line 74ag from the control circuit 72.

Figure 5:
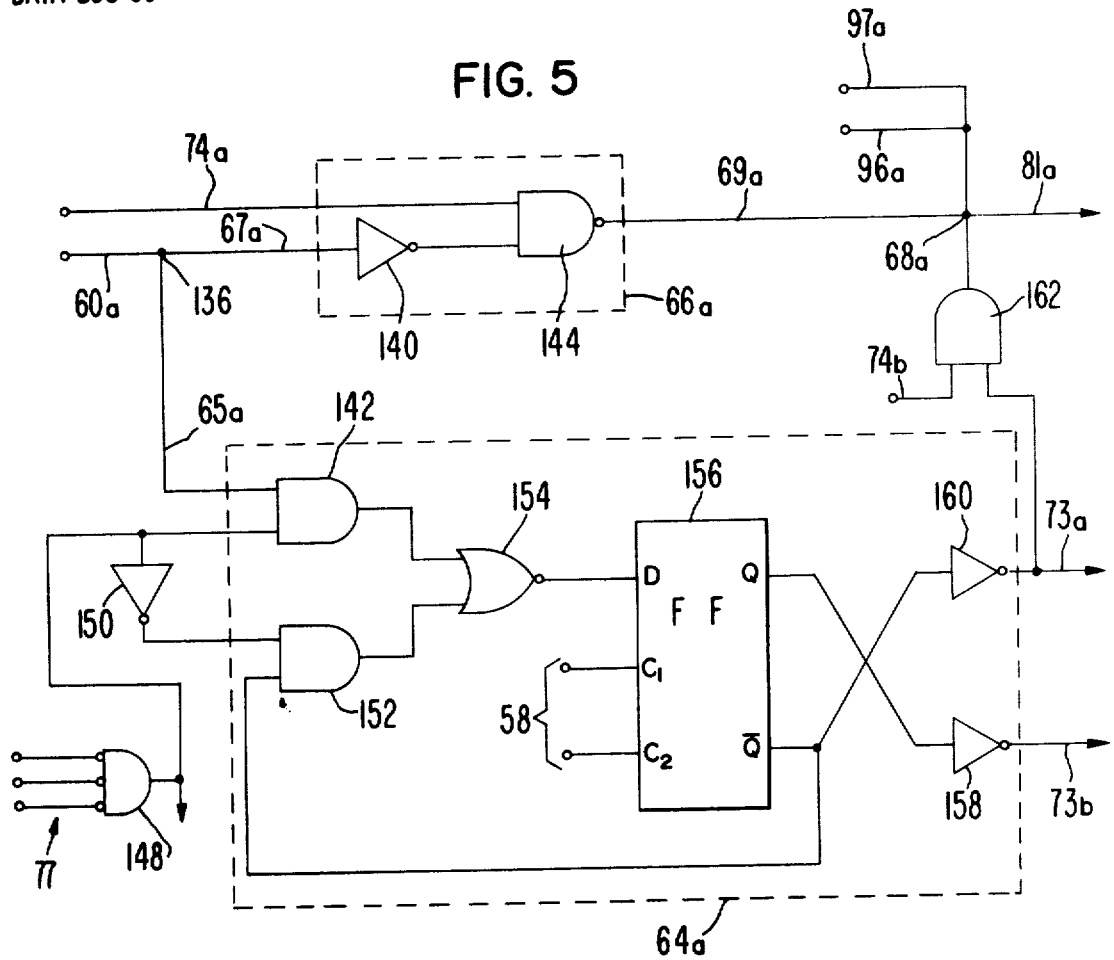
FIG. 5 is a logic diagram of one bit position of the transfer gate and instruction register within the CPU.

Referring now to FIG. 5, the first bit position of the transfer gate 66 and the instruction register 64 are shown in logic diagram form. The first bit position of the internal data bus 60 is coupled to a circuit point 136 by means of a line 60a of the lines 60. The circuit point 136 is connected to the input of an inverter 140 by means of a line 67a of the lines 67, and to one of the two inputs of an AND gate 142 by means of a line 65a of the lines 65 (FIG. 2). The output of the inverter 140 is coupled to one of two inputs of a NAND gate 144. A control signal from the control circuit 72 is supplied to the second input of the NAND gate 144 by means of a line 74a. The output of the NAND gate 144 is coupled to a circuit point 68a by means of line 69a which is the first of the lines 69 (FIG. 2). The inverter 140 and the NAND gate 144 comprise the first bit position 66a of the transfer gate 66.

The circuit point 68a is coupled to the first bit position of the ALU 80 by means of a line 81a. The first bit position of the RAM 93 is coupled to the circuit point 146 by means of a line 96a, and the first bit position of the indirect RAM address register 88 is also coupled to the circuit point 146 by means of a line 97a.

The state lines 77 from the output of the ROM (FIG. 3) are coupled to the three inverted inputs of an AND gate 148. Each of the three inputs to the AND gate 148 are inverted as indicated by the convention shown in the figures of open circles adjacent to each of the respective inputs. The output of the AND gate 148 is coupled to the second input of the AND gate 142, and to the input of an inverter 150. In addition, the output of the AND gate 148 is coupled to the remaining bit positions (not shown) of the instruction register 64a.

The output of the inverter 150 is coupled to one of two inputs of an AND gate 152. The outputs of the AND gate 142 and 152 are coupled to the two inputs of a NOR gate 154. The output of the NOR gate 154 is coupled to the "D" input of a flip-flop 156. The system clock signals are applied to the clock inputs ($C_1$, $C_2$) of the flip-flop 156 by means of the lines 58 from the clock circuits 56 (FIG. 2). The flip-flop employed herein operate by gating the logic level applied at the "D" input thereof into the flip-flop in response to a first clock signal applied at the $C_1$ input terminal, and by setting the flip-flop in response to a second clock signal applied at the $C_2$ input terminal. When the flip-flop is set, the logic level that was applied at the "D" input appears at the true (Q) output and the complement thereof appears at the not true ($\overline{Q}$) output.

The true (Q) output of the flip-flop 156 is coupled to the input of an inverter 158. The output of the inverter 158 is supplied on line 73b, which constitutes one of the lines 73 supplied to the control circuit 72 (FIGS. 2 and 3). The not true ($\overline{Q}$) output of the flip-flop 156 is coupled to the second output of the AND gate 152 and to the input of an inverter 160. The output of the inverter 160 is supplied on the line 73a, which constitutes one of the lines 73 coupled to the control circuit 72 (FIGS. 2 and 3). In addition, the output of the inverter 160 is coupled to one of two inputs of a NAND gate 162. The second input of the NAND gate 162 is supplied from the control circuit 72 by means of a line 74b. The output of the NAND gate 162 is coupled to the circuit point 68a by means of a line 70a of the lines 70 (FIG. 2). Accordingly, it may be seen that the circuit point 68a constitutes the low-order position of the right multiplexer bus 68.

In operation, a bit of binary data is supplied on the line 60a to the input of the inverter 140 and the input of the AND gate 142. This bit of data will be transferred through the transfer gate 66 when a signal is supplied on the line 74a to the circuit point 146, which comprises the low-order position of the right multiplexer bus 68. When the lines 77 are all at a low level (which occurs during states 0 and 8 of the state register 106, FIG. 3), a high level signal appears at the output of the AND gate 148, which signal is supplied at the input of the inverter 150 and the second input of the AND gate 142. Accordingly, when a high level signal is present at the output of the AND gate 148 and a bit of data is supplied on the line 60a, this bit of data will appear at the output of the AND gate 142 and at the input of the NOR gate 154.

Assume, for example, that the bit of data is a logic one level, then the output of the NOR gate 154 will be at a low level. This low level signal will be set into the flip-flop 156 following the consecutive application of the clock signals to the $C_1$ and $C_2$ inputs of the flip-flop. The true output (Q) of the flip-flop 156 will be at a low level and the not true output ($\bar{Q}$) will be at a high level. On the other hand, assume that a binary zero, or logic level zero, is supplied on the line 60a, then the output of the AND gate 142 will be at a low level. If the output of the AND gate 152 is also at a low level, then the output of the NOR gate 154 will be at a high level. The output of the AND gate 152 will be at a low level if the flip-flop 156 is in a set state (i.e., a logic zero at the not true output of the flip-flop) or the output of the AND gate 152 will be at a low level when the output of the AND gate 148 is at a high level (e.g., states 0 or 8).

If a high level signal is applied at the "D" input of the flip-flop 156, then the flip-flop will be set and a logic one (1) will appear at the true output (Q) of the flip-flop. The status of the logic level on the line 73a will be transferred through the NAND gate 162 when a control signal is supplied on the line 74b. Accordingly, the application of a control signal on the line 74b will transfer the contents of the instruction register 64, by means of lines 70, to the right multiplexer bus 68.

Figure 6:
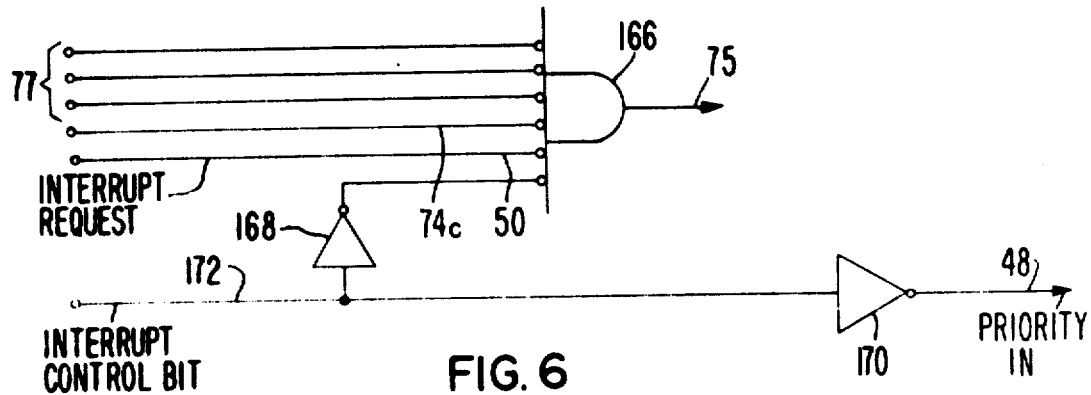
FIG. 6 is a logic diagram of the interrupt logic within the CPU.

Referring now to FIG. 6, the interrupt logic 44 is illustrated in greater detail. The lines 77 are coupled to three of six inverted inputs of an AND gate 166. All of the inputs of the AND gate 166 are inverted as indicated by the convention in the figures of open circles adjacent to the respective inputs. A line 74c from the control circuit 72 (FIG. 3) is coupled to the fourth inverted input of the AND gate 166. The signal supplied on the line 74c prevents an interrupt from occuring in response to an interrupt service request signal when preselected instruction codes are loaded into the instruction register. The preselected codes are those particular codes where an interrupt would be undesirable. The line 50, which transmits the interrupt request signal, is coupled to the fifth inverted input of the AND gate 166. An interrupt control bit, which is supplied from the high-order position of the status register 92, is supplied to the inputs of inverters 168 and 170 by means of a line 172.

The output of the inverter 168 is coupled to the sixth inverted input of the AND gate 166.

The output of the AND gate 166 is supplied to the control circuit 72 by means of the line 75 (FIG. 2). The output of the inverter 170 is coupled to the line 48, which line transmits the priority-in signal from the interrupt logic 44.

In operation an interrupt control bit, which is supplied from the high-order position of the status register 92, is inverted by the inverter 170 and is supplied on the line 48 as the "priority in" signal. The output of the AND gate 166 is at a high-logic level only under the condition where all of the 6 inputs to the AND gate 166 are at a low-level. The lines 77 constitute the three low-order positions of the state lines 108 (FIG. 3). Thus when the state register 106 contains a binary number having a decimal equivalent of zero or eight then the lines 77 are all at a low-logic level. When the signal on the line 74c is at a low level, the interrupt service request signal on line 50 is at a low level, the interrupt control bit on the line 172 is at a high-level then the output of the AND gate 166 is at a high level. This high level signal is supplied on the line 75 to the sequential control circuit 72 (FIG. 3). As stated hereinabove, a high level signal on the line 75 will inhibit the setting of the highest-order (fourth order) flip-flop in the state register 106, which will preclude the normal control signal generation by the circuit 72 when an interrupt occurs.

Referring now to FIG. 7, a unitary diagram of the relationship of the sheets illustrating FIGS. 7a and 7b is shown. FIG. 7a illustrates in logic diagram form the lowest-order position of the combination of the ALU 80, accumulator register 90, and the status register 92, and FIG. 7b illustrates the balance of the circuitry in block-diagram form. With reference to FIG. 7a, the portion of the logic diagram enclosed within dashed line 90a constitutes the low-order position of the accumulator-register 90, the portion of the diagram enclosed within the dashed line 92a constitutes the low-order position of the status register 92; and, the portion of the diagram enclosed within the dashed line 80a constitutes the low-order position of the ALU 80.

Data are entered into the ALU 80 by means of lines 81 from the right multiplexer bus 68 (FIG. 2). The low-order position of the data transmitted on the lines 81 is applied to the low-order position 80a of the ALU 80 by means of a line 81a. Line 81a is coupled to the input of an inverter 180, and the output of inverter 180 is coupled to one side of a field effect transistor (FET) 182. The gate terminal of the FET 182 is connected to the second clock signal line 58b of the clock lines 58. The second side of the FET 182 is coupled to the input of an AND gate 184, a NOR gate 186, and a NAND gate 188. The first of three logic control signals (hereafter T1) is supplied on a line 74e which is coupled to a second input of the AND gate 184. The second of the three logic control signals (hereafter T2) is supplied on line 74c which is coupled to the input of the NOR gate 186. The third of the three logic control signals (hereafter T3) is supplied on line 74g which is coupled to an input of the NAND gate 188. The logic control signals I1, I2, and I3 control logic operations to be performed within the ALU 80. The third inputs of the AND gate 184, the NOR gate 186, and the NAND gate 188, are coupled to the output of a NOR gate 190 by means of a line 83a of the lines 83.

The output of the AND gate 184 is coupled to one of two inputs of a NOR gate 192. The output of the NOR gate 186 is coupled to the second input of the NOR gate 192, and to one of two inputs of an OR gate 194. The output of the NOR gate 192 is coupled to one of two inputs of an OR gate 196, and to a NAND gate 198. The second inputs of the NAND gate 198, the OR gate 196, and the OR gate 194, are coupled to the output of a NOR gate 200.

The output of the NAND gate 188 is coupled to one of two inputs of a NAND gate 202. The output of the OR gate 194 is coupled to the second input of the NAND gate 202. The output of the NAND gate 202 is coupled to gates in the next higher-order position within the ALU 80 by means of a line 204, which gates correspond to gates 194, 196 and 198 in ALU circuit portion 80a. The output of the OR gate 196 is coupled to one of two inputs of a NAND gate 206. The output of the NAND gate 198 is coupled to the second input of the NAND gate 206. The output of the NAND gate 206 constitutes the output of the low-order position 80a of the ALU 80, which is coupled to the result bus 84 by means of line 84a. The line 84a is also coupled to the low-order position 90a of the accumulator 90 by means of a line 91a, and to the low-order position 92a of the status register 92 by means of a line 93a.

Referring again to the NOR gate 200, the first of two inputs thereto is coupled to a line 74b from the control circuit 72. The line 74h transmits a signal from the sequential control circuit 72, which has the function of forcing a binary one into the low-order position for certain logic functions (e.g., incrementation). The second input to the NOR gate 200 is coupled to the output of an AND gate 208. The first of two inputs to the AND gate 208 is coupled to a line 74i from the control circuit 72. The line 74i transmits a signal from the sequential control circuit 72, which has the function of permitting the status of the binary carry to be propagated to the low-order position. The second input to the AND gate 208 constitutes a CARRY' signal generated by the higher-order positions of the ALU 80 and stored by a corresponding flip-flop (not shown) within the status register 92.

Referring again to the NOR gate 190, the first of two inputs thereto is coupled to the output of a NOR gate 210. The second input to the NOR gate 190 is coupled to the output of an AND gate 212. A binary arithmetic complement signal is supplied from the control circuit 72 to the input of an inverter 214 by means of a line 74j. The output of the inverter 214 is coupled to the second input of the NOR gate 210 and to the second input of the AND gate 212. In addition, the output of the inverter 214 is supplied to the constituent ALU 80 circuitry by means of a line 215. The second input to the NOR gate 210 and the AND gate 212 is coupled to the outputs of NAND gates 216, 217, 218, 219. This line, which is coupled to the second input of the AND gate 212, comprises the low-order position 83a of the lines 83.

The first of two inputs to the NAND gate 216 is coupled to a line 74k from the control circuit 72. The signal supplied on the line 74k is a control signal for gating the contents of the accumulator 90 into the ALU 80. The second input to the NAND gate 216 is coupled to the output of flip-flop 220 within the low-order position 90a within the accumulator 90, by means of a line 98a of the lines 98. The first of two inputs to the NAND gate 217 is coupled to a line 74m from control circuit 72.

The signal supplied on the line 74m has the function of performing a right-shift of the data by four binary orders. The second input of the NAND gate 217 is coupled to the output of a flip-flop corresponding to the flip-flop 220 within the fifth order position of the accumulator 90 by means of a line 222. The first of two inputs to the NAND gate 218 is coupled to a line 74n from the control circuit 72.

The signal supplied on the line 74n has the function of performing a right-shift of the data by one binary order. The second input to the NAND gate 218 is coupled to the output of a flip-flop corresponding to the flip-flop 220 within the second order position of the accumulator 90. The first of two inputs of the NAND gate 219 is coupled to a line 74o from the control circuit 72. The signal supplied on the line 74o is a control signal for gating the contents of the status register 92 into the ALU 80. The second input to the NAND gate 219 is coupled to the output of a flip-flop 224 within the low-order position 92a of the status register 92, by means of a line 99 which comprises the first line within the lines 99. The outputs of the NAND gates 216 through 219 are coupled together and this connection comprises the low-order position 82a of the left multiplexer bus 82.

The output of the NAND gate 206 within the low-order position 80a of the ALU 80 is supplied on line 84a of the result bus 84 (which becomes a line 91a at the input of the accumulator 90) is coupled to one of two inputs of an AND gate 226. The second input of the AND gate 226 is coupled to a line 74p from the control circuit 72. In addition, the line 74p is coupled to the input of an inverter 228. The signal supplied on the line 74p controls the loading of the accumulator 90 with data on the result bus 84. The output of the inverter 228 is coupled to the input of an AND gate 230. The second input of the AND gate 230 is coupled to the not true ($\overline{Q}$) output of the flip-flop 220. The output of the AND gates 226 and 230 are coupled to the two inputs of a NOR gate 232. The output of the NOR gate 232 is coupled to the "D" input of the flip-flop 220. Lines 58, which transmit the two sequential clock signals for the microprocessor system, are coupled to the $C_1$ and $C_2$ clock inputs of the flip-flop 220.

The line 84a, which is coupled to the output of the NAND gate 206, is coupled to one of two inputs of an AND gate 234 within the low-order position 92a of the status register 92 by means of a line 93a. The line 84a is also coupled to the input of an inverter 233, and the output of the inverter 233 is coupled to the line 110. The line 110 transmits an address input signal from the result bus 84 to the address input decode of the ROM 102 (FIG. 3). The signal supplied on the line 110 has the function of indicating that the result bus is all zeros. A line 74q from the control circuit 72, which transmits a load status register signal, is coupled to one of two inputs of a NOR gate 236 and to the second input of the AND gate 234. A line 74r from the control circuit 72, which transmits a set status register signal, is coupled to the second input of the NOR gate 236 and to the first of two inputs of an AND gate 238. The load status register signal 74q enables the AND gate 234, and all corresponding gates in circuit portions 92b through 92e, so that the data on the result bus 84 may be gated into the status register 92. The set status register signal 74r enables the AND gate 238, and all corresponding gates in circuit portions 92b through 92e, so that status data from other portions of the circuit may be gated into the status register 92. The output of the NOR gate 236 is coupled to the first of two inputs of an AND gate 240. The eighth order position 84h of the result bus 84 is supplied on a line 241 to the input of an inverter 242. The output of the inverter 242 is coupled to the second input of the AND gate 238. The not true ($\bar{Q}$) output of the flip-flop 224 is coupled to the second input of the AND gate 219, by means of a line 99a of the lines 99 (FIG. 2). The outputs of the AND gates 238, 234, and 240 are coupled to the three inputs of a NOR gate 244. The output of the NOR gate is coupled to the "D" input of the flip-flop 224. The system clock signals supplied on the lines 58 are applied to the $C_1$ and $C_2$ clock inputs of the flip-flop 224.

Referring now to FIG. 7b, the complementary portions of the accumulator 90, the status register 92, and the ALU 80 are illustrated in block diagram form. The accumulator register 90 comprises 8 parts which are identical in structure to that enclosed within dashed line 90a in FIG. 7a, and are generally represented by the blocks identified as 90b through 90h. The status register 92 comprises five parts identical in structure to that enclosed within dashed line 92a in FIG. 7a and are generally represented by blocks 92b through 92e. The arithmetic logic unit (ALU) 80 comprises 8 parts substantially identical to the part enclosed within dashed line 80a in FIG. 7a and are generally represented by blocks 80b through 80h in FIG. 7a.

The lines 8a (FIG. 2), which couple the right multiplexer bus 68 to the ALU 80, comprise the input lines to the ALU and are represented by the lines 81b through 81h as inputs to blocks 80b through 80h, respectively. In addition, the output of the ALU 80 is supplied on lines 85, which lines are identified in FIG. 7b as lines 85b through 85h as outputs from blocks 80b through 80h, respectively.

A BCD (binary coded decimal) carry and BCD correction circuit 260 is provided for detecting a binary carry status from the fourth order position of the ALU 80, and for providing the necessary inputs to the ALU. Four outputs of the circuit 260 are coupled to input lines 81b, 81d, 81f and 81h, respectively. In addition, the output of the NAND gate within circuit 80d, which corresponds to the NAND gate 202 in the ALU circuit 80a, is supplied as an input to the circuit 260 by means of a line 264. A fifth output of the circuit 260 is supplied to the input of a gate within the circuit 80e corresponding to the gate 198 within the ALU circuit 80a. A control signal is supplied to the circuit 260 from the control circuit 72 by means of a line 74s. The signal supplied on the line 74s has the function of controlling the necessary BCD correction during the execution of a BCD add operation.

A carry signal, hereafter referred to as CARRY', is supplied to an additional input of the circuit 260 by means of a line 266. The CARRY' signal is supplied at the output of a flip-flop 267 within circuit 92b corresponding to the flip-flop 224 within the circuit 92a (FIG. 7a). The CARRY' signal is also supplied to the input of the AND gate 208 (FIG. 7a). The BCD carry and BCD correction circuit is illustrated in greater detail in FIG. 8 and will be explained further hereinbelow.

A carry overflow circuit 268 is coupled to the ALU circuits 80g and 80h by means of lines 270 and 271, respectively. In particular, the line 270 is coupled to the ouptput of a gate within ALU circuit 80g corresponding to the NAND gate 202 in ALU circuit 80a, and the line 271 is coupled to the output of a gate within ALU circuit 80h also corresponding to the NAND gate 202 in ALU circuit 80a. The circuit 268 detects a carry operation within the ALU 80 as well as detecting an overflow condition of the ALU in response to the status of the seventh and eighth order positions of the ALU. A logic control signal from the control circuit 72 is supplied to an input of the circuit 268 by means of the line 74f. A CARRY signal is supplied at the output of the circuit 268 on a line 272, and is coupled to the input of an AND gate 269 within circuit 92b which corresponds to the AND gate 238 within the circuit 92a. The second output from the circuit 268 is supplied on a line 274 to the input of an AND gate 273 within the circuit 92d which corresponds to the AND gate 238 within the circuit 92a. The signal supplied on the line 274 is indicative of an overflow status of the ALU 80.

Accordingly, it may be seen that a CARRY signal supplied on the line 272 to the circuit 92b operates with the set status signal on the line 74r to set the flip-flop within the circuit 92b thereby generating a CARRY' signal on the line 266 which is supplied to the circuit 260. An overflow signal supplied on the line 274 operates with the set status signal on the line 74r to set flip-flop 277 within the circuit 92d. The circuit 268 is illustrated in greater detail in FIG. 9 and further explained hereinbelow.

A line 74t from the control circuit 72, is coupled to the inverted input of an AND gate 275 in circuit portion 92e. The signal supplied on line 74t is a clear interrupt control bit signal which operates to reset the flip-flop 273. A line 74u is coupled to an input of a NOR gate 276 in circuit portion 92e, which corresponds to the NOR gate 244 in circuit portion 92a.

The signal supplied on the line 74u is a set interrupt control bit signal which operates to set the flip-flop 273. The output of the NOR gate 276 is coupled to the second inverted input of the AND gate 275. The output of the AND gate 275 is coupled to the "D" input of a flip-flop 273. The true output (Q) of the flip-flop 273 is coupled to the ALU circuit portion 80e, to an input of an AND gate (not shown) which corresponds to the AND gate 234 and the circuit portion 92a, and to the line 172. The signal supplied on the line 172 is the interrupt control bit (ICB) signal supplied to the interrupt circuit illustrated in FIG. 6 and described hereinabove.

Figure 8:
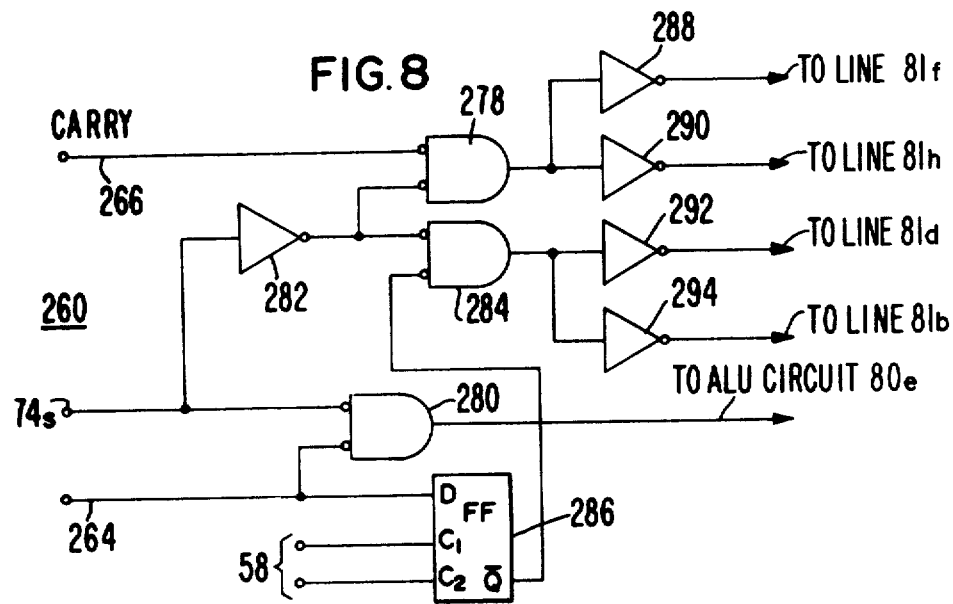
FIG. 8 is a logic diagram of the BCD carry and BCD correction circuit for the arithmetic logic unit.

Referring now to FIG. 8, the BCD carry and BCD correction circuit 260 is shown in logic diagram form. The CARRY' signal, which is supplied on the line 266, is applied to one of the two inverted inputs of an AND gate 278. The BCD add control signal from the control circuit 72, which is supplied on a line 74s, is applied to one of two inverted inputs of an AND gate 280, and to the input of an inverter 282. The output of the inverter 282 is coupled to the second inverted input of the AND gate 278 and to the first of two inverted inputs of an AND gate 284. The line 264, which transmits the signal from the ALU circuit 80d is coupled to the second inverted input of the AND gate 280 and to the "D" input of a flip-flop 286. The $C_1$ and $C_2$ clock inputs of the flip-flop 286 are coupled to the lines 58. The not true ($\bar{Q}$) output of the flip-flop 286 is coupled to a second inverted input of the AND gate 284.

The output of the AND gate 278 is coupled to the inputs of inverters 288 and 290. The output of the AND gate 284 is coupled to the inputs of inverters 292 and 294. The output of the inverter 288 is coupled to the ALU input line 81f; the output of the inverter 290 is coupled to the ALU input line 81h; the output of the inverter 292 is coupled to the ALU input line 81*d*; and, the output of the inverter 294 is coupled to the ALU input line 81*b*. The output of the AND gate 280 is coupled to a gate within the ALU circuit 80*e*, which corresponds to the AND gate 198 within the ALU circuit 80*a*.

During a BCD add operation a high-level signal is supplied on the line 74*s*. This high-level signal operates to interrupt the normal carry supplied on the line 264 from the fourth to the fifth order positions of the ALU. This is accomplished by the high-level signal on line 74*s* disabling the AND gate 280. However, the normal carry signal supplied on the line 264 is stored in the flip-flop 286 for a subsequent application to the AND gate 284.

The not true condition of the carry signal stored in the flip-flop 286 will result in a correction of the appropriate four low-order bits of the ALU. The not true condition of the CARRY' signal on the line 266 from the eighth order position of the ALU will result in a correction of the appropriate four high-order bits of the ALU. The correction is effected by forcing a bit of data into the second and fourth order positions of the ALU for the four low-order positions or by forcing a bit of data into the sixth and eighth order positions of the ALU for the four high-order positions. The result of this correction adds a decimal value of ten to the appropriate low-order or high-order bit positions.

The high-level signal supplied on the line 74*s* is inverted by the inverter 282, which is turn enables AND gates 278 and 284 to gate the CARRY' signal to the inverters 288 and 290, or gates the data stored in the flip-flop 286 to the inverters 292 and 294. The outputs of the inverters 288 and 290 supply the bits of data to the sixth and eighth order positions (by lines 81*f* and 81*h*) of the ALU 80, respectively. The outputs of the inverters 292 and 294 supply the bits of data to the fourth and second order positions (lines 81*d* and 81*b*) of the ALU 80, respectively.

Figure 9:
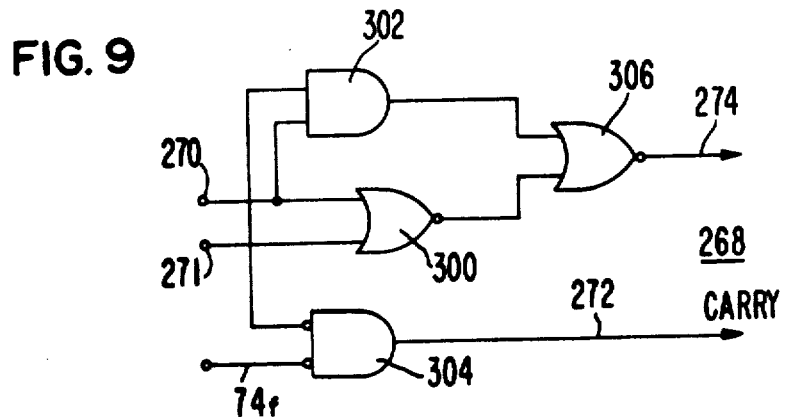
FIG. 9 is a logic diagram of the carry/overflow circuit for the arithmetic logic unit.

Referring now to FIG. 9, the carry overflow circuit 268 is illustrated in logic diagram form. The output of a gate within the ALU circuit 80*g*, which corresponds to the NAND gate 202 within the ALU circuit 80*a*, is supplied on the line 270 to the input of a NOR gate 300, and to one of two inputs to an AND gate 302. The output of a gate within the ALU circuit 80*h*, which corresponds to the NAND gate 202 within the ALU circuit 80*a*, is supplied on the line 271 to the second input of the NOR gate 300, to the second input of the AND gate 302, and to the first of two inverted inputs of an AND gate 304. The second inverted input of the AND gate 304 is coupled to the line 74*f*, which transmits the T$_2$ control signal from the control circuit 72. The output of the AND gate 302 is coupled to the first of two inputs of a NOR gate 306. The output of the NOR gate 300 is coupled to the second input of the NOR gate 306. The output of the NOR gate 306 is supplied on the line 274, which transmits the signal indicative of an overflow condition of the ALU 80. The output of the AND gate 304 is coupled to the line 272, which transmits the signal indicative of a CARRY condition of the ALU 80.

Figure 10:
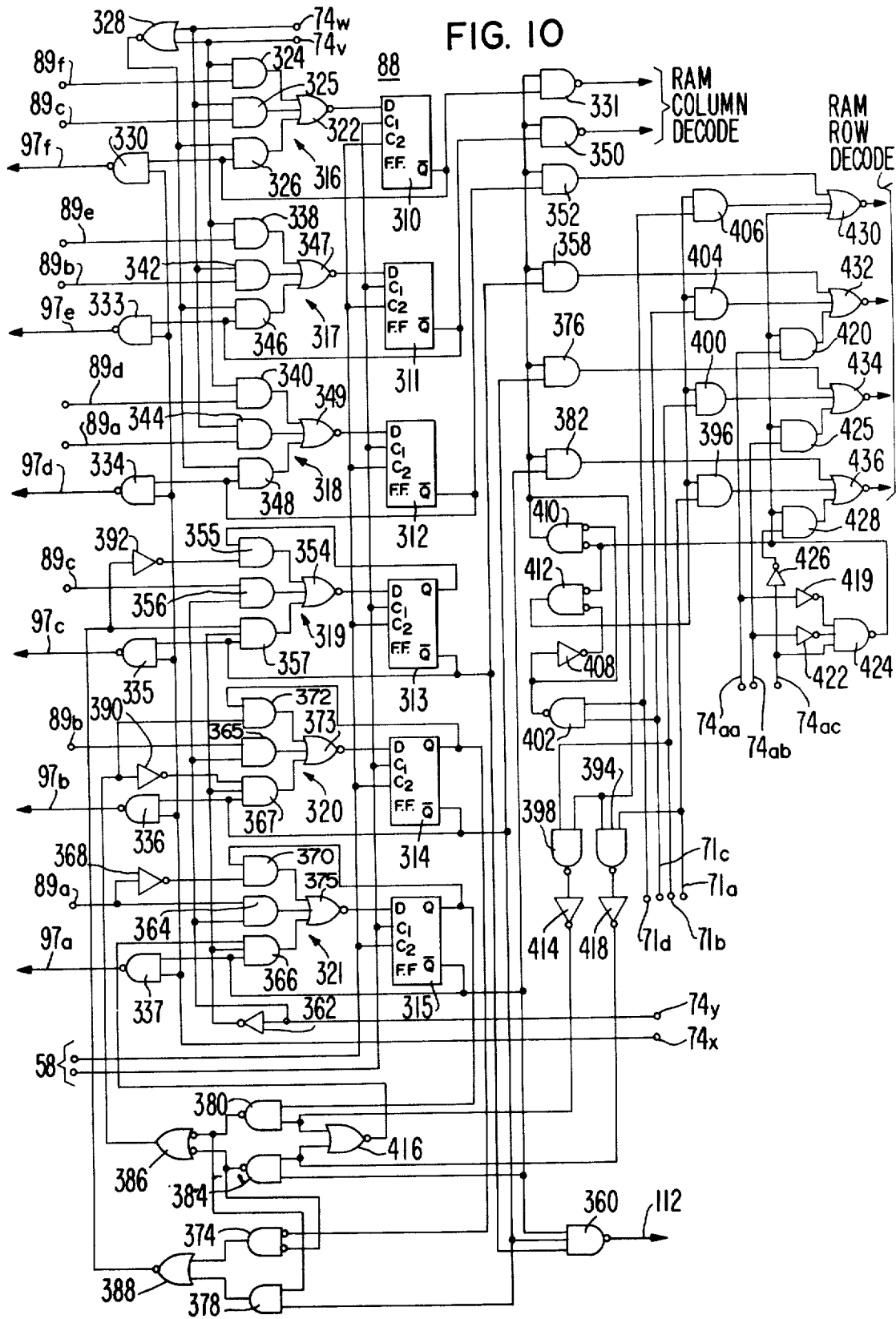
FIG. 10 is a logic diagram for the indirect RAM address register and the address gating for the RAM within the CPU.

Referring now to FIG. 10, a logic diagram of the indirect RAM address register 88 and the address gating to the RAM 33 are illustrated in logic diagram form.

The lines 58, which transmit the CPU clock signals are coupled to the C$_1$ and C$_2$ clock inputs of flip-flops 310 through 315. The flip-flops 310 through 315 comprise the storage portion of the address register 88. Each of these flip-flops is set by corresponding gating networks 316 through 321, which are coupled to the "D" inputs of the flip-flops 310 through 315, respectively. The gating network 316, which is identical in structure to the gating networks 317 through 321, comprises a NOR gate 322 having three inputs coupled to the outputs of three AND gates 324, 325, and 326. The line 74*v* from the control circuit 72, which transmits a first of three signals controlling the loading of the register 88, is coupled to one of two inputs of the AND gate 324. The second input of the AND gate 324 is coupled to a line 89*f*, which comprises the sixth order position of the lines 89. A line 74*w* from the control circuit 72, which transmits a second signal controlling the loading of the register 88, is coupled to one of two inputs of the AND gate 325. The second input of the AND gate 325 is coupled to a line 84*c*, which comprises the third order position of the lines 89.

The lines 74*v* and 74*w* are also coupled to the input of a NOR gate 328. The output of the NOR gate 328 is coupled to one of two inputs of the AND gate 326. The not true ($\bar{Q}$) output of the flip-flop 310 is coupled to the second input of the AND gate 326, to the first of two inputs of a NAND gate 330, and to the first of two inputs of a NAND gate 331. The second input to the NAND gate 330 is coupled to a line 74*x* from the control circuit 72. The signal transmitted on the line 74*x* operates to gate the contents of the RAM address register 88 onto the lines 97. The output of the NAND gate 330 is coupled to the line 97*f*, which is the input to the sixth order position of the lines 97.

The line 74*x* is also coupled to the first of two inputs of NAND gates 333 through 337. The second inputs to the NAND gates 333 through 337 are coupled to corresponding not true ($\bar{Q}$) outputs of the flip-flops 311 through 315, respectively. The outputs of the NAND gates 333 through 337 are coupled to the lines 97*e*, 97*d*, 97*c*, 97*b*, and 97*a*, respectively.

The line 74*v* is also coupled to a first of two inputs of an AND gate 338 within the network 317, and to the first of two inputs of an AND gate 340 within the network 318. The line 74*w* is coupled to the first of two inputs of an AND gate 342 within the network 317, and to the first of two inputs of an AND gate 344 within the network 318. The second input to the AND gate 338 is coupled to a line 89, which comprises the fifth order position of the lines 89. The second input of the AND gate 342 is coupled to a line 89*b*, which is the second order position of the lines 89. The output of the NOR gate 328 is also coupled to the first of two inputs of an AND gate 346, and to the first of two inputs of an AND gate 348.

The outputs of the AND gates 338, 342, and 346 are coupled to the three inputs of a NOR gate 347. The output of the NOR gate 347 is coupled to the "D" input of the flip-flop 311.

The not true ($\bar{Q}$) output of the flip-flop 311 is coupled to the second input of the AND gate 346, to the second input of the NAND gate 333, and to the first of two inputs of a NAND gate 350. The outputs of the NAND gates 331 and 350 comprise the column decode for the RAM 33. The outputs of the AND gates 340, 344, 348 are coupled to the three inputs of a NOR gate 349 within the network 318. The output of the NOR gate 349 is coupled to the "D" input of the flip-flop 312. The not true ($\bar{Q}$) output of the flip-flop 312 is coupled to the second input of the AND gate 348, to the second input of the NAND gate 334, and to the first of two inputs of an AND gate 352.

The second input to the AND gate 340 in the network 318 is coupled to a line 89d, which comprises the fourth order position of the lines 89. The second input to the AND gate 344 is coupled to a line 89a, which comprises the first order position of the lines 89.

The network 319 comprises a NOR gate 354, and three AND gates 355, 356, and 357 having their outputs coupled to the three inputs of the NOR gate 354. The output of the NOR gate 354 is coupled to the "D" input of the flip-flop 313. The true (Q) output of the flip-flop is coupled to the first of two inputs of the AND gate 355. The not true ($\bar{Q}$) output of the flip-flop 313 is coupled to the first of three inputs of the AND gate 357, to the second input of the NAND gate 335, to the first of two inputs of an AND gate 358, and to the first of three inputs to a NAND gate 360. The first of two inputs of the AND gate 356 is coupled to the line 89c, which comprises the third order position of the lines 89.

A line 74y from the control circuit 72 is coupled to the input of an inverter 362, to the first of two inputs of AND gates 364 (network 321) and 365 (network 320), and to the second input of the AND gate 356 (network 319). The signal transmitted on the line 74y is the third signal that operates to load the indirect RAM address register 88 with the data on the lines 89. The output of the inverter 362 is coupled to the first of three inputs of AND gates 366 (network 321), 367 (network 320), and 357 (network 319). The second input to the AND gate 365 is coupled to the line 89b, which comprises the second order position of the lines 89. The lines 89a, which comprises the first order position of the lines 89, is coupled to the input of an inverter 368, and to the first of two inputs of an AND gate 370 within the network 321. The outputs of the AND gates 372, 365, and 367 within the network 320 are coupled to the three inputs of a NOR gate 373. The output of the NOR gate 373 is coupled to the "D" input of the flip-flop 314. The true (Q) output of the flip-flop 314 is connected to the first of two inputs of an AND gate 372, and to the first of two inverted inputs of a NAND gate 374. The not true ($\bar{Q}$) output of the flip-flop 314 is coupled to the second input of the AND gate 367, the second input of the NAND gate 336, to the first of two inputs of an AND gate 376, to the second input of the NAND gate 360, and to the first of two inputs of an AND gate 378.

The outputs of the AND gates 370, 364, and 366 within the network 321 are coupled to the three inputs of a NOR gate 375. The output of the NOR gate 375 is coupled to the "D" input of the flip-flop 315. The true (Q) output of the flip-flop 315 is coupled to the second input of the AND gate 370, and to the first of two inputs of a NAND gate 380. The not true ($\bar{Q}$) output of the flip-flop 315 is coupled to the second input of the AND gate 366, the second input of the NAND gate 377, the first of two inputs of an AND gate 382, to the first of two inputs of a NAND gate 384, and to the third input of the NAND gate 360. The output of the NAND gate 380 is coupled to the first of two inverted inputs of an OR gate 386, and to the second input of the AND gate 378. The output of the NAND gate 384 is coupled to the second inverted input of the OR gate 386, and to the second inverted input of the NAND gate 374. The outputs of the AND gates 374 and 378 are coupled to the two inputs of a NOR gate 388. The output of the NOR gate 386 is coupled to the input of an inverter 390, and to the second input of the AND gate 372 in the network 320. The output of the inverter 390 is coupled to the third input of the AND gate 367 in the network 320. The output of the NOR gate 388 is coupled to the input of an inverter 392, and to the third input of the AND gate 357 in the network 319. The output of the inverter 392 is coupled to the second input of the AND gate 355 in the network 319.

A line 71a, which comprises the low-order position of the lines 71 from the instruction register 64 (FIG. 2), is coupled to the first of two inputs of a NAND gate 394, and to the first of two inputs of an AND gate 396. A line 71b, which comprises the second order position of the lines 71, is coupled to the first of two inputs of a NAND gate 398 and an AND gate 400. A line 71c, which comprises the third order position of the lines 71, is coupled to the first of two inputs to a NAND gate 402 and an AND gate 404. A line 71d, which comprises the fourth order position of the lines 71, is coupled to the second input of the NAND gate 402, and to the first of two inputs of an AND gate 406. The output of the NAND gate 402 is coupled to the input of an inverter 406, and to the first of two inverted inputs of a NAND gate 410. The output of the inverter 208 is coupled to the first of two inverted inputs of a NAND gate 412. The output of the NAND gate 412 is coupled to the second input of the NAND gates 396, 400, 404 and 406. The output of the NAND gate 410 is coupled to the second input of the NAND gates 331, and 350, and to the second inputs of the AND gates 352, 358, 376, 382, 394, and 398. The output of the NAND gate 398 is coupled to the input of an inverter 414, and the output of the inverter 414 is coupled to the second input of the AND gate 380 and to the first of two inputs of a NOR gate 416. The output of the NAND gate 394 is coupled to the input of an inverter 418, and the output of inverter 418 is coupled to the second input of the NAND gate 384 and to the second input of the NOR gate 416. The output of the NOR gate 416 is coupled to the third input of the AND gate 366 in the network 321.

A line 74aa from the control circuit 72 is coupled to the input of an inverter 419, and to the first of two inputs of an AND gate 420. A line 74ab from the control circuit 72 is coupled to the input of an inverter 422, and to the first of two inputs of an AND gate 425. A line 74ac from the control circuit 72 is coupled to the first of three inputs of a NAND gate 424, and the input of an inverter 426. The lines 74aa, 74ab, and 74ac transmit control signals, which have the function of generating preselected RAM addresses.

The output of the inverter 426 is coupled to the first of two inputs of an AND gate 428. The outputs of the inverters 419 and 422 are coupled to the second and third input of the NAND gate 424. The outputs of the NAND gate 424 is coupled to the second inverted inputs of the NAND gates 410 and 412, to the second input of the AND gates 420, 425, and 428, and to the first of three inputs of a NOR gate 430.

The outputs of the AND gates 352 and 406 are coupled to the second and third inputs of the NOR gate 430. The output of the AND gate 358 is coupled to the first of three inputs of a NOR gate 432. The outputs of the AND gates 404 and 420 are coupled to the second and third inputs of the NOR gate 432. The outputs of the AND gates 376, 400, and 425 are coupled to the three inputs of a NOR gate 434. The outputs of the AND gates 382, 396, and 428 are coupled to the three inputs of a NOR gate 436.

The outputs of the NOR gates 430, 432, and 436 comprise the row decode for the address to the RAM 33. The output of the NAND gate 360 is coupled to the line 112, which is coupled to an address input of the ROM 102 (FIG. 3). The signal supplied on the line 112 indicates the condition of the indirect RAM address register having a binary one in each of the three low-order positions, which constitutes a decimal equivalent of seven. Subsequently, this particular condition is used in directing a preselected branch instruction code to be decoded by the sequential control circuit 72.

Referring now to FIG. 11, a block diagram of the ROM circuit 22 is illustrated. The data bus 34, which is coupled between the ROM 22 and the CPU 20 is connected to an internal data bus 500 by means of a buffer circuit 502. Two I/O ports 38 and 40 are coupled between I/O devices (not shown and the internal data bus 500. The structure of the I/O devices 38 and 40 is identical to the typical I/O ports illustrated in FIG. 4 and described hereinabove. However, the control signals supplied to the gates within ports 38 and 40 are supplied from an I/O port address select circuit 506 by means of lines 507a and 507b, respectively. The I/O port address select circuit 506 is coupled to the internal data bus 500 by means of lines 505. The I/O ports 38 and 40, like the I/O ports 31 and 32, are bidirectional devices. That is, data may be transferred into the microprocessor system from an I/O device, or data may be transferred from the system to the I/O device.

An interrupt address generator 508 is coupled to the internal data bus 500 by means of lines 509. The interrupt address generator operates to provide a 16 bit address to be used as an interrupt vector in response to an interrupt request signal in conjunction with internal programming, which will be explained in greater detail hereinbelow. When an interrupt in the ROM circuit 22 is recognized by the CPU circuit 20, the CPU will send the necessary control signals to the ROM 22 which will cause a mask programmed interrupt address of the ROM to be transferred to the internal data bus 500 in two consecutive 8-bit bytes. The address thus supplied is the address of the next instruction to be executed.

The internal data bus 500 is coupled to the input of a timer 510 by means of lines 511. An output signal is supplied from the timer 510 by means of a line 512 to the input of an interrupt control circuit 46 for controlling real-time interrupts during program execution. The internal data bus 500 is also coupled to the interrupt control circuit 46 by means of lines 515. The line 52, which transmits an external interrupt signal, is coupled to an input terminal of the interrupt control circuit 46. The line 48, which transmits the interrupt priority-in signal from the CPU 20, is coupled to an input terminal of the circuit 46. Lines 50 and 53 are coupled to output terminals of the circuit 46 for transmitting the interrupt service request signal and the interrupt priority-out signal, respectively. Lines 507c and 507d are coupled between the I/O port address select circuit 505 and the timer 510 and the interrupt control circuit 46, respectively, for selecting the circuit 46 or the timer 510 during preselected output operations. The circuit 46 or the timer 510, when selected, receives data from the internal data bus 500 by means of lines 515 and 511, respectively. The data received by the circuit 46 is employed for selecting the interrupt mode. The data received by the timer 510 is employed as a count-down value for the timer operation.

The internal data bus 500 is coupled to the input of an address multiplexer circuit 516, by means of lines 517, and to the input of a transfer gate 518 by means of lines 519. The internal data bus 500 comprises 8 lines. In addition, the lines 517 and 519 comprise 8 lines. The output of the address multiplexer circuit 516 is supplied on two groups of lines 520 and 521, wherein each of which comprises 8 lines. Lines 520 and 521 are coupled to a 16-line address transfer bus 522. The address transfer bus 522 is coupled to the input of the program counter 42 by means of lines 524, to the input of a transfer gate 525 by means of lines 526, and to the input of a data counter address pointer 527 by means of lines 528.

The output of the program counter 42 is coupled to a mixer bus 530, and to an address gating circuit 532 by means of lines 523. The output of the transfer gate 525 is coupled to the mixer bus 530. The output of the mixter bus 530 is coupled to the input of a stack register 533. The output of the stack register is coupled to an input of the address gating circuit 532 by means of lines 531. The output of the data counter address pointer 527 is also coupled to an input of the address gating circuit 532 by means of lines 529.

The program counter 42 contains the address of the next instruction code to be retrieved from the memory within the ROM 22. The instruction code retrieved from the memory is an 8-bit byte, and once this code has been retrieved from the memory, the program counter 42 is automatically incremented. However, there are other ways of modifying the contents of the program counter 42, which will be explained in greater detail hereinbelow. The data counter 527 is employed for referencing memory addresses. A select group of instruction codes are employed with the microprocessor system which use the data counter 527 to address, or point to, their operands in the memory space. The data counter 527, like the program counter 42, is incremented by one at the conclusion of a memory addressing circuit. Thus the data counter will be pointing to the next location in memory after execution of the memory addressing cycle. The data counter operates independent of the program counter 42 and thereby can address a group of cells in the memory which are wholly separate or independent of those groups of cells addressed by the program counter 42.

The stack register 533 is coupled to the program counter 42 by means of the mixer bus 530, and is disposed for receiving the contents of the program counter when an interrupt operation occurs, or during a specific program operation where the contents of the program counter are "pushed" into the stack register. It is the function of the stack register 533 to facillitate the creation of an address stack in memory for a multi-level program function. The stack register 533 may also be loaded directly from the address transfer bus 522 by means of the transfer gate 525 and the mixer bus 530 in response to a specific program instruction. This feature facilitates loading the stack register prior to executing some specific instructions.

A control ROM 534 is provided within the ROM circuit 22 for controlling the complementary circuits of the ROM circuit. The five control lines 36 from the CPU 20 are coupled to five inputs of the control ROM 534, and output signals are supplied on lines 536 to the ROM 22 complementary circuits. The address gating circuit 532 is coupled to an input of an incrementer adder 537 by means of lines 535. The transfer gate 518 is also coupled to an input of the incrementer adder 537 by means of lines 539. The incrementer adder 537 is coupled to the address transfer bus 522 by means of lines 538, to the input of an upper byte transfer gate 540 by means of lines 541, and to a lower byte transfer gate 542 by means of lines 543. The outputs of the transfer gates 540 and 542 are coupled to the internal data bus 500 by means of lines 544 and 545, respectively.

The output of the address gating circuit 532, which comprises 16 bit positions, is divided into 10 output lines coupled to the address of a ROM storage 548 by means of 10 lines 549, and to the input of a ROM select circuit 550 by means of 6 lines 551. The output of the ROM select circuit 550 is coupled to the address control input of the ROM storage 548 by means of a line 553. The output of the ROM storage 548 is coupled to the internal data bus 500 by means of 8 lines 552. The 10 lines 549 transmit the 10 bits of address information to the ROM storage 548, and for each unique binary number supplied as an address input to the ROM an 8-bit binary number is supplied at the output of ROM 548 on the lines 552. The 6 bits of binary data supplied on the line 551 to the ROM select circuit 550 are employed to differentiate a given ROM circuit 22 from other ROM circuits which may be employed in the microprocessor system of the present invention.

Hence, when the six most significant bits of the memory address compare with the programmed address in the select circuit 550, a signal is supplied on the line 553 to the ROM storage 548; which signal enables the ROM storage for receiving the address input on the lines 549.

Clock circuits 555 are provided within the ROM circuit 22 for supplying clock signals to the complementary circuits of the ROM circuit on lines 556. The clock circuits 555 are synchronized with the clock circuits 56 within the CPU circuit 20 by means of signals supplied on the line 29.

As stated hereinabove, the operation of the microprocessor systen begins when the sequential control circuit 72 (in the CPU 20) transmits the necessary control signals by means of the control bus 36 to the ROM circuit 22 for retrieving an instruction code from the memory. The control signals supplied on the lines 36 are applied to the address input of the control ROM 534. A second set of control signals are supplied at the output of the control ROM on the lines 536 in response to the control signals that were supplied on the lines 36. Lines 536 are connected to all blocks of the ROM circuit 22 to control the operation of the ROM circuit.

The second set of control signals from the ROM 534 direct the addressing of the ROM storage 548 by means of the program counter 42, the data counter 527, or the stack register 533 by means of the address gating circuit 532. That is, the outputs of the program counter 42, the data counter 527, and the stack register 533 are all applied to inputs of the address gating circuit 532. Select ones of the second set of control signals are applied to the address gating circuit 532 to control the selection of address value from the program counter 42, the data counter 527, or the stack register 533.

The address gating circuit 532 comprises 16 bit positions. Six of the 16 bit positions comprise the address for the ROM select circuit 550, which address is supplied by means of the lines 551. If the subject ROM circuit 22 is the circuit to be addressed from among other ROM circuits like the ROM circuit 22 in the microprocessor system, then an address code that corresponds to a pre-programed code in the circuit 550 will effect the transmission of an enable signal on the line 553 to the ROM storage 548, which signal will thereby enable addressing of the ROM storage.

The remaining 10 positions of the 16 positions of the gating circuit 532 are employed for addressing a group of cells within the ROM storage 548. When a group of cells is addressed, the byte of data stored in the addressed group of cells is supplied on the lines 552 to the data bus 500. The byte of data (normally an instruction code) thus retrieved from the ROM storage is transferred to the data bus 34 from the data bus 500 by means of the buffer circuit 502.

The 16 bit address, which was supplied to the address gating circuit 532, is also supplied to the incrementer adder 537 by means of the lines 535. The incrementer adder 537 performs the function of incrementing the address value by "1" at the completion of an address cycle, and transmits this incremented value as a new address back to either the program counter 42 or the data counter 527 by means of the lines 538 and the address transfer bus 522. Thus, the program counter 42 and the data counter 527 are in effect registers, while the incrementing (adding) operation is performed by the incrementer adder 537.

Initially, the program counter 42 is reset to a value of all zeros and instruction codes are retrieved from the groups of cells in the ROM storage 548, which groups have addresses organized sequentially. Thus, as the program counter 42 increments (by way of the incrementer adder 537) from a value of zero to some finite binary value, the instruction codes stored in the sequential groups of cells will be retrieved in the corresponding sequence.

An address having some finite binary value may be supplied to the program counter 42 from other sources. For example, an address value may be generated in the CPU 20. This address value may be stored in the RAM 33 in the form of two 8-bit bytes. These two 8-bit bytes are transmitted by means of the lines 34 to the internal data bus 500 of the ROM circuit 22, and to the input of the address multiplexer circuit 516 by means of the lines 517. The first byte applied at the input of the circuit 516 is supplied to the upper 8-bit positions of the 16-bit position address transfer bus 522 by means of the lines 520. The second 8-bit byte applied at the input of the circuit 516 is supplied to the lower 8-bit positions of the address transfer bus 522 by means of the line 521. Thus, the two 8-bit bytes transmitted from the CPU 20 are assembled in the program counter 42 or the data counter 527. The subsequent address cycles of the ROM storage 548 is the same as that described hereinabove and the addressing counters (i.e., program counter 42 or data counter 527) are sequentially incremented from the newly assembled address value by means of the incrementer adder 537.

The 16-bit position address value normally present in the address gating circuit 532 may be partitioned into two 8-bit bytes by means of the upper and lower byte transfer gates 540 and 542, respectively. That is, the high-order 8-bit positions of the address value in the circuit 532 are transferred through the incrementer adder 537 unchanged to the upper byte transfer gate 540 by means of the lines 541. The low-order 8-bit positions of the address value are transferred through the incrementer adder 537 unchanged to the lower byte transfer gate 542 by means of the lines 543. The outputs of the upper and lower byte transfer gates are transmitted in two consecutive 8-bit bytes, respectively, along the data bus 500.

The stack register 533 is normally for storing the address value in the program counter 42 when a program branch occurs to a subroutine operation. For example, during the execution of a program there may be a need to branch to a subroutine operation, and when this subroutine operation is complete a branch back to the main program should occur at the next address value which would have occured but for the occurence of the subroutine. A form of a subroutine normally employed in computations is the retrieval of data in a look-up table stored in the ROM storage 548. The data counter 527 is useful in addressing such a look-up table. For example, assume that the program counter contains an address value of "M" and a look-up table is stored in the ROM storage beginning at an address value of "X". The address value of "X" would be stored in the data counter 527 to effect addressing of the look-up table. Further assume that a subroutine operation is required which has a beginning address "G". The address value of the "M", which is stored in the program counter 42, is transferred (i.e., "pushed down") to the stack register 533 by means of the mixer bus 530. The address value of "G" for the subroutine is then stored in the program counter 42. Once the subroutine program has completed, the address value of "M" (the last program address prior to branching to the subroutine) is transferred from the stack register 533 to the address gating circuit 532. The incrementer adder increments the address value of "M" by one, and an address value of "M" + 1 is entered into the program counter 42. Normal operation of the program proceeds in a manner as described hereinabove.

Figure 12:
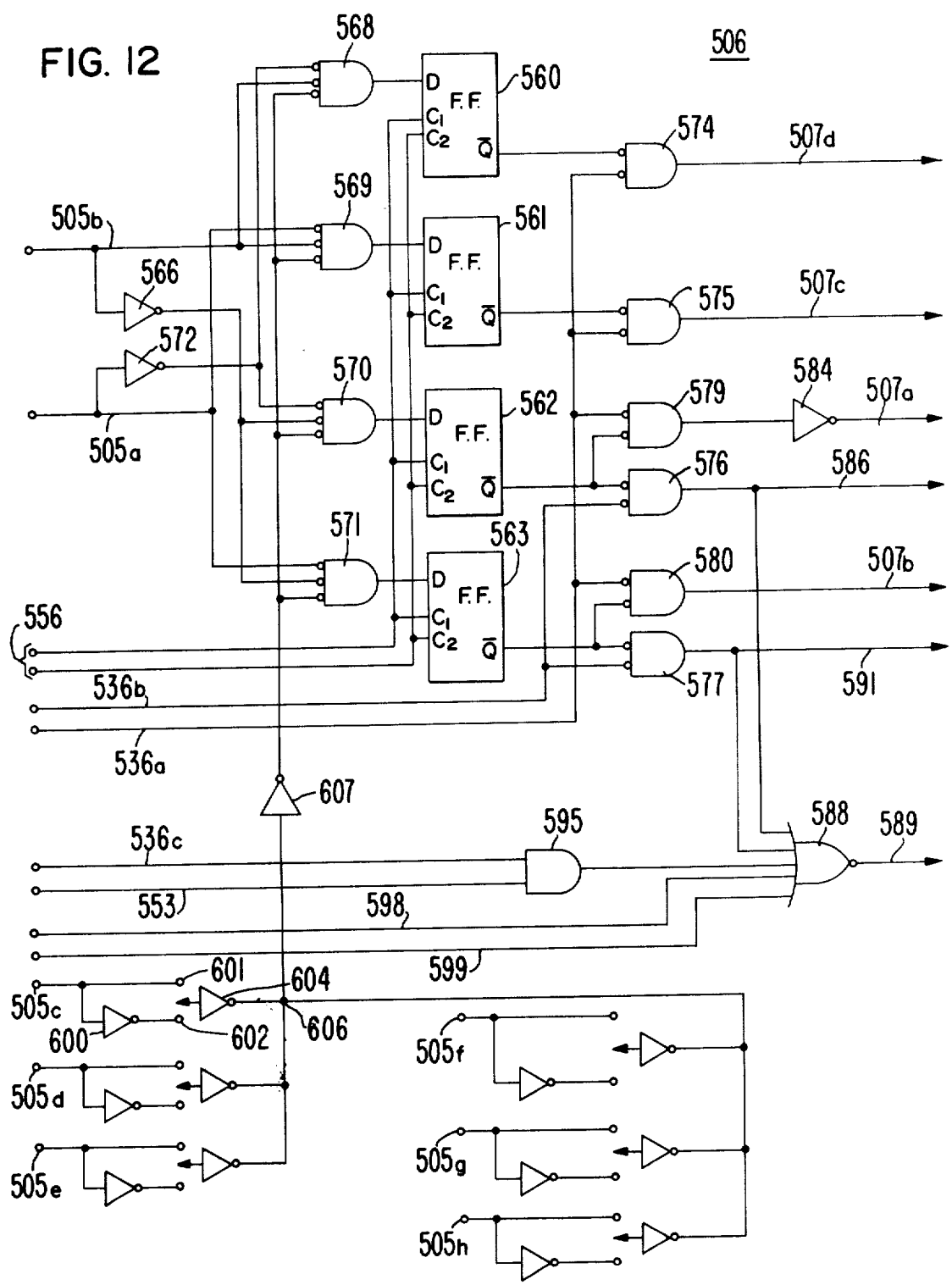
FIG. 12 is a logic diagram of the I/O port address select circuit.

Referring now to FIG. 12, the I/O port address select circuit 506 is shown in logic diagram form. Four flip-flops 560 through 563 are disposed for storing the selection signals for I/O port 38, I/O port 40, the timer 510, or the interrupt control circuit 46. In particular, flip-flop 560 is employed for selecting the timer 510; the flip-flop 562 is employed for selecting the I/O port 38; and, the flip-fop 563 is employed for selecting the I/O port 40.

The lines connecting the address select circuit 506 with the internal data bus 500 are the two low-order positions of the internal data bus. These lines are indicated in FIG. 12 by line 505b for the second order position line, and line 505a for the first order position line. Line 505b is coupled to the input of an inverter 566, and to the first of three inverted inputs of AND gates 568 and 569. The output of the inverter 566 is coupled to the first of two inverted inputs of AND gates 570 and 571.

The line 505a is coupled to the input of an inverter 572, and to the second inverted inputs of the AND gates 569 and 571. The output of the inverter 572 is coupled to the second inverted inputs of AND gates 568 and 570. The outputs of AND gates 568 through 571 are connected to the "D" inputs of corresponding flip-flops 560 through 563, respectively. The $C_1$ and $C_2$ clock inputs of the flip-flops 560 through 563 are coupled to the lines 556 from the clock circuit 555 (FIG. 11).

The not true ($\bar{Q}$) outputs of the flip-flops 560 through 563 are coupled to one of two inverted inputs of AND gates 574 through 577. The not true ($\bar{Q}$) outputs of the flip-flops 562 and 563 are each coupled to the first of two inverted inputs of AND gates 579 and 580, respectively. The second inverted input of the AND gates 574, 575, 579, and 580, are coupled to a line 536a from the control ROM 534, which line transmits a (LOAD) I/O signal. The second inverted inputs of the AND gates 576 and 577 are coupled to a line 536b from the control ROM 534, which line transmits a (READ) I/O signal.

The output of the AND gate 574 is coupled to the interrupt control circuit 46 by means of the line 507d. The output of the AND gate 575 is coupled to the timer 510 by means of the line 507c. The output of the AND gate 579 is coupled to a control input of the I/O port 38 by means of the line 507a. The outpus of the AND gate 576 is coupled to a second control input of the I/O port 38 by means of a line 586, and to a first of five inputs of a NOR gate 588. The output of the AND gate 580 is coupled to a control input of the I/O port 40 by means of the line 507b. The output of the AND gate 577 is coupled to the second control input of the I/O port 40 by means of a line 591, and to the second input of the NOR gate 588. As stated hereinabove, I/O ports 38 and 40 are identical in structure to the I/O port shown in FIG. 4. Hence, (for I/O port 38) line 507a corresponds to the line 74ag in FIG. 4, and line 586 corresponds to line 74ah in FIG. 4. In a similar manner (for I/O port 40) line 507b corresponds to the line 74ag and line 591 corresponds to line 74ah.

The first of two inputs of an AND gate 595 is coupled to a line 536c from the control ROM 534, which line transmits a ROM-DRIVE signal. The ROM-DRIVE signal is active to enable the buffer 502 when data is to be supplied out of the ROM circuit 22 other than when data is received by an I/O port or an interrupt address is generated from circuit 508. The second input of the AND gate 595 is coupled to the line 553 from the ROM select circuit 550. The output of the AND gate 595 is coupled to a third input of the NOR gate 588. The fourth and fifth inputs of the NOR gate 588 are coupled to line 598 and 599, respectively, from the interrupt control circuit 46.

The output of the NOR gate 588 is coupled to a line 589, which transmits a control signal to the buffer circuit 502. The first bit position of the internal data bus 500 is supplied on a line 505a (of the lines 505, FIG. 11) to the input of an inverter 600, and to a contact point 601. The output of the inverter 600 is coupled to a contact point 602. The input of an inverter 604 is disposed for connection to either the contact point 601 or the contact point 602. In the preferred embodiment of the present invention manufactured with the use of integrated circuit technology, the input to the inverter 604 is masked to either of the contact points 601 or 602 for programming the I/O port addresses. Lines 505b through 505f are connected in the same manner as described above for additional inverters, and the input to the corresponding inverter is masked in a similar fashion for programming. Accordingly, any combination of connections may be made to effect any desirable code respresentative of an I/C address. The output of the inverter 604, and the additional corresponding inverters coupled to lines 505b through 505f, are coupled together at a single circuit point 606. Circuit point 606 is coupled to the input of an inverter 607, and the output of the inverter 607 is coupled to the third input of the AND gates 568 through 571.

As stated hereinabove, the lines 505c through 505h are coupled to a mask programmable structure comprising a plurality of inverters such as the inverters 600 and 604. A unique binary pattern is formed by coupling the input to each of the inverters corresponding to the inverter 604 to a circuit point which corresponds to either circuit point 601 or circuit point 602. Since there are six lines (505c–505h) and each line has one of two possible connections then 64 possible combinations may be formed. The lines 505a and 505b have four possible binary combinations. The combinations selected by the mask programming of the inverters coupled to the lines 505c through 505h select I/O devices on one ROM circuit from other such I/O devices on ROM circuits in the system. The signals supplied on the lines 505a and 505b select a particular device within a selected ROM circuit. In particular, the binary combinations supplied on the lines 505a and 505b select from either the I/O ports 38 or 40, or the timer 510, or the interrupt control circuit 46. When a particular device has been selected, the corresponding flip-flop therefor will be set.

Once a device has been selected by setting the corresponding flip-flop, then the signals supplied on the lines 536a and 536b will determine whether the device is to accept data from the ROM circuit or is to supply data to the ROM circuit. That is, the signal supplied on the line 536a controls the operation of supplying data to one of the four devices selected. The signal on the line 536b controls the accepting of data from two of the four devices. Note that data may be accepted from or supplied to the I/O port 38 or the I/O port 40, while data may only be supplied to the timer 510 and the interrupt control circuit 46.

Assume, for example, that the combination of mask programming at the inputs of inverters 604 et seq corresponds to the six high-order bits of the byte of data supplied on the lines 505 (i.e., on lines 505c–505h). Thus, a signal is supplied on the line 607 to the AND gates 568 through 571. Further assume that the combination of signals supplied on the lines 505a and 505b (two low-order bits of the byte of data on lines 505) cause the flip-flop 562 to be set. A low-level signal is supplied at the output of the flip-flop 562 to the inverted inputs of the AND gates 576 and 579. A low-level signal on the line 536a with a corresponding highlevel signal on the line 536a will enable the AND gate 579. Hence, a high-level signal is supplied on the line 507a, which will activate the I/O port 38 for accepting data from the I/O device (not shown). The outputs of the AND gates 576 and 577 are low, and these low-level signals are applied to the first two inputs of the NOR gate 588. The signal on the line 536a, is active when the ROM circuit 22 is operative in a transmission mode. The signal on the lines 553 is active when the subject ROM circuit has been selected from other ROM circuits within the system. Assume for the present example that the signals on the lines 598 and 599 are at a low-level, which signals are active when an interrupt address vector is generated in the circuit 508, and the output of the AND gate 595 is likewise low. Hence, the output of the NOR gate 588 on the line 589 is at a high-level. A high-level signal on the line 589 enables the buffer 502 to transmit data out of the ROM circuit 22. If the signal on the line 589 is at a low-level, then the buffer 502 is enabled to accept data from the data bus 34.

Figure 13:
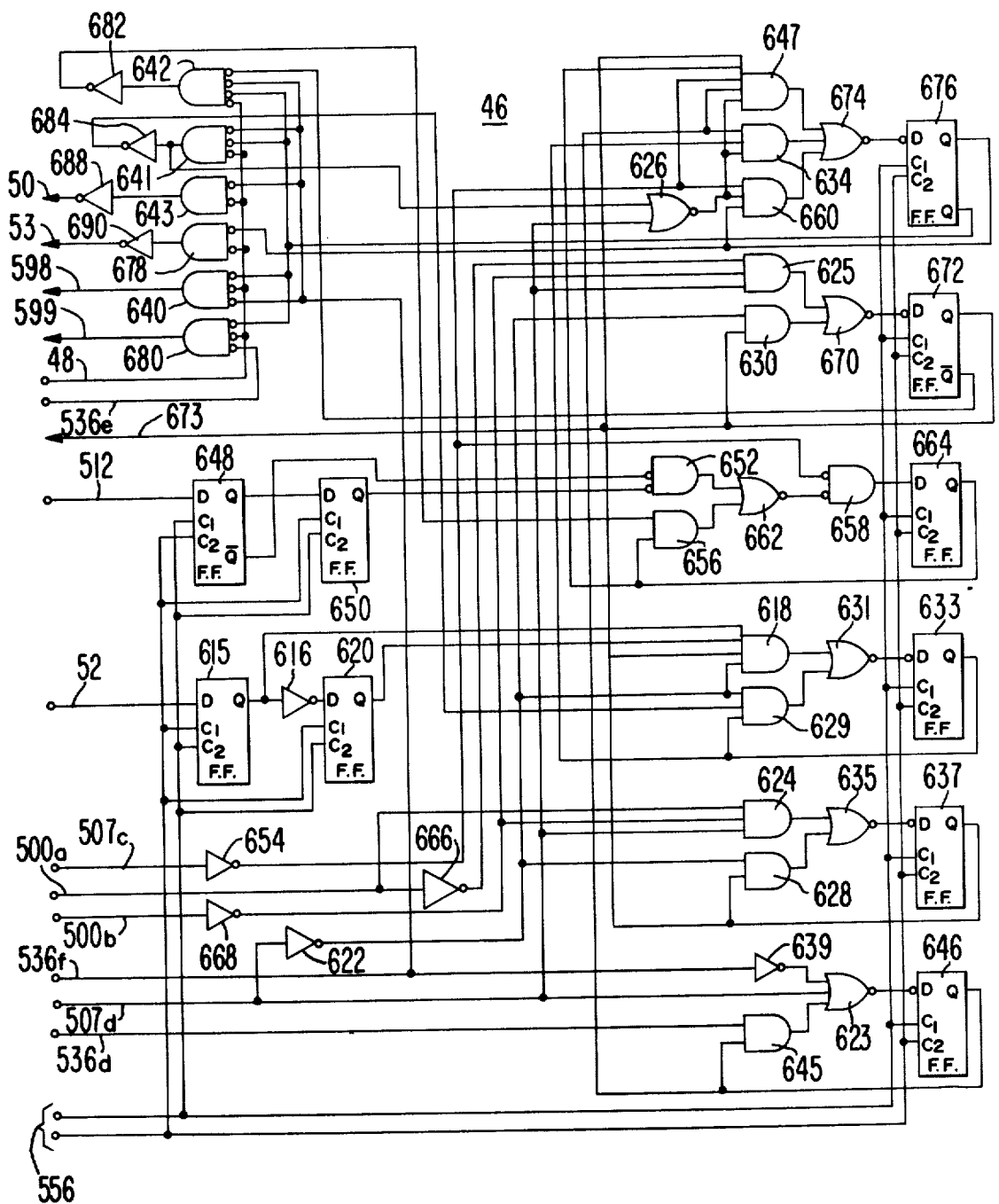
FIG. 13 is a logic diagram of the interrupt control circuit.

Referring now to FIG. 13, the interrupt control circuit 46 is showin in logic diagram form. The line 52, which transmits the external interrupt signal, is coupled to the "D" input of a flip-flop 615. The true (Q) output of the flip-flop 615 is coupled to the input of an inverter 616, and to the first of four inputs of an AND gate 618. The output of the inverter 616 is coupled to the "D" input of a flip-flop 620. The true (Q) output of the flip-flop 620 is coupled to a second input of the AND gate 618. The $C_1$ and $C_2$ clock inputs of the flip-flops 615 and 620 are coupled to the clock signals lines 556.

The line 507d, which transmits a control signal from the I/O port address select circuit 506 (FIG. 12), is coupled to the input of an inverter 622, the first of three inputs of a NOR gate 623, the first of three inputs of an AND gate 624, the first of three inputs of an AND gate 625, and the first of two inputs of a NOR gate 626. The output of the inverter 622 is coupled to the first of two inputs of an AND gate 628, the first of three inputs of an AND gate 629, a third input of the AND gate 618, and the first of two inputs of an AND gate 630.

The outputs of AND gates 618 and 629 are coupled to the two inputs of a NOR gate 631. The output of the NOR gate 631 is coupled to the inverted "D" input of a flip-flop 633. The true output (Q) of the flip-flop 633, which is indicative of an external interrupt, is coupled to a second input of the AND gate 629, and to the first of three inputs of an AND gate 634.

The outputs of the AND gates 624 and 628 are coupled to the two inputs of a NOR gate 635. The output of the NOR gate 635 is coupled to an inverted "D" input of a flip-flop 637 (as indicated in the figures by the open circle adjacent to the "D" input). The true (Q) output of the flip-flop 637 is coupled to the second input of the AND gate 628, and to the fourth input of the AND gate 618.

A line 536f is coupled from the control ROM 534 to the input of an inverter 639, to the first of three inverted inputs of AND gates 640 and 641, and to the first of four inverted inputs of an AND gate 642. The signal transmitted on the line 536f has the function of gating the upper eight bits of the interrupt address from the circuit 508 (FIG. 11). A line 536d is coupled from the control ROM 534 to the first of two inputs of an AND gate 645. The signal transmitted on the line 536d has the function of preventing further changes of the service request flip-flop 676 while an interrupt address is being transmitted from the circuit 508.

The outputs of the inverter 639 and the AND gate 645 are coupled to the second and third inputs of the NOR gate 623. The output of the NOR gate 623 is coupled to an inverted "D" input of a flip-flop 646. The true (Q) output of the flip-flop 646 is coupled to the second input of the AND gate 645, to a second input of the AND gate 634, and the first of five inputs of an AND gate 647.

The line 512 coupling the timer 510 to the interrupt control circuit 46 (FIG. 11) is coupled to the "D" input of a flip-flop 648. The true (Q) output of the flip-flop 648 is coupled to the "D" input of a flip-flop 650. The not true (Q̄) output of the flip-flop 648 is coupled to the first of two inverted inputs of an AND gate 652. The true (Q) output of the flip-flop 650 is coupled to the second inverted input of the AND gate 652.

The line 507c, from the I/O port address select circuit 506, is coupled to the input of an inverter 654. The output of the inverter 654 is coupled to the first of two inverted inputs of the AND gate 658, to the first of three inputs of an AND gate 660, and to a second input of the AND gate 647.

The outputs of AND gates 652 and 656 are coupled to the two inputs of a NOR gage 662. The output of the NOR gate 662 is coupled to the second inverted input of the AND gate 658. The output of the AND gate 658 is coupled to the "D" input of a flip-flop 664. The true (Q) output of the flip-flop 664, which is indicative of a timer interrupt, is coupled to a first input of the AND gate 656, and to a third input of the AND gate 647.

The line 500a, which is the first data position of the data bus 500, is coupled to the input of an inverter 666, and to the third input of the AND gate 624. The output of the inverter 666 is coupled to a second input of the AND gate 625. The line 500b, which is the second data position of the data bus 500, is coupled to the input of an inverter 668. The output of the inverter 668 is coupled to the third input of the AND gate 624, and to the third input of the AND gate 625.

The outputs of AND gates 625 and 630 are coupled to the two inputs of a NOR gate 670. The output of the NOR gate 670 is coupled to the inverted "D" input of a flip-flop 672. The true output (Q) of the flip-flop 672 is coupled to the second input of the AND gate 630, to a line 673, and to a fourth input of the AND gate 647. The not true ($\overline{Q}$) output of the flip-flop 627 is coupled to a second inverted input of the AND gate 642.

The output of the NOR gate 626 is coupled to a second input of the AND gate 660, the third input of the AND gate 634, and the fifth input of the AND gate 647. The outputs of AND gates 647, 634 and 660 are coupled to the three inputs of a NOR gate 674. The output of the NOR gate 674 is coupled to the inverted "D" input of a flip-flop 676. The true output (Q) of the flip-flop 676, which is indicative of an interrupt service request, is coupled to the third input of the AND gate 660, and to the first of two inverted inputs of an AND gate 678. The not true ($\overline{Q}$) output of the flip-flop 676 is coupled to a third inverted input of the AND gate 642, to second inverted inputs of the AND gates 640, 641, and 643 and to the first of three inverted inputs of AND gate 680.

The line 536e from the control ROM 534 is coupled to a second input of the AND gate 680. The signal transmitted on the lines 536e has the function of gating the lower 8 bits of the interrupt address from the circuit 508. The line 48, which transmits the priority-in signal, is coupled to an inverted input of each of the AND gates 642, 641, 643, 678, 640 and 680. The output of the AND gate 642 is coupled to the input of an inverter 682. The output of the inverter 682 is coupled to the second input of the AND gate 656. The output of the AND gate 641 is coupled to the input of an inverter 684, and to the second input of the NOR gate 626. The output of the inverter 684 is coupled to the third input of the AND gate 629.

The output of the AND gate 643 is coupled to the input of an inverter 688. The output of the inverter 688 is coupled to the line 50 which transmits the interrupt service request signal to the CPU circuit 20. The output of the AND gate 678 is coupled to the input of an inverter 690. The output of the inverter 690 is coupled to the line 53, which transmits the priority-out signal to other circuits in the microprocessor system. The outputs of the AND gates 640 and 680 are coupled to the lines 598 and 599, respectively, which are coupled to the NOR gate 588 (FIG. 12) for controlling the direction of data flow through the buffer 502.

Referring again to FIG. 13, the flip-flops 637 and 672 are employed for selecting two types of interrupts that may occur. The flip-flop 637 is employed to condition the interrupt circuitry for an external interrupt, and the flip-flop 672 is employed for conditioning the interrupt circuitry for the timer interrupt. The flip-flops 637 and 672 are set by the binary combination of signals appearing on the lines 500a and 500b during the loading of an interrupt instruction, and a high-level signal on the line 507d enables this loading operation. Flip-flops 615, 620 and 633 memorize the fact that an external interrupt signal has occured on the line 52. During an external interrupt a positive transition on the line 52, which is the external interrupt line to the ROM circuit 22, will set the flip-flop 615. Note that the signal supplied on the line 52 is generated as a negative transition; however, an inverter (not shown) is present in the line 52 which inverts the negative transition to a positive transition. However, prior to this positive transition flip-flop 620 was set by the flip-flop 615 being reset. During the time interval between the clock signal that set the flip-flop 615 and a clock signal which will subsequently reset the flip-flop 620, flip-flop 633 will be set provided that the flip-flop 637 has been previously selected. A set state of the flip-flop 633 represents an external interrupt request.

The flip-flops 648 and 650 operate in a similar manner to set the flip-flop 664 for a timer interrupt. Assume, for example, that a low-level signal has been present on the line 512. This low-level signal will reset the flip-flops 648 and 650. A positive transition on the line 512, in conjunction with clock signals on the lines 556, will set the flip-flop 648. Between this clock signal and a subsequent clock signal flip-flop 648 will remain set while flip-flop 650 will remain reset. The not true ($\overline{Q}$) output of the flip-flop 648 and the true (Q) output of the flip-flop 650 are both at a low-level and enable the setting of the flip-flop 664 by means of the AND gate 652. A set state of the flip-flop 664 memorizes a timer interrupt request.

The flip-flop 646 functions to prevent any other changes in the interrupt circuit while the interrupt address is provided to the system. Flip-flop 646 is set by a high-level signal present on the line 507d, which represents the selection of the interrupt control circuit 46 by the I/O port address select circuit 506. Flip-flop 676 is employed for indicating a service request action to the CPU 20 from any ROM circuit, such as the ROM circuit 22, in the system. The flip-flop 676 is set during one of two conditions. First, flip-flop 676 will be set from the timer enable flip-flop 672 being set, the timer interrupt request flip-flop 664 being set, and the flip-flop 646 being set. Secondly, the flip-flop 676 will be set by the external interrupt request flip-flop 633 being set and the flip-flop 646 also being set.

Figure 14:
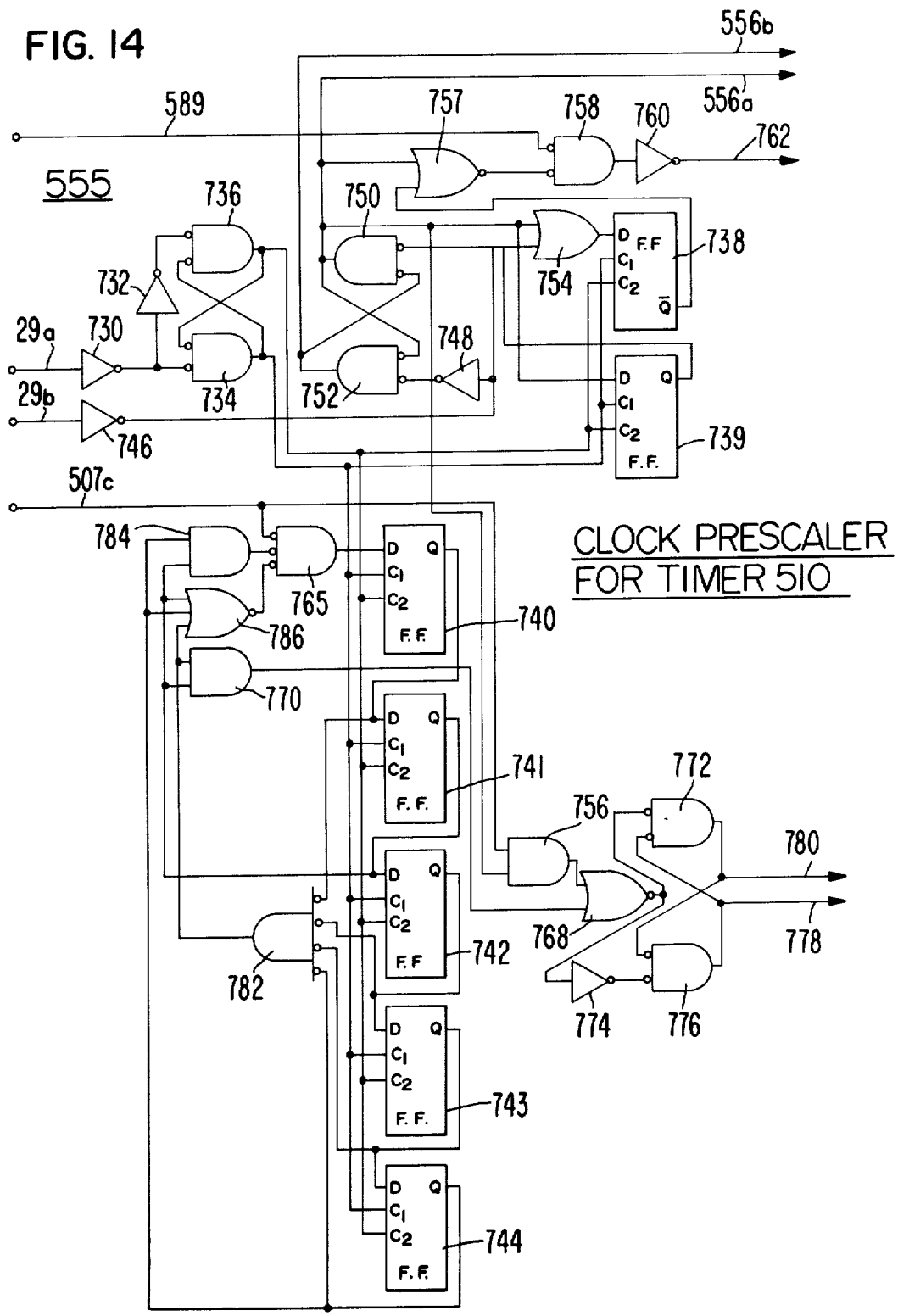
FIG. 14 is a logic diagram of the clock circuits for the ROM circuit.

Referring now to FIG. 14, the clock circuits 555 and a clock prescaler for the timer 510 are illustrated in logic diagram form. A first line 29a of the lines 29, which transmits a first clock synchronizing signal from the CPU 20 to the ROM circuit 22, is coupled to the input of an inverter 730. The output of the inverter 730 is coupled to the input of of an inverter 732, and to the first of two inverted inputs of an AND gate 734. The output of the inverter 732 is coupled to the first of two inverted inputs of an AND gate 736. The output of the AND gate 734 is coupled to the second inverted input of the AND gate 736, and to the $C_1$ clock inputs of flip-flops 738 through 744. The output of the AND gate 736 is coupled to the second inverted input of the AND gate 734, and to the $C_2$ clock inputs of the flip-flops 738 through 744.

A second line 29b of the lines 29, which transmits a second synchronizing signal from to CPU 20 the the ROM circuit 22, is coupled to the input of an inverter 746. The output of the inverter 746 is coupled to the input of an inverter 748, and to the first of two inverted inputs of an AND gate 750. The output of the inverter 748 is coupled to the first of two inverted inputs of an AND gate 752. The output of the AND gate 752 is coupled to the second inverted input of the AND gate 750, and to a line 556b, which transmits the clock $C_2$ clock signal to a majority of flip-flops in the complementary circuits in the ROM circuit 22. The output of the AND gate 750 is coupled to the second inverted input of the AND gate 752, to the first of two inputs of an OR gate 754, to the "D" input of the flip-flop 739, to the first of two inputs of an AND gate 756, to a first of two inputs of a NOR gate 757, and to a line 556a, which transmits the $C_1$ clock signal to a majority of the flip-flops in the complementary circuits of the ROM circuit 22.

The true (Q) output of the flip-flop 739 is coupled to the second input of the OR gate 754. The output of the OR gate 754 is coupled to the "D" input of the flip-flop 738. The not true ($\bar{Q}$) output of the flip-flop 738 is coupled to the second input of the NOR gate 757. The output of the NOR gate 757 is coupled to the first of two inverted inputs of an AND gate 758. The line 589, from the NOR gate 588 (FIG. 12), is coupled to the second inverted input of the AND gate 758. The output of the AND gate 758 is coupled to the input of an inverter 760, and the output of the inverter 760 is supplied on a line 762 to the data buffer circuit 502. The signal supplied on the line 762 gates the transfer of output data through the buffer 502.

The line 507c, from the I/O port address select circuit 506 (FIG. 12), is coupled to the first of three inverted inputs of an AND gate 765, and to the second input of the AND gate 756. The output of the AND gate 756 is coupled to the first of two inputs of a NOR gate 768. The second input of the NOR gate 768 is coupled to the output of an AND gate 770. The output of the NOR gate 768 is coupled to the first of two inverted inputs of an AND gate 772, and to the input of an inverter 774. The output of the inverter 774 is coupled to the first of two inverted inputs of an AND gate 776. The output of the AND gate 776 is coupled to the second inverted input of the AND gate 772, and to a line 778. The output of the AND gate 772 is coupled to the second inverted input of the AND gate 776, and to a line 770. The lines 778 and 780 transmit the $C_1$ and $C_2$ clock signals to flip-flops within the timer circuit 510.

The output of the AND gate 765 is coupled to the "D" input of the flip-flop 740. The true output (Q) of the flip-flop 740 is coupled to the "D" input of the flip-flop 741, and to the first of four inverted inputs of an AND gate 782. The true (Q) output of the flip-flop 741 is coupled to the "D" input of the flip-flop 742, to the first of two inputs of AND gates 770 and 784, and to the frist of three inputs of a NOR gate 786. The true (Q) output of the flip-flop 742 is coupled to the "D" input of flip-flop 743, and to the second inverted input of the AND gate 782. The true output of the flip-flop 743 is coupled to the "D" input of the flip-flop 744, and to the third inverted input of the AND gate 782. The true output of the flip-flop 744 is coupled to the fourth inverted input of the AND gate 782, to the second input of the AND gate 784, and to a second input of the NOR gate 786. The output of the AND gate 782 is coupled to the second input of the AND gate 770, and to the third input of the NOR gate 786.

In describing the operation of the circuit shown in FIG. 14, reference is again made to FIGS. 2a and 2b. The signal supplied on the line 29a is the first of two synchronizing signals between circuits of the microprocessor system and is represented by the waveform 1330 in FIG. 2b. The signal supplied on the line 29b is the second of the two synchronizing signals between circuits of the system and is represented by the waveform 1333 in FIG. 2b.

Referring back to FIG. 14, the signal supplied on the line 29a is shaped by the AND gates 734 and 736 to provide a clock signal that is supplied to the $C_1$ and $C_2$ inputs of the flip-flops 738 through 744. The signal supplied on the line 29b is shaped by the AND gates 750 and 752 to provide the clock timing signal on the lines 556a and 556b. The timing signals on the lines 556a and 556b are supplied to the remaining flip-flops of the ROM circuit 22. The output signals from the flip-flops 738 and 739 are combined with the clock signals on the line 556a to derive a signal on the line 762 for gating data through the buffer circuit 502. A high-level state of the signal supplied on the line 589 from the NOR gate 588 (FIG. 12) will inhibit the buffer gating signal on the line 762 by means of the AND gate 758. However, a low-level signal on the line 589 will enable the AND gate 758 to pass the output of the NOR gate 757 through the AND gate 758 and the inverter 760 in the line 762.

The flip-flops 740 through 744 comprise a frequency divider for dividing the clock signals by five. These newly derived clock signals are shaped by the AND gates 772 and 776, and are supplied on the lines 778 and 780 to the timer circuit 510. The signal supplied on the lines 507c inhibits the divider circuit during a loading operation of the timer circuit 510. However, the clock signal supplied on the line 566a is gated through the AND gate 756, 772 and 776 to the lines 778 and 780 for use as clock signals in the timer 510 during the timer load operation.

Figure 15:
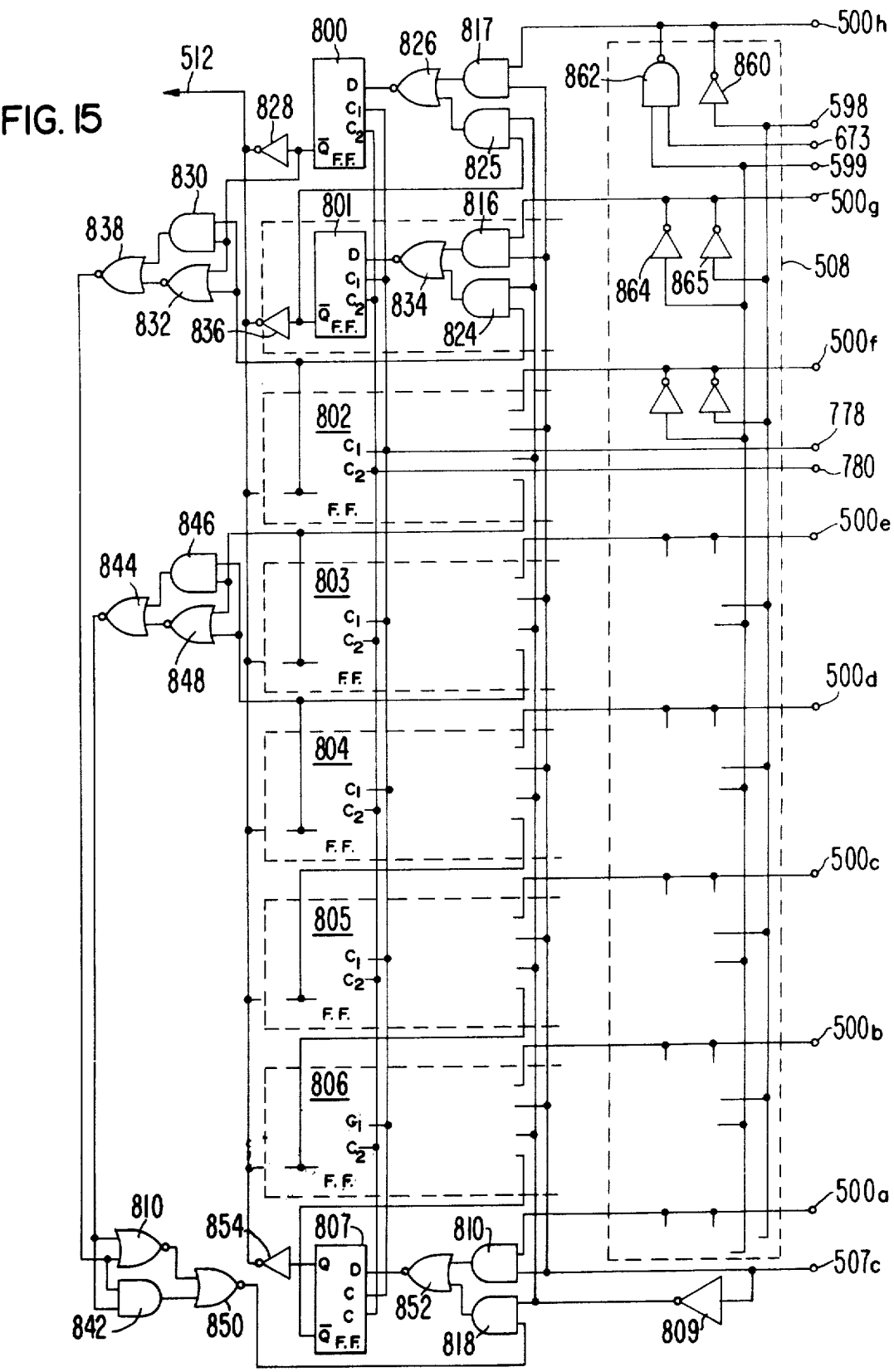
FIG. 15 is a logic diagram of the timer and the interrupt address generator.

Referring now to FIG. 15, the timer circuit 510 and the interrupt address generator circuit 508 are shown in logic diagram form. The lines 778 and 780 from the clock circuits 555 are coupled to the $C_2$ and $C_1$ clock inputs, respectively, of flip-flops 800 through 807. For simplification of the drawing of FIG. 16 only a portion of the flip-flops 800 through 807 are shown (viz., flip-flops 800, 801 and 807). Line 500a, which constitutes the lowest order position of the internal data bus 500, is coupled to the first of two inputs of an AND gate 816. The line 500h, which constitutes the highest order position of the internal data bus 500, is coupled to the first of two inputs of an AND gate 817. The lines 500d through 500f, which constitute the remaining positions of the internal data bus 500, are coupled to the first of two inputs of AND gates (not shown) which correspond to the AND gates 810, 816 and 817. The line 507c, from the I/O port address select circuit 506, is coupled to the second input of the AND gates 810 . . . 816 and 817, and to the input of an inverter 809. The output of the inverter 809 is coupled to the first of two inputs of AND gates 818 . . . 824 and 825.

The outputs of the AND gates 817 and 825 are coupled to the two inputs of a NOR gate 826. The output of the NOR gate 826 is coupled to the "D" input of the flip-flop 800. The not true ($\bar{Q}$) output of the flip-flop 800 is coupled to the input of an inverter 828, to the first of two inputs of an AND gate 830, and to the first of two inputs of a NOR gate 832. The output of the inverter 828 is coupled to the line 512, which is the control line between the timer circuit 510 and the interrupt control circuit 46. The outputs of the AND gates 816 and 824 are coupled to the two inputs of a NOR gate 834. The output of the NOR gate 834 is coupled to the "D" input of the flip-flop 801. The not true ($\overline{Q}$) output of the flip-flop 801 is coupled to the input of an inverter 836, and to the second input of the AND gate 825. The output of the inverter 836 is coupled to the line 512. The not true output of the flip-flop 802 (not shown) is coupled to the second input of the AND gate 824, to the second input of the NOR gate 832, and to the second input of the AND gate 830. The outputs of the gates 830 and 832 are coupled to the two inputs of a NOR gate 838. The output of the NOR gate 838 is coupled to the first of two inputs of a NOR gate 840 and a NAND gae 842. The second inputs of the NOR gate 840 and the AND gate 842 are coupled to the output of a NOR gate 844. The two inputs of the NOR gate 844 are coupled to the outputs of an AND gate 846 and a NOR gate 848, respectively. The AND gate 846 and the NOR gates 844 and 848 are coupled to the circuitry not shown in the same manner as that coupling the AND gate 830 and the NOR gates 832 and 838.

The outputs of the gates 840 and 842 are coupled to the two inputs of a NOR gate 850. The output of the NOR gate 850 is coupled to the second input of the AND gate 818. The outputs of the AND gates 810 and 818 are coupled to the two inputs of a NOR gate 852. The output of the NOR gate 852 is coupled to the "D" input of the flip-flop 807. The true (Q) output of the flip-flop 807 is coupled to the input of an inverter 854 and the output of the inverter 854 is coupled to the line 512. The not true ($\overline{Q}$) output of the flip-flop 807 is coupled to the input of an AND gate (not shown), which corresponds to the AND gate 824 in the second order position of the timer circuit.

The portion of FIG. 15 outlined within the dashed line 508 represents the interrupt address generator circuit 508. The line 598 from the interrupt control circuit 46 (FIG. 13) is coupled to the input of an inverter 860. The line 673 from the interrupt control circuit 46, which transmits a timer enable signal, is coupled to the first of two inputs of a NAND gate 862. The line 599 from the interrupt control circuit 46 is coupled to the second input of the NAND gate 862. The output of the inverter 860 and the NAND gate 862 are coupled to the line 500h.

The interrupt address generator circuit 508 is programmable for a particular use. That is, inverters are employed for coupling the inversion of the signals on the lines 598 or 599 to a chosen line of the internal data bus 500. Accordingly, only a portion of the inverters used for such programming are illustrated in FIG. 15. Inverters 864 and 865 which are coupled to the penultimate data position of the interrupt address generator 508, are examples of inverters employed in programming. The inputs to the inverters 864 and 865 are coupled to the lines 599 and 598, respectively. Programming is accomplished by coupling, during fabrication, inverters between the lines 598 and 599 and the chosen lines within the internal data bus 500.

The NAND gate 862 is always employed in the highest order position so that a binary one bit of data is generated in this position for an external interrupt, and a binary zero is generated for a timer initiated interrupt.

As stated hereinabove, the interrupt address generator 508 generates two consecutive 8-bit bytes for the interrupt address. The gates having inputs coupled to the lines 599 (e.g., NAND gate 862, inverter 864, etc.) generate the lower order 8-bit byte, whereas the gates having inputs coupled to the line 598 (e.g., inverters 860, 865, etc.) generate the higher order 8-bit byte.

The purpose of this timer 510 is to provide a programmable interrupt time base capable of initiating an interrupt following the programmed time interval. The timer circuit 510 essentially comprises an 8-bit binary counter. The timer can be loaded from the internal data bus 500 (lines 500a-500h) in conjunction with a timer load signal on the line 507c from the I/O port address select circuit 506. During the loading of the timer 510 the clock signals supplied on the lines 778 and 780 are synchronized with the system timing. Once the timer has been loaded the clock signals on lines 778 and 780 are changed to a pre-scaled value divided by five of the primary system clock signals by the circuit illustrated in FIG. 14.

The time-out condition of the timer 510 is indicated by the flip-flops 800 through 806 being in a set state and the flip-flop 807 in a reset state. This condition is detected by the inverters 826, 836 . . . at the not true ($\overline{Q}$) outputs of the corresponding flip-flops 800-806, and the inverter 854 at the true (Q) output of the flip-flop 807. When this condition is satisfied the line 512 goes to a high-level. Hence, a high-level signal on the line 512 indicates a timer time-out.

Figure 16:
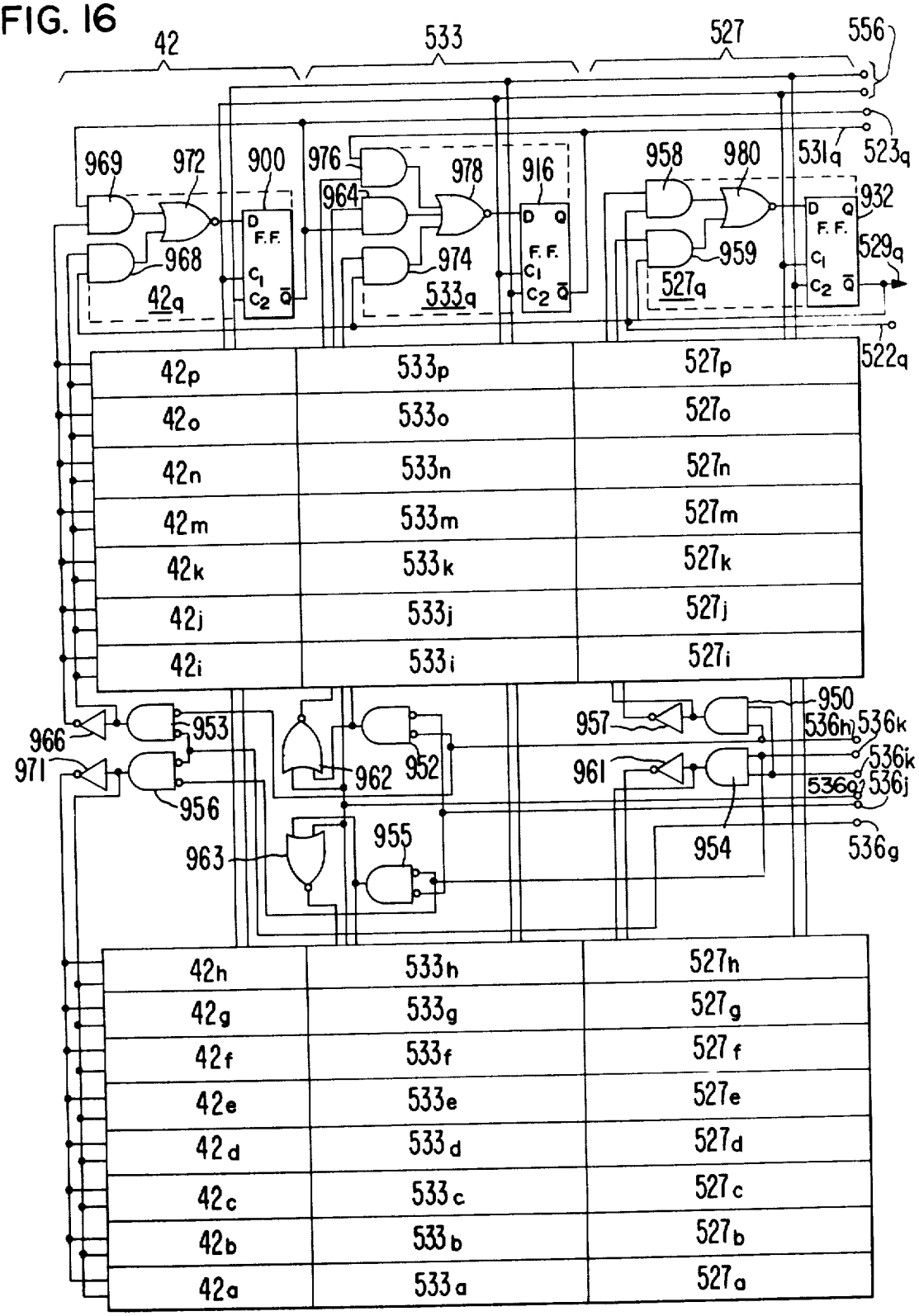
FIG. 16 is a combined logic-block diagram of the program counter, stack register and data counter for the ROM circuit.

Referring now to FIG. 16, a combined logic-block diagram of the program counter 42, the stack register 533, and the data counter address pointer 527 is shown. The program counter 42, the stack register 533, and the data counter address pointer 527 are each organized into 16 identical circuit portions, which are referred to herein individually by the corresponding reference numeral and an alphabetical letter. The small letter "l" is omitted to avoid ambiguity with the number one. The highest-order position of the program counter 42 is identified as 42q, and the lowest-order position is identified as 42a. Circuit portions of the stack register 533 and the data counter address pointer 527 are identified in a similar manner. The lines 556, which transmit the clock signals from the clock circuits 555 are coupled to the $C_1$ and $C_2$ inputs of the flip-flops 900 through 915 of the program counter 42 (wherein flip-flops 901 through 915 are not shown); flip-flops 916 through 931 of the stack register 533 (wherein flip-flops 917 through 931 are not shown); and, flip-flops 932 through 947 of the data counter address pointer 527 (wherein flip-flops 933 through 947 are not shown).

A line 536h, from the control ROM 534, is coupled to the first of two inputs of an AND gate 950, to the first of two inverted inputs of AND gates 952, and 953. A line 536i is coupled to the second input of the AND gate 950, and to the first of two inputs of an AND gate 954. A line 536k is coupled to the second input of the AND gate 954, and to the first of two inverted inputs of an AND gate 955, and to the first of two inverted inputs of an AND gate 956. The output of the AND gate 950 is coupled to the input of an inverter 957, to the first of two inputs of an AND gate 958 in the high order position, and to the first of two inputs of AND gates (not shown) within the blocks 527a through 527p, which AND gates correspond to gate 958 in the circuit portion 527a. The output of the inverter 957 is coupled to the first of two inputs of an AND gate 959 in circuit portion 527q, and to the first of two inputs of AND gates within the circuit portions 527i through 527p (not shown) corresponding to the AND gate 959 in circuit portion 527q.

The signal supplied on the line 536i controls the loading of the data counter 527. The signals on the lines 536h and 536k control the loading of the upper and lower portions respectively, of the program counter 42, the stack register 533, and the data counter 527. In particular, the combination of the signals on lines 536h and 536i in conjunction with the AND gate 950 and inverter 957 control the loading of circuit portions 527i through 527q of the data counter 527.

The output of the AND gate 954 is coupled to the input of an inverter 961, and to the first of two inputs of AND gates (not shown) within the circuit portions 527a through 527h corresponding to the AND gate 958 within circuit portions 527q. The output of the inverter 961 is coupled to the first of two inputs of AND gates (not shown) in the circuit portions 527a through 527h, which corresponds to the AND gate 959 in the circuit portion 527a.

A line 536o is coupled to the first of two inputs of NOR gates 962 and 963, to the first of two inputs of an AND gate 964 in circuit portion 533a, and to the first of two inputs of AND gates (not shown) in circuit portions 533a through 533p, which corresponds to the AND gate 964 in circuit portion 533a. The signal supplied on the lines 536o gates the contents of the program counter 42 into the stack register 533.

A line 536j is coupled to the second inverted inputs of the AND gates 952 and 955, and a line 536g is coupled to the second inverted inputs of the AND gates 953 and 956. The output of the AND gate 953 is coupled to the input of an inverter 966, to the first of two inputs of an AND gate 968 in the circuit portions 42q, and to the first of two inputs of AND gates (not shown) in the circuit portions 42i through 42p, which corresponds to the AND gate 968 in circuit portion 42q. The output of the inverter 966 is coupled to the first of two inputs of an AND gate 969 in the circuit portion 42q, and to the first of two inputs of AND gates in circuit portions 42i through 42p, which corresponds to the AND gate 969 in the circuit portion 42q. The output of the AND gate 956 is coupled to the input of an inverter 971, and the first of two inputs of AND gates (not shown) in circuit portions 42a through 42h, which corresponds to the AND gate 968 in the circuit portion 42q. The output of the inverter 971 is coupled to the first of two inputs of AND gates (not shown) in circuit portions 42a through 42h, which corresponds to the AND gate 969 in the circuit portion 42q.

The outputs of the AND gates 968 and 969 are coupled to the two inputs of a NOR gate 972. The output of the NOR gate 972 is coupled to the "D" input of the flip-flop 900. The not true ($\overline{Q}$) output of the flip-flop 900 is coupled to the second input of the AND gates 964, and 969, and to a line 523q, which comprises the highest-order position of the lines 523 coupling the program counter 42 to the address gating circuit 532 (FIG. 11).

The output of the AND gate 952 is coupled to the second input of the NOR gate 962, the first of two inputs of an AND gate 974 in the circuit portion 533q, and to the first of two inputs of AND gates (not shown) in the circuit portions 533i through 533p, which corresponds to the AND gate 974 within circuit portion 533q. The output of the NOR gate 962 is coupled to the first of two inputs of an AND gate 976, in the circuit portion 533q, and to the first of two inputs of AND gates (not shown) in circuit portions 533i through 533p, which corresponds to the AND gate 976 in the circuit portion 533q. The outputs of the AND gates 976, 964 and 974 are coupled to the three inputs of a NOR gate 978. The output of the NOR gate 978 is coupled to the "D" input of the flip-flop 916. The not true ($\overline{Q}$) output of the flip-flop 916 is coupled to the second input of the AND gate 976, and to a line 531q, which comprises the highest-order position of the lines 531 coupling the stack register 533 to the address gating circuit 532 (FIG. 11).

The output of the AND gate 955 is coupled to the second input of the NOR gate 963. The outputs of the AND gate 955 and the NOR gate 963 are coupled to gates within circuit portions 533a through 533h which correspond to gates 974 and 976, respectively, within the circuit portion 533q.

The outputs of the AND gates 958 and 959, within the circuit portion 527q, are coupled to the two inputs of a NOR gate 980. The output of the NOR gate 980 is coupled to the "D" input of the flip-flop 932. The not true ($\overline{Q}$) output of the flip-flop 932 is coupled to the second input of the AND gate 959 and to a line 529q, which comprises the highest-order position of the lines 529 coupling the data counter 527 to the address gating circuit 532. A line 522q, which comprises the highest-order position of the address transfer bus 522 is coupled to the second input of the AND gates 958, 974 and 968.

The signal supplied on the line 536g controls the AND gates 953 and 956. When a signal is supplied on the line 536h simultaneously with a signal on the line 536g AND gate 953 and inverter 966 operate to load the higher-order positions of the program counter 42 (e.g., circuit portions 42i through 42q) with data from the address transfer bus 522. When a signal is supplied on the line 536h simultaneously with a signal on the line 536i g, AND gate 956 and inverter 971 operate to load data into the lower-order positions of the program counter 42 (e.g., circuit portions 42a through 42h).

The signal supplied on the line 536j controls the AND gates 952 and 955. When a signal is supplied on the line 536j simultaneously with a signal on the line 536h, AND gate 952 and NOR gate 962 operate to load data into the higher-order positions of the stack register 533 (e.g., circuit portions 533i through 533q). When a signal is supplied on the line 536k simultaneously with a signal on the line 536j AND gate 955 and NOR gate 963 operate to load the lower order positions of the stack register 533 (e.g., circuit portions 533a through 533).

Figure 17B:
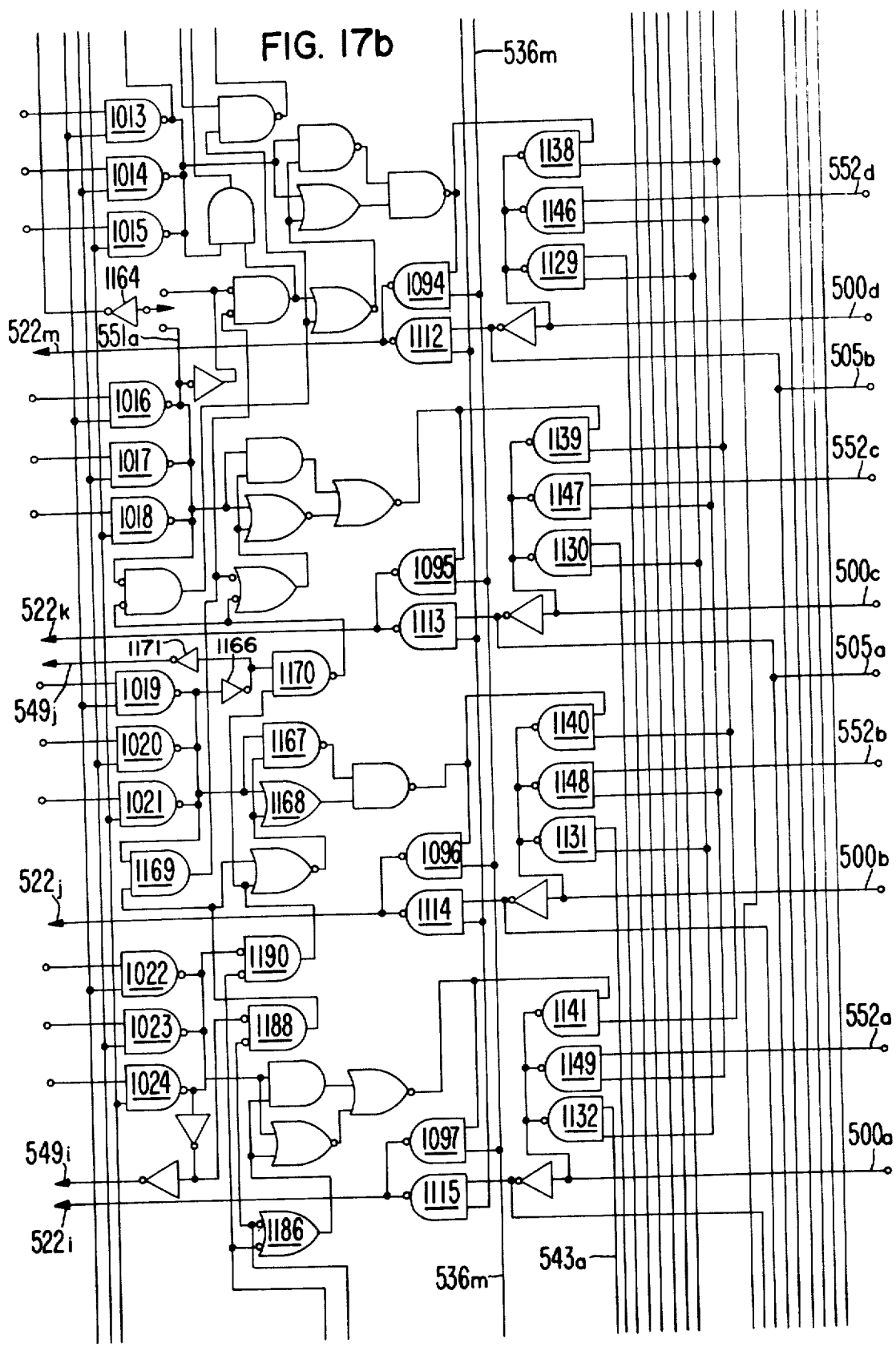
Figure 17C:
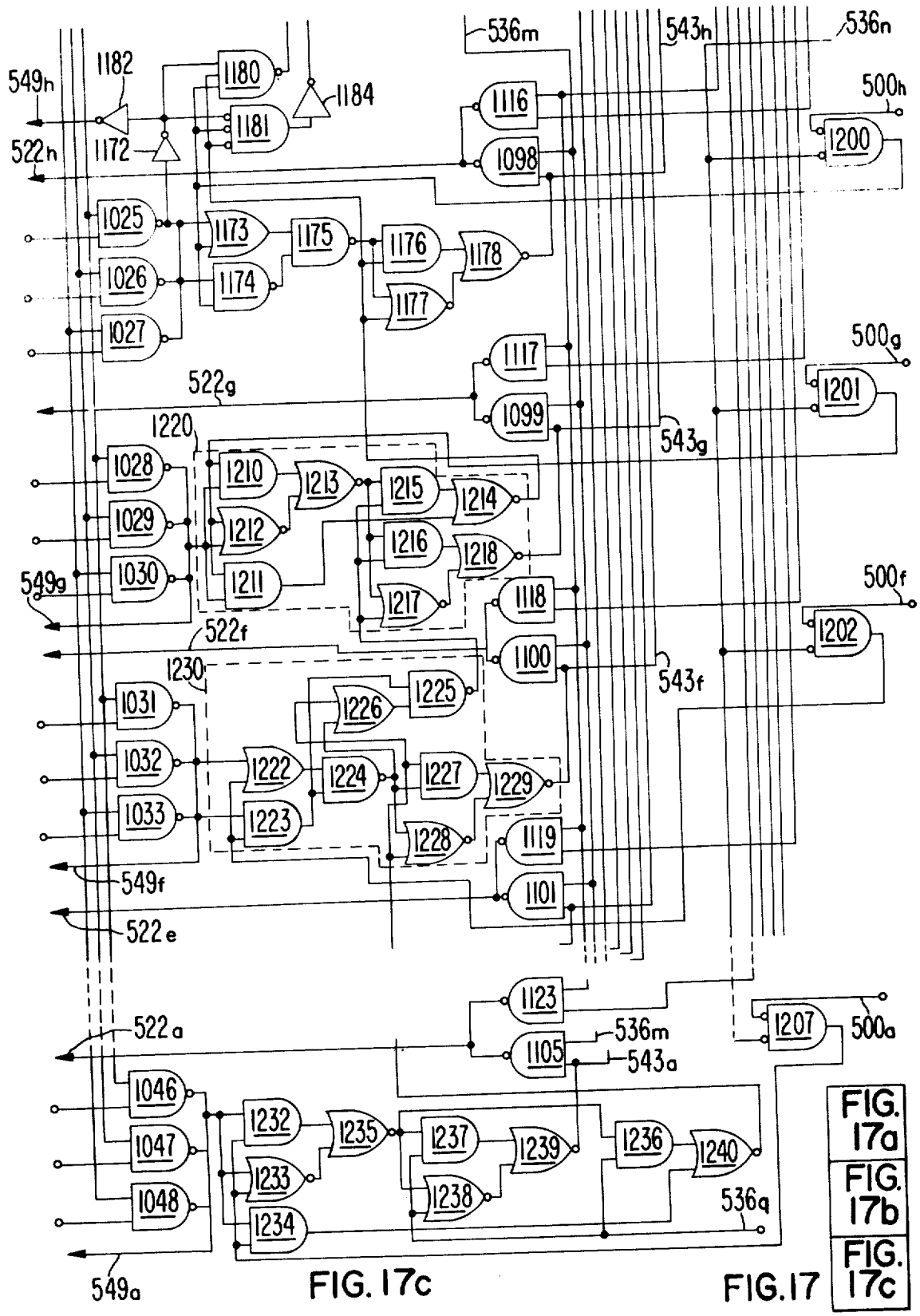

Referring now to FIG. 17, a unitary diagram of the relationship of the gates illustrating FIGS. 17a, 17b and 17c is shown. The combination of FIGS. 17a, 17b and 17c comprise a logic diagram illustrating the incrementer adder 537, the address gating circuit 532, the ROM select 550, the upper byte transfer gate 540, the lower byte transfer gate 542, the transfer gate 518, and the address multiplexer circuit 517 within connections between these circuits. A majority of these circuits comprise 16-bit positions, while only a few comprise 8-bit positions, with the exception of the ROM select circuit 550 which comprises 6-bit positions. Accordingly, reference numerals with a letter will be employed in the description hereinbelow with the omission of the letter "*l*" to avoid ambiguity with the number one. The highest-order position within the 16-bits is shown at the top of FIG. 17a, while the lowest-order position of the 16-bits is shown at the bottom of FIG. 17c.

Referring now to FIG. 17a, the highest-order bit position of the address gating circuit 532 is enclosed within the dashed line 532q. Referring to FIGS. 17a, 17b and 17c simultaneously, NAND gates 1001 through 1048 and NOR gate 1050 comprise the address gating circuit 532. Each bit position of the 16-bits is organized into three NAND gates. For example, circuit portion 532q comprises NAND gates 1001, 1002 and 1003.

A line 536s, from the control ROM 534, is coupled to the first of two inputs of the NOR gate 1050, to the first of two inputs of the NAND gates 1002, 1005, et seq. A line 536t is coupled to the second input of the NOR gate 1050, and to the first of two inputs of the NAND gates 1003, 1006, et seq. The output of the NOR gate 1050 is coupled to the first of two inputs of the NAND gates 1001, 1004, et seq. The signal supplied on the line 536s controls the gating of the contents of the stack register 533 through the address gating circuit 532, while the signal supplied on the line 536t controls the gating of the contents of the data counter 527 through the gating circuit 532. The absence of a signal on either line 536s or 536t (as a function of the NOR gate 1050) gates the contents of the program counter 42 through the address gating circuit 532.

The line 523q, which is the highest-order position of the lines coupling the program counter 42 with the address gating circuit 532, is coupled to the second input of the NAND gate 1001. The line 531q, which comprises the highest-order position of the lines 531 coupling the stack register 533 with the address gating circuit 532, is coupled to the second input of the NAND gate 1002. The line 529q, which comprises the highest-order position of the lines 529 coupling the data counter 527 with the address gating circuit 532, is coupled to the second input of the NAND gate 1003. The remaining individual lines 523, 531 and 529 are coupled to inputs of the NAND gates 1004 through 1048 in a manner identical to that described above.

The outputs of the NAND gates 1001, 1002 and 1003 are connected together and this connection is coupled to the input of an inverter 1052, to a circuit point 1053, to the first of two inputs of a NAND gate 1054, and to the first of two inputs of a NOR gate 1056. The outputs of the NAND gates 1004, 1005 and 1006 are connected together, and this connection is coupled to the input of an inverter 1058, to a circuit point 1059, to the first of two inverted inputs of an AND gate 1060, to the first of two inverted inputs of an AND gate 1062, and to the first of two inputs of a NOR gate 1064.

The outputs of the NAND gates 1007, 1008 and 1009 are connected together and this connection is coupled to the input of an inverter 1066, to a circuit point 1067, to the first of two inputs of a NAND gate 1068, to the first of two inputs of an OR gate 1069, and to the first of two inputs of a NAND gate 1070. The output of the inverter 1066 is coupled to the first of two inputs of a NAND gate 1072 and to a circuit point 1073. The output of the NAND gate 1068 is coupled to the first of two inverted inputs of an OR gate 1074 and to the first of two inverted inputs of an AND gate 1075. The outputs of the AND gates 1060 and 1075 are coupled to the two inputs of a NOR gate 1076. The output of the NOR gate 1076 is coupled to the second input of the OR gate 1056, and to the second input of the NAND gate 1054. The outputs of the NAND gate 1054 and the OR gate 1056 are coupled to the two inputs of a NAND gate 1077.

The output of the NAND gate 1077 is coupled to the second input of the NAND gate 1090, and to the first of two inputs of a NAND gate 1078 by means of a line 541h, which line comprises the high-order position of the lines 541 between the incrementer adder 537 and the upper-byte transfer gate 540. The lines 552 coupling the ROM storage 548 to the internal data bus 500 comprise a plurality of NAND gates. In particular, line 552h is coupled to the data bus line 500h by means by an AND gate 1080. A line 536p from the control ROM 534 is coupled to the second input of the AND gate 1080. The signal supplied on the line 536p enables the AND gate 1080, and the other similar gates to be described hereinbelow, to transfer data on the line 522h to the internal data bus 500.

A line 536h, from the control ROM 534, is coupled to the first of two inverted inputs of AND gates 1082 and 1084. A line 536k is coupled to the first of two inverted inputs of AND gates 1086 and 1088. A line 536r is coupled to the second inverted input of AND gates 1084 and 1088. A line 536m is coupled to the second inverted inputs of the AND gates 1082 and 1086, and to the first of two inputs of NAND gates 1090 through 1105. The NAND gates 1090 through 1105 comprise the address multiplexer circuit 516, (FIG. 11). The output of the AND gate 1082 is coupled to the first of two inputs of NAND gates 1108 through 1123. The NAND gates 1108 through 1123 comprise the output gating of the incrementer adder to the address transfer bus 552. The outputs of the NAND gates 1090 and 1108 are coupled together, and this connection is coupled to a line 522q of the address transfer bus 522.

The output of the AND gate 1088 is coupled to the first of two inputs of NAND gates 1125 through 1132. The NAND gates 1125 through 1132 comprise the lower byte transfer gate 542 (FIG. 11). The output of the AND gate 1084 is coupled to the second input of the NAND gate 1078, and to the first of two inputs of NAND gates 1135 through 1141. The NAND gates 1078 and 1135 through 1141 comprise the upper byte transfer gate 540 (FIG. 11). The line 536p is coupled to the first input of NAND gate 1080 and to the first of two inputs of NAND gates 1143 through 1149.

The NAND gates 1080 and 1143 through 1149 comprise gating (not shown) coupled between the lines 552 at the output of the ROM storage 548 and the internal data bus 500. The outputs of the NAND gates 1078, 1080 and 1125 are coupled together, and this connection is coupled to the highest-order position 500h of the data bus 500, and to the input of an inverter 1151. The output of the inverter 1151 is coupled to the second input of the NAND gate 1108, to a line 505f of the lines 505 at the input of the I/O port address select circuit 506, and to the second input of the NAND gate 1161 (FIG. 17c).

The outputs of the AND gate 1062 and the NOR gate 1064 are coupled to the inputs of a NOR gate 1153. The output of the NOR gate 1153, which comprises line 541g of lines 541, is coupled to the second input of the NAND gate 1091, and to the second input of the NAND gate 1135. The outputs of the NAND gates 1135, 1143 and 1126 are coupled together and this connection is coupled to the input of an inverter 1155, and to the line 500g of the internal data bus 500. The output of the inverter 1155 is coupled to the second input of the NAND gate 1109, to a line 505e of the lines 505, and to the second input of the NAND gate 1117 (FIG. 17c). The outputs of the NAND gates 1135 through 1141, 1144 through 1149, and 1127 through 1132 are coupled in the same manner as described above to the remaining lines of the internal data bus 500 and to the NAND gates 1118 through 1123 (FIG. 17c).

Referring again to FIG. 17a, the output of the inverter 1052 in the circuit portion 550f is coupled to a circuit point 1157. Circuit points 1053 and 1157 are disposed for connection to the input of an inverter 1158 by means of a mask programmed contact 1159. The output of the inverter 1158 is coupled to the line 553, which comprises the control line from the ROM select circuit 550 to the ROM storage 548 (FIG. 11). Five additional inverters 1160 through 1164 are coupled in the same manner as inverter 1158, and 1160 through 1164 are formed in ohmic contact with either of the respective circuit points during manufacture of the device. The combination of such connections constitute a unique binary number which comprises an address selection to distinguish one ROM circuit 22 from other similar circuits employed in a given system.

Referring now to FIG. 17b, the outputs of the NAND gates 1019, 1020 and 1021 are coupled together, and this connection is coupled to the input of an inverter 1166, the first of two inputs of a NAND gate 1167, the first of two inputs of an OR gate 1168, and to the first of two inputs of an AND gate 1169. The output of the inverter 1166 is coupled to the first of two inputs of a NAND gate 1170, and to the input of an inverter 1171. The output of the inverter 1171 is coupled to a line 549j, which comprises the high-order position of the lines 549 coupling the address gating circuit 532 to the ROM storage 548. In particular, lines 549 comprise the address input to the ROM storage 548.

Referring now to FIG. 17c, the outputs of the NAND gates 1025, 1026 and 1027 are coupled together and this connection is coupled to the input of an inverter 1172, the first of two inputs of an OR gate 1173, and the first of two inputs of a NAND gate 1174. The outputs of the OR gate 1173 and the NAND gate 1174 are coupled to the two inputs of a NAND gate 1175. The output of the NAND gate 1175 is coupled to the first of two inputs of an AND gate 1176 and to the first of two inputs of a NOR gate 1177. The outputs of the AND gate 1176 and the NOR gate 1177 are coupled to the two inputs of a NOR gate 1178. The output of the NOR gate is coupled to the second input of the NAND gate 1098 and to the line 543h.

The output of the inverter 1172 is coupled to the first of three inputs of a NAND gate 1180, the first of three inverted inputs of an AND gate 1181, and to the input of an inverter 1182. The output of the inverter 1182 is coupled to the line 549h of the lines 549. The output of the AND gate 1181 is coupled to the input of an inverter 1184, and the output of the inverter 1184 is coupled to the first of two inverted inputs of an OR gate 1186 (FIG. 17b), and to the first of two inverted inputs of an AND gate 1188. The output of the NAND gate 1180 is coupled to the second inverted input of the OR gate 1186, and to the first of two inverted inputs of an AND gate 1190 (FIG. 17b).

A line 536n from the control ROM 534, is coupled to the first of two inverted inputs of AND gates 1200 through 1207. Lines 500 are coupled to the second inverted inputs of the AND gates 1200-1207; wherein line 500h is coupled to the second inverted input of the AND gate 1200, line 500g is coupled to the second inverted input of the AND gate 1201, et seq. The output of the AND gate 1200 is coupled to the second inverted input of the AND gate 1181, to the second input of the NAND gate 1180, and to the second inputs of gates 1173 and 1174.

The output of the AND gate 1201 is coupled to the first of two inputs of AND gates 1210 and 1211, and to the first of two inputs of a NOR gate 1212. The outputs of the NAND gates 1028, 1029 and 1030 are coupled together and this connection is coupled to a line 549g of the lines 549 to the ROM storage 548, to the second inputs of the AND gates 1210 and 1211, and to the second input of the NOR gate 1212. The outputs of the AND gate 1210 and the NOR gate 1212 are coupled to the two inputs of a NOR gate 1213. The output of the AND gate 1211 is coupled to the first of two inputs of a NOR gate 1214. The output of the NOR gate 1213 is coupled to the first of two inputs of AND gates 1215 and 1216, and to the first of two inputs of a NOR gate 1217. The output of the AND gate 1215 is coupled to the second input of the NOR gate 1214. The output of the NOR gate 1214 is coupled to the second input of the NOR gate 1177 and the AND gate 1176, to the third inverted input of the AND gate 1181, and to the third input of the NAND gate 1180. The outputs of the AND gate 1216 and the NOR gate 1217 are coupled to the second input of the NAND gate 1099, and to a line 543g which line is coupled to the second input of the NAND gate 1126 (FIG. 17a). The gates 1210 through 1218, which are enclosed within the dashed line 1220, comprise a first of two types of structures employed within the eight low-order positions of the incrementer adder 537.

The outputs of the NAND gates 1031, 1032 and 1033 are coupled together and this connection is coupled to a line 549f of the lines 549, to the first of two inputs of an OR gate 1222, and to the first of two inputs of an AND gate 1223. The output of the AND gate 1202 is coupled to the second input of the OR gate 1222, and to the second input of the AND gate 1223. The output of the OR gate 1222 is coupled to the first of two inputs of a NAND gate 1224. The output of the AND gate 1223 is coupled to the second input of the NAND gate 1224, and to the first of two inputs of a NAND gate 1225. The output of the NAND gate 1224 is coupled to the first of two inputs of an OR gate 1226, to the first of two inputs of an AND gate 1227, and to the first of two inputs of a NOR gate 1228. The output of the OR gate 1226 is coupled to the second input of the NAND gate 1225. The outputs of the gates 1227 and 1228 are coupled to the two inputs of a NOR gate 1229. The output of the NOR gate 1229 is coupled to the second input of the NAND gate 1100, and to a line 534f which line is coupled to the second input of the NAND gate 1127 (FIG. 17a). The gates 1222 through 1229, which are enclosed within the dashed line 1230, comprise a second type structure of the two types of structures employed within the eight low-order positions of the incrementer adder 537.

The first of the two types of structure, such as that enclosed within dashed line 1220, is employed within the third, fifth, and seventh order positions of the incrementer adder 537; and, the second of the two types, such as that enclosed within the dashed line 1230, is employed within the second, fourth and sixth order positions of the incrementer adder 537. The second through the fifth order positions are not shown in FIG. 17c for simplification of the drawing. Be that as it may, the first type of structure 1220 is coupled to the output of the NAND gates 1034 through 1036 (not shown) and the outputs of the NAND gates 1040 through 1042 (not shown). The second type of structure 1230 is coupled to the outputs of the NAND gates 1037 through 1039 (not shown) and 1043 through 1045 (not shown).

The outputs of the NAND gates 1046, 1047 and 1048 are coupled together and this connection is coupled to a line 549a of the lines 549, and to the first of two inputs of an AND gate 1232, a NOR gate 1233 and an AND gate 1234. The output of the AND gate 1207 is coupled to the second inputs of the gates 1232 through 1234. The outputs of the gates 1232 and 1233 are coupled to the input of a NOR gate 1235. The output of the NOR gate 1235 is coupled to the first of two inputs of an AND gate 1236, an AND gate 1237, and a NOR gate 1238.

A line 536q from the control ROM 534 is coupled to the second inputs of the gates 1236 through 1238. The outputs of the gates 1237 and 1238 are coupled to the two inputs of a NOR gate 1239. The output of the NOR gate 1239 is coupled to the second input of the NAND gate 1105 and to a line 534a which line is coupled to the second input of the NAND gate 1132 (FIG. 17b). The outputs of the AND gates 1234 and 1236 are coupled to the two inputs of a NOR gate 1240. The output of the NOR gate 1240 is coupled to a gate within a structure in the second order position (not shown, but similar to structure 1230) which corresponds to the NOR gate 1228.

The control ROM 534 essentially comprises a read only memory well known in the prior art. The ROM 534 comprises a multiplicity of cells arranged in groups, which cells store binary digits (zero or more). Each group of cells stores a unique binary number. When an address for a specific group of cells is provided at the address input of the ROM 534 on the lines 36, the binary number stored in that group of cells is supplied at the output on the lines 536. With reference to the system of the present invention, the digits of each binary number retrieved in response to an address comprising a unique combination of the control signals supplied on the lines 36 constitutes specific control signals for the circuitry in the ROM circuit 22. A table is listed below which shows twenty eight (28) separate combinations of the signals supplied on the lines 36 and the corresponding signals retreived from the ROM 534 and supplied on the lines 536.

1400 comprise the eight connections between I/O port 31 and an I/O device, which connections are interdigitated with four of the eight connections for the data bus 34. The contact pads generally referred to as 1402 comprise the the eight connections between I/O port 32 and an I/O device, which connections are interdigitated with the remaining four connections for the data bus 34.

Figure 19:
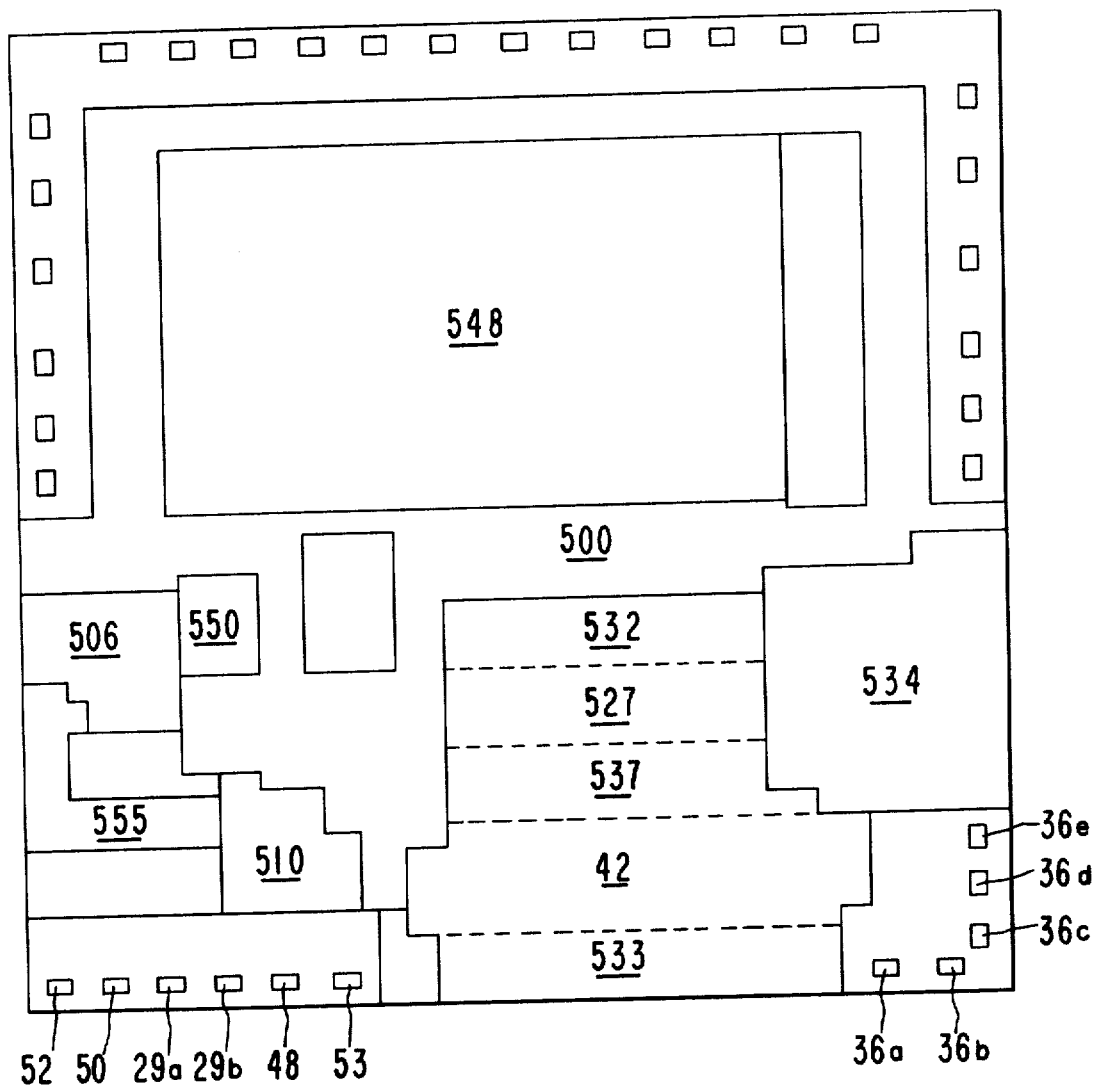
FIG. 19 is a planar view of the ROM circuit in integrated form.

Referring now to FIG. 19 the CPU circuit 22 is illustrated in integrated form onto a single semiconductor die. Like reference numerals are employed to identify like components illustrated in FIG. 11 and described in detail hereinabove. The contact pads generally referred to as 1404 comprise the connections for I/O ports 38 and 40 and buffer 502. The contact pads are formed adjacent to corresponding circuit components and are interdigitated with constituent parts (i.e., bit positions) of the buffer 502.

EXEMPLARY OPERATION

As stated hereinabove, each of the instruction codes for the microprocessor of the present invention effect unique system functions. The sequence of operation begins with resetting the program counter 42 in the ROM circuit 22 to a zero, or beginning address. Control signals are supplied from the sequential control circuit 72 in the CPU 20 to the control ROM 534 in the ROM circuit 22 by means of the lines 36. These control signals are decoded in the control ROM 534 and supplied on the lines 536 to the circuitry of the ROM circuit 22 to effect operation thereof. The 16-bit output of the program counter 42 is supplied to an address input of the ROM storage 548 by means of the lines 523 and to the address gating circuit 532. The six high order bit positions of the address from the program counter 42 are supplied to the ROM select circuit 550 by means of the

|     | Lines 36 |   |   |   |   | Lines 536 |   |   |   |   |   |   |   |   |   |   |   |   |   |   |   |   |   |   |   |
|-----|---|---|---|---|---|---|---|---|---|---|---|---|---|---|---|---|---|---|---|---|---|---|---|---|---|
|     | a | b | c | d | e | a | b | c | d | e | f | g | h | i | j | k | m | n | o | p | q | r | s | t |   |
| 1)  | 0 | 0 | 0 | 0 | 0 | 1 | 1 | 1 | 1 | 1 | 1 | 0 | 0 | 1 | 1 | 0 | 1 | 1 | 0 | 1 | 1 | 1 | 0 | 0 |   |
| 2)  | 1 | 0 | 0 | 0 | 0 | 1 | 1 | 1 | 1 | 1 | 1 | 0 | 0 | 1 | 1 | 0 | 1 | 0 | 0 | 1 | 0 | 1 | 0 | 0 |   |
| 3)  | 0 | 1 | 0 | 0 | 0 | 1 | 1 | 1 | 1 | 1 | 1 | 1 | 0 | 0 | 1 | 0 | 1 | 1 | 0 | 1 | 1 | 1 | 0 | 1 |   |
| 4)  | 1 | 1 | 0 | 0 | 0 | 1 | 1 | 1 | 1 | 1 | 1 | 0 | 0 | 1 | 1 | 0 | 1 | 1 | 0 | 1 | 1 | 1 | 0 | 0 |   |
| 5)  | 0 | 0 | 1 | 0 | 0 | 1 | 1 | 0 | 1 | 1 | 1 | 0 | 0 | 1 | 1 | 0 | 1 | 1 | 0 | 0 | 0 | 1 | 1 | 0 |   |
| 6)  | 1 | 0 | 1 | 0 | 0 | 1 | 1 | 0 | 1 | 1 | 1 | 1 | 0 | 0 | 1 | 0 | 1 | 1 | 0 | 0 | 1 | 1 | 0 | 1 |   |
| 7)  | 0 | 1 | 1 | 0 | 0 | 1 | 1 | 1 | 1 | 1 | 1 | 0 | 1 | 1 | 1 | 0 | 1 | 0 | 0 | 0 | 0 | 0 | 0 | 1 |   |
| 8)  | 1 | 1 | 1 | 0 | 0 | 1 | 1 | 1 | 1 | 1 | 1 | 0 | 1 | 1 | 1 | 0 | 1 | 0 | 0 | 0 | 0 | 1 | 1 | 0 |   |
| 9)  | 0 | 0 | 0 | 1 | 0 | 1 | 1 | 0 | 1 | 1 | 1 | 0 | 0 | 1 | 1 | 0 | 0 | 1 | 0 | 1 | 1 | 0 | 0 | 0 |   |
| 10) | 1 | 0 | 0 | 1 | 0 | 1 | 1 | 1 | 1 | 1 | 1 | 1 | 1 | 1 | 0 | 0 | 1 | 0 | 0 | 0 | 0 | 0 | 0 | 1 |   |
| 11) | 0 | 1 | 0 | 1 | 0 | 1 | 1 | 0 | 1 | 1 | 1 | 1 | 0 | 0 | 1 | 0 | 1 | 0 | 0 | 0 | 0 | 1 | 0 | 1 |   |
| 12) | 1 | 1 | 0 | 1 | 0 | 1 | 1 | 1 | 1 | 1 | 1 | 1 | 1 | 1 | 1 | 0 | 0 | 1 | 0 | 0 | 0 | 0 | 1 | 0 |   |
| 13) | 0 | 0 | 1 | 1 | 0 | 1 | 1 | 1 | 1 | 1 | 0 | 1 | 1 | 1 | 0 | 0 | 1 | 0 | 1 | 1 | 1 | 0 | 0 |   |   |
| 14) | 1 | 0 | 1 | 1 | 0 | 1 | 1 | 0 | 1 | 1 | 1 | 1 | 0 | 1 | 0 | 0 | 1 | 1 | 0 | 0 | 1 | 1 | 0 | 0 |   |
| 15) | 0 | 1 | 1 | 1 | 0 | 1 | 1 | 1 | 1 | 1 | 1 | 1 | 0 | 1 | 0 | 0 | 0 | 1 | 0 | 1 | 1 | 1 | 0 | 0 |   |
| 16) | 1 | 1 | 1 | 1 | 0 | 1 | 1 | 0 | 1 | 0 | 1 | 0 | 1 | 1 | 1 | 0 | 0 | 1 | 1 | 0 | 1 | 1 | 0 | 0 |   |
| 17) | 0 | 0 | 0 | 0 | 1 | 1 | 1 | 1 | 0 | 0 | 1 | 1 | 0 | 1 | 1 | 0 | 0 | 1 | 0 | 0 | 1 | 1 | 0 | 0 |   |
| 18) | 1 | 0 | 0 | 0 | 1 | 1 | 1 | 1 | 1 | 1 | 1 | 1 | 0 | 0 | 1 | 1 | 0 | 1 | 0 | 1 | 1 | 1 | 0 | 0 |   |
| 19) | 0 | 1 | 0 | 0 | 1 | 1 | 1 | 0 | 1 | 1 | 1 | 0 | 1 | 1 | 1 | 0 | 0 | 1 | 1 | 0 | 1 | 1 | 0 | 0 |   |
| 20) | 1 | 1 | 0 | 0 | 1 | 1 | 1 | 0 | 1 | 1 | 0 | 0 | 0 | 1 | 1 | 1 | 0 | 1 | 0 | 0 | 1 | 1 | 0 | 0 |   |
| 21) | 0 | 0 | 1 | 0 | 1 | 1 | 1 | 0 | 1 | 1 | 1 | 0 | 0 | 1 | 1 | 1 | 0 | 1 | 0 | 0 | 1 | 1 | 0 | 0 |   |
| 22) | 1 | 0 | 1 | 0 | 1 | 1 | 1 | 0 | 1 | 1 | 1 | 1 | 0 | 1 | 0 | 1 | 0 | 1 | 0 | 0 | 1 | 1 | 0 | 0 |   |
| 23) | 0 | 1 | 1 | 0 | 1 | 1 | 1 | 0 | 1 | 1 | 1 | 1 | 0 | 0 | 1 | 1 | 0 | 1 | 0 | 0 | 1 | 1 | 0 | 0 |   |
| 24) | 1 | 1 | 1 | 0 | 1 | 1 | 1 | 0 | 1 | 1 | 1 | 0 | 1 | 1 | 1 | 0 | 0 | 1 | 0 | 0 | 1 | 1 | 0 | 0 |   |
| 25) | 0 | 0 | 0 | 1 | 1 | 1 | 1 | 0 | 1 | 1 | 1 | 1 | 1 | 1 | 0 | 0 | 0 | 1 | 0 | 0 | 1 | 1 | 0 | 0 |   |
| 26) | 1 | 0 | 0 | 1 | 1 | 1 | 1 | 0 | 1 | 1 | 1 | 1 | 1 | 0 | 1 | 0 | 0 | 1 | 0 | 0 | 1 | 1 | 0 | 0 |   |
| 27) | 0 | 1 | 0 | 1 | 1 | 0 | 1 | 0 | 1 | 1 | 1 | 1 | 0 | 1 | 1 | 0 | 0 | 1 | 0 | 0 | 1 | 1 | 0 | 0 |   |
| 28) | 1 | 1 | 0 | 1 | 1 | 1 | 0 | 0 | 1 | 1 | 1 | 1 | 0 | 1 | 1 | 0 | 0 | 1 | 0 | 0 | 1 | 1 | 0 | 0 |   |
| 29) | 0 | 1 | 1 | 1 | 1 | 1 | 1 | 1 | 1 | 1 | 1 | 1 | 1 | 1 | 1 | 0 | 0 | 1 | 0 | 0 | 0 | 0 | 0 | 0 |   |
| 30) | 1 | 1 | 1 | 1 | 1 | 1 | 1 | 1 | 1 | 1 | 1 | 0 | 1 | 1 | 1 | 0 | 1 | 0 | 0 | 0 | 0 | 0 | 0 |   |   |

Figure 18:
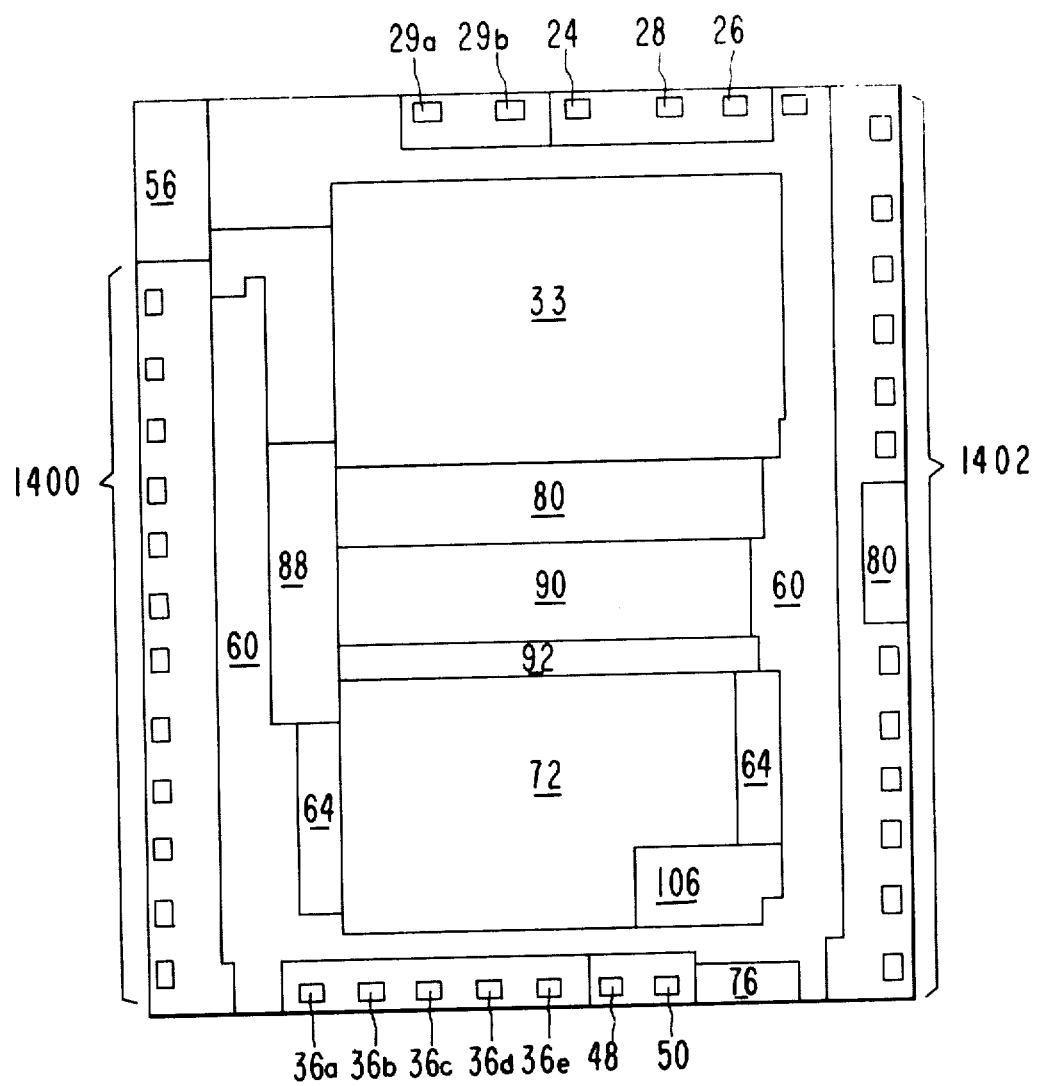
FIG. 18 is a planar view of the CPU in integrated form.

Referring now to FIG. 18, the CPU 20 is illustrated in integrated form onto a single semiconductor die. The term die as used herein is conventional and refers to a unitary semiconductor body or chip. Like reference numerals are employed in FIG. 18 to represent like components identified in FIG. 2 and described in detail hereinabove. The contact pads generally referred to as lines 551. If these six bits of the address correspond to a programmed address in the circuit 550, which indicates that this particular ROM circuit 22 has been selected from other similar ROM circuits in the system, then a signal is supplied on the line 553 to enable addressing of the ROM storage 548 by the ten low-order bit positions of the address by means of the lines 549. An instruction code is retrieved from the ROM storage 548 in response to the address supplied on the lines 549, and this instruction code is supplied on the lines 552 to the buffer 502. When the buffer 502 is gated the instruction code retrieved from the ROM storage 548 is supplied on the data bus 34 to the input of the buffer 62 on the CPU 20. The instruction code loaded into the buffer 62 is transferred to the instruction register 64 by means of the internal data bus 60 and the lines 65. The instruction code loaded into the instruction register 64 is transferred to the sequential control circuit 72 by means of the lines 73. The instruction code is then decoded in the sequential control circuit 72 to supply the control signals on the lines 36, 74 and 77.

The binary digits corresponding to the control signals supplied on the lines 36 to retrieve the first instruction code was:

00000

With reference to the table above, all zeros on the lines 36 correspond to the first combination (i.e., line 1 of the table) of the control signal on the lines 36. The pertinent control signals supplied on the lines 536 are lines 536c, 536g, 536h, 536k, 536m and 536p. The signal supplied on the line 536c is the ROM drive signal, which indicates to the buffer 502 the direction of data flow. The signal supplied on the line 536g enables loading of the program counter 42 with an updated address, which has been incremented from the initial address by the incrementer adder 537. The signals supplied on the lines 536h and 536k enable loading of the upper and lower portions of the program counter 42. The signal supplied on the line 536m enables the transfer of the output of the incrementer adder 537 to the address transfer bus 522. The signal supplied on the line 536p enables the gating of the instruction code retrieved from the ROM storage 548 to the internal data bus 500 on the lines 552.

Assume, for example, that an output instruction code has been retrieved from the ROM storage 548 and is stored in the instruction register 64. At this point in the cycle only one signal is supplied from the sequential control circuit 72 on the line 74af. This signal modifies the operation of the clock circuits 56 to change the clock counter from 4 clocks per machine cycle to 6 clocks per machine cycle. This is required to expand the time necessary to execute an output instruction. The state register 106 in the sequential control circuit 72 will be conditioned by the lines 77 to change from state zero to state one. Simultaneously while still in state zero, a new set of control signals are supplied to the ROM circuit 22 by means of the lines 36. The state of this new set of signals supplied on the lines 36 is as follows:

11000

Note that this binary number corresponds to the fourth line on the table above. The pertinent control signals supplied on the lines 536 are the same as that described above for a binary code of 00000, which effects the retrieval of the next instruction code from the ROM storage 548. This instruction code contains the address for the input/output port which will receive the output data. At the end of this machine cycle, the state register 106 advances to state one. In addition, a new combination of control signals are supplied on the lines 74 to the circuit of the CPU 20. The pertinent control signals supplied on the lines 74 are signals on lines 74e, 74g, and 74k. In addition, a control signal is transmitted to the buffer 62 to condition the direction of data flow therethrough. The signal supplied on the line 74k gates the binary number in the accumulator register 90 onto the left multiplexer bus 82, and applies this binary number to an input of the arithmetic logic unit 80 by means of the lines 83. The signals present on the lines 74e and 74g effect an add operation in the arithmetic logic unit 80. However, a zero value is present on the right multiplexer bus 68. Thus, the binary number present on the lines 83 is added to a zero value, and this effectively transfers the binary number through the arithmetic logic unit 80 unmodified to the result bus 84. In addition, a control signal is supplied to the transfer gate 94 to pass the binary number through the ALU 80 to the internal data bus 60. Subsequently, this binary number is transferred through the buffer 62 onto the data bus 34, and then to the ROM circuit 22.

During state one of the state register 106, a new set of control signals are transmitted to the ROM circuit 22 by means of the lines 36. These control signals are as follows:

01011

Note that this combination of control signals corresponds to the twenty-seventh line on the table above. The pertinent control signals supplied on the lines 536 in response to this combination of control signals are 536a, 536h, and 536k. The signal supplied on the line 536a effects the loading of the binary number supplied on the data bus 34 into the addressed I/O port. The signals on the lines 536h and 536k permit the loading of the program counter 42 with the next address incremented by the adder 537. At the end of this machine cycle, the state register 106 is forced to a state 11. This state changes the control signals in the lines 36 to 00000, which will effect the retrieval of the next instruction code from the ROM storage 548.

Accordingly, instruction codes are retrieved from the ROM circuit 22 in response to addresses derived within the ROM circuit in response to control signals from the CPU 20. The retrieved instruction codes are transmitted to the CPU 20 to execute the particular instruction contained within the instruction codes.

What is claimed is:

1. A microprocessor system comprising a first large scale integration circuit forming a central processing unit, and a second large scale integration circuit forming a memory circuit;
    (a) said central processing unit comprising
        (1) means for transferring data;
        (2) at least one input/output port means coupled to said means for transferring data for entering data into and dispatching data from said system;
        (3) means for storing instruction codes to by executed by said system and having input terminals coupled to said means for transferring data;
        (4) first decoding means for supplying first control signals to said central processing unit and second control signals to said memory circuit, said first and second control signals being derived by said first decoding means in accordance with instruction codes stored in said means for storing;
        (5) means for performing arithmetic computations coupled to said means for transferring data;
        (6) means for accumulating results of said means for performing arithmetic computations being coupled between input and output terminals of said means for performing;
        (7) random access memory means coupled between input and output terminals of said means for performing arithmetic computations for storing results of said means for performing;

(8) gating means coupling said output terminals of said means for performing arithmetic computations with said means for transferring data;

(9) means for transmitting said instruction codes from said means for storing to one or more of said first decoding means, said means for performing arithmetic computations, and said random access memory means;

(10) means coupling said first control signals from said first decoding means to said input/output port means, said means for storing instruction codes, said means for performing arithmetic computations, said means for accumulating, said random access memory means, said means for transmitting, and said gating means, whereby operation of said central processing unit is controlled by said first control signals in accordance with said instruction codes;

(11) clock circuit means for providing a system clocking signal of a first frequency in response to a first state of one of said first control signals from said first decoding means and a second frequency in response to a second state of said one of said first control signals, whereby the speed of operation of said system is controlled in accordance with the instruction codes; and, (b) said memory circuit comprising (1) storage means for storing a multiplicity of the instruction codes for said system;

(2) second decoding means for receiving said second control signals from said first decoding means in said central processing unit and for generating third control signals in accordance with said second control signals to control operation of said memory circuit;

(3) means for addressing said storage means in response to said third control signals and retrieving selected codes from said storage means in response to said second control signals from said first decoding means in said central processing unit; and, (4) means for transferring said retrieved instruction codes to said means for storing instruction codes.

2. The microprocessor system as in claim 1 further characterized by said second large scale integration circuit including second clock circuit means having an input terminal for receiving said system clocking signal and generating in synchronization therewith second clock signals for said memory circuit.

3. The microprocessor system as in claim 1 further characterized by said means for transmitting said instruction codes including a multiplex means responsive to said first control signals for selectively supplying said instruction codes to said means for performing arithmetic computations and said random access memory means.

4. The microprocessor system as in claim 1 further characterized by said means for transmitting said instruction codes including means for directly coupling output terminals of said means for storing to input terminals of said first decoding means.

5. A microprocessor system comprising a first large scale integration circuit forming a central processing unit, a second large scale integration circuit forming a memory circuit, and means for interrupting system operations;

(a) said central processing unit comprising (1) means for transferring data;

(2) at least one input/output port means coupled to said means for transferring data for entering data into and dispatching data from said system;

(3) means for storing instruction codes to be executed by said system and having input terminals coupled to said means for transferring data;

(4) first decoding means for supplying first control signals to said central processing unit and second control signals to said memory circuit, said first and second control signals being derived by said first decoding means in accordance with instruction codes stored in said means for storing;

(5) means for performing arithmetic computations coupled to said means for transferring data;

(6) means for accumulating results of said means for performing arithmetic computations being coupled between input and output terminals of said means for performing;

(7) random access memory means coupled between input and output terminals of said means for performing arithmetic computations for storing results of said means for performing;

(8) gating means coupling said output terminals of said means for performing arithmetic computations with said means for transferring data;

(9) means for transmitting data said instruction codes from said means for storing to one or more of said first decoding means, said means for performing arithmetic computations, and said random access memory means;

(10) means coupling said first control signals from said first decoding means to said input/output port means, said means for storing instruction codes, said means for performing arithmetic computations, said means for accumulating, said random access memory means, said means for transmitting, and said gating means, whereby operation of said central processing unit is controlled by said first control signals in accordance with said instruction codes;

(b) said memory circuit comprising (1) storage means for storing a multiplicity of the instruction codes for said system;

(2) second decoding means for receiving said second control signals from said first decoding means in said central processing unit and for generating third control signals in accordance with said second control signals to control operation of said memory circuit;

(3) means for addressing said storage means in response to said third control signals and retrieving selected instruction codes from said storage means in response to said second control signals from said first decoding means in said central processing unit; and, (4) means for transferring said retrieved instruction codes to said means for storing instruction codes;

(c) said means for interrupting system operations comprising an interrupt logic means located in said central processing unit, and an interrupt control means and an interrupt address generation means both located in said memory circuit;

(1) said interrupt logic means supplying an interrupt interrogate signal and coupled to said first decoding means so that system interrupts occur in synchronization with system operations;

(2) said interrupt control means receiving interrupt signals from external sources and in response thereto supplying an interrupt service request signal to said interrupt logic means and said interrupt address generation means;
(3) said interrupt address generation means supplying address information to said storage means in response to said interrupt service request signal, wherein operation of said microprocessor system in accordance with a first sequence of instruction codes is interrupted in response to an interrupt signal in coincidence with an interrupt interrogate signal to change system operation to a second sequence of instruction codes retrieved from said storage means at an address generated by said interrupt address generation means.

6. The microprocessor system as in claim 5 further characterized by said means for interrupting including a timer means being disposed between said interrupt address generation means and said interrupt control means for providing a time delay between receipt of said interrupt request signal and initiation of a system interrupt operation.

7. The microprocessor system as in claim 6 further characterized by said interrupt control means including circuit means for initiating a system interrupt in response to a time delayed signal from said timer means.

8. The microprocessor system as in claim 5 further characterized by said interrupt control means including means for storing said interrupt signals from external sources until said interrupt interrogate signal is received from said interrupt logic means.

9. The microprocessor system as in claim 5 further characterized by said system including an additional plurality of memory circuits, each comprising:

(1) second storage means for storing a multiplicity of the instruction codes for said system;
(2) third decoding means for receiving said second control signals from said first decoding means in said central processing unit and for generating fourth control signals in accordance with said second control signals to control operation of each of said memory circuits;
(3) second means for addressing said storage means in response to said fourth control signals, thereby to retrieve selected instruction codes from said second storage means in response to said second control signals from said first decoding means in said central processing unit; and,
(4) second means for transferring said retrieved instruction codes to said means for storing instruction codes.

10. The microprocessor system as in claim 5 further characterized by said interrupt control means including circuit means for establishing a priority of system interrupts when more than one interrupt request signal is received by said system.

11. The microprocessor system as in claim 5 further characterized by said means for transmitting said instruction codes including a multiplex means responsive to said first control signals for selectively suppling said instruction codes to said means for performing arithmetic computations and said random access memory means.

12. The microprocessor system as in claim 5 further characterized by said means for transmitting said instruction codes including means for directly coupling output terminals of said means for storing to input terminals of said first decoding means.

* * * * *